(12) United States Patent
Fujisaki

(10) Patent No.: US 8,554,269 B1
(45) Date of Patent: *Oct. 8, 2013

(54) COMMUNICATION DEVICE

(76) Inventor: Iwao Fujisaki, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/535,169

(22) Filed: Jun. 27, 2012

Related U.S. Application Data

(63) Continuation of application No. 13/026,210, filed on Feb. 12, 2011, now Pat. No. 8,238,963, which is a continuation of application No. 12/344,306, filed on Dec. 26, 2008, now Pat. No. 7,917,167, which is a continuation of application No. 10/905,836, filed on Jan. 22, 2005, now abandoned, which is a continuation of application No. 10/711,265, filed on Sep. 7, 2004, now abandoned.

(60) Provisional application No. 60/481,695, filed on Nov. 22, 2003.

(51) Int. Cl.
*H04M 1/00* (2006.01)

(52) U.S. Cl.
USPC ............. 455/550.1; 455/556.1; 455/557; 455/419; 455/41.2

(58) Field of Classification Search
USPC .......... 455/418–420, 41.2, 550.1, 557, 90.1; 345/168
See application file for complete search history.

(56) References Cited

U.S. PATENT DOCUMENTS

| | | | |
|---|---|---|---|
| 4,934,773 A | 6/1990 | Becker | |
| 5,272,638 A | 12/1993 | Martin et al. | |
| 5,345,272 A | 9/1994 | Ersoz et al. | |
| 5,353,376 A | 10/1994 | Oh et al. | |
| 5,388,147 A | 2/1995 | Grimes | |
| 5,405,152 A | 4/1995 | Katanics et al. | |
| 5,414,461 A | 5/1995 | Kishi et al. | |
| 5,418,837 A | 5/1995 | Johansson et al. | |
| 5,438,357 A | 8/1995 | McNelley | |
| 5,442,453 A | 8/1995 | Takagi et al. | |
| 5,446,904 A | 8/1995 | Belt et al. | |
| 5,479,476 A | 12/1995 | Finke-Anlauff | |
| 5,530,472 A | 6/1996 | Bregman et al. | |
| 5,550,754 A | 8/1996 | McNelley et al. | |
| 5,559,554 A | 9/1996 | Uekane et al. | |
| 5,625,675 A | 4/1997 | Katsumaru et al. | |
| 5,629,741 A | 5/1997 | Hopper | |
| 5,687,331 A | 11/1997 | Volk et al. | |
| 5,758,280 A | 5/1998 | Kimura | |
| 5,772,586 A | 6/1998 | Heinonen et al. | |
| 5,778,304 A | 7/1998 | Grube et al. | |
| 5,786,846 A | 7/1998 | Hiroaki | |
| 5,825,408 A | 10/1998 | Yuyama et al. | |

(Continued)

FOREIGN PATENT DOCUMENTS

| | | |
|---|---|---|
| GB | 2386027 A1 | 9/2003 |
| JP | 2196373 A1 | 8/1990 |

(Continued)

OTHER PUBLICATIONS

Fehily "Windows XP: Visual QuickStart Guide" published by Peachpit Press in 2003.

(Continued)

*Primary Examiner* — Sharad Rampuria

(57) ABSTRACT

The mobile phone comprising a voice communication implementer, a caller's information displaying implementer, and a mobile phone updating implementer.

18 Claims, 1 Drawing Sheet

(56) References Cited

U.S. PATENT DOCUMENTS

| | | |
|---|---|---|
| 5,844,824 A | 12/1998 | Newman et al. |
| 5,902,349 A | 5/1999 | Endo et al. |
| 5,903,706 A | 5/1999 | Wakabayashi et al. |
| 5,918,180 A | 6/1999 | Dimino |
| 5,924,040 A | 7/1999 | Trompower |
| 5,959,661 A | 9/1999 | Isono |
| 6,009,336 A | 12/1999 | Harris et al. |
| 6,034,715 A | 3/2000 | Ishida et al. |
| 6,069,648 A | 5/2000 | Suso et al. |
| 6,073,034 A | 6/2000 | Jacobsen et al. |
| 6,081,265 A | 6/2000 | Nakayama et al. |
| 6,085,112 A | 7/2000 | Kleinschmidt |
| 6,094,237 A | 7/2000 | Hashimoto |
| 6,115,597 A | 9/2000 | Kroll et al. |
| 6,128,594 A | 10/2000 | Gulli et al. |
| 6,144,848 A | 11/2000 | Walsh et al. |
| 6,148,212 A | 11/2000 | Park et al. |
| 6,161,134 A | 12/2000 | Wang et al. |
| 6,167,283 A | 12/2000 | Korpela et al. |
| 6,192,343 B1 | 2/2001 | Morgan et al. |
| 6,195,089 B1 | 2/2001 | Chaney et al. |
| 6,198,942 B1 | 3/2001 | Hayashi et al. |
| 6,202,060 B1 | 3/2001 | Tran |
| 6,216,013 B1 | 4/2001 | Moore et al. |
| 6,216,158 B1 | 4/2001 | Luo et al. |
| 6,222,482 B1 | 4/2001 | Gueziec |
| 6,225,944 B1 | 5/2001 | Hayes |
| 6,243,039 B1 | 6/2001 | Elliot |
| 6,253,075 B1 | 6/2001 | Beghtol et al. |
| 6,265,988 B1 | 7/2001 | LeMense et al. |
| 6,285,317 B1 | 9/2001 | Ong |
| 6,285,757 B1 | 9/2001 | Carroll et al. |
| 6,292,666 B1 | 9/2001 | Siddiqui et al. |
| 6,311,077 B1 | 10/2001 | Bien |
| 6,366,651 B1 | 4/2002 | Griffith et al. |
| 6,385,465 B1 | 5/2002 | Yoshioka |
| 6,385,654 B1 | 5/2002 | Tanaka |
| 6,405,033 B1 | 6/2002 | Kennedy, III et al. |
| 6,411,198 B1 | 6/2002 | Hirai et al. |
| 6,421,470 B1 | 7/2002 | Nozaki et al. |
| 6,421,602 B1 | 7/2002 | Bullock et al. |
| 6,438,380 B1 | 8/2002 | Bi et al. |
| 6,442,404 B1 | 8/2002 | Sakajiri |
| 6,445,802 B1 | 9/2002 | Dan |
| 6,487,422 B1 | 11/2002 | Lee |
| 6,507,643 B1 | 1/2003 | Groner |
| 6,510,325 B1 | 1/2003 | Mack, II et al. |
| 6,512,919 B2 | 1/2003 | Ogasawara |
| 6,518,956 B1 | 2/2003 | Sato |
| 6,519,566 B1 | 2/2003 | Boyer et al. |
| 6,526,293 B1 | 2/2003 | Matsuo |
| 6,528,533 B2 | 3/2003 | Lauffer et al. |
| 6,529,742 B1 | 3/2003 | Yang |
| 6,542,750 B2 | 4/2003 | Hendrey et al. |
| 6,549,215 B2 | 4/2003 | Jouppi |
| 6,549,756 B1 | 4/2003 | Engstrom |
| 6,553,309 B2 | 4/2003 | Uchida et al. |
| 6,587,547 B1 | 7/2003 | Zirngibl et al. |
| 6,615,186 B1 | 9/2003 | Kolls |
| 6,618,704 B2 | 9/2003 | Kanevsky et al. |
| 6,630,958 B2 | 10/2003 | Tanaka et al. |
| 6,647,251 B1 | 11/2003 | Siegle et al. |
| 6,650,877 B1 | 11/2003 | Tarbouriech et al. |
| 6,650,894 B1 | 11/2003 | Berstis et al. |
| 6,658,272 B1 | 12/2003 | Lenchik et al. |
| 6,658,461 B1 | 12/2003 | Mazo |
| 6,662,023 B1 | 12/2003 | Helle |
| 6,665,711 B1 | 12/2003 | Boyle et al. |
| 6,668,177 B2 | 12/2003 | Salmimaa et al. |
| 6,681,120 B1 | 1/2004 | Kim, II |
| 6,687,515 B1 | 2/2004 | Kosaka |
| 6,690,932 B1 | 2/2004 | Barnier et al. |
| 6,694,143 B1 | 2/2004 | Beamish et al. |
| 6,701,148 B1 | 3/2004 | Wilson et al. |
| 6,701,162 B1 | 3/2004 | Everett |
| 6,707,942 B1 | 3/2004 | Cortopassi et al. |
| 6,711,399 B1 | 3/2004 | Granier |
| 6,728,533 B2 | 4/2004 | Ishii |
| 6,763,226 B1 | 7/2004 | McZeal, Jr. |
| 6,772,174 B1 | 8/2004 | Pettersson |
| 6,775,361 B1 | 8/2004 | Arai et al. |
| 6,779,030 B1 | 8/2004 | Dugan et al. |
| 6,782,412 B2 | 8/2004 | Brophy et al. |
| 6,788,928 B2 | 9/2004 | Kohinata et al. |
| 6,795,715 B1 | 9/2004 | Kubo et al. |
| 6,812,954 B1 | 11/2004 | Priestman et al. |
| 6,813,501 B2 | 11/2004 | Kinnunen et al. |
| 6,819,939 B2 | 11/2004 | Masamura |
| 6,820,055 B2 | 11/2004 | Saindon et al. |
| 6,850,209 B2 | 2/2005 | Mankins et al. |
| 6,865,372 B2 | 3/2005 | Mauney et al. |
| 6,870,828 B1 | 3/2005 | Giordano, III |
| 6,876,379 B1 | 4/2005 | Fisher |
| 6,883,000 B1 | 4/2005 | Gropper |
| 6,888,927 B1 | 5/2005 | Cruickshank et al. |
| 6,891,525 B2 | 5/2005 | Ogoro |
| 6,895,084 B1 | 5/2005 | Saylor et al. |
| 6,895,259 B1 | 5/2005 | Blank nee Keller et al. |
| 6,898,321 B1 | 5/2005 | Knee et al. |
| 6,901,383 B1 | 5/2005 | Ricketts et al. |
| 6,912,544 B1 | 6/2005 | Weiner |
| 6,922,212 B2 | 7/2005 | Nakakubo et al. |
| 6,937,868 B2 | 8/2005 | Himmel et al. |
| 6,947,728 B2 | 9/2005 | Tagawa et al. |
| 6,954,645 B2 | 10/2005 | Tsai et al. |
| 6,958,675 B2 | 10/2005 | Maeda et al. |
| 6,961,559 B1 | 11/2005 | Chow et al. |
| 6,970,178 B2 | 11/2005 | Tanioka et al. |
| 6,970,703 B2 | 11/2005 | Fuchs et al. |
| 6,973,628 B2 | 12/2005 | Asami |
| 6,992,699 B1 | 1/2006 | Vance et al. |
| 6,999,757 B2 | 2/2006 | Bates et al. |
| 7,003,598 B2 | 2/2006 | Kavanagh |
| 7,007,239 B1 | 2/2006 | Hawkins et al. |
| 7,012,999 B2 | 3/2006 | Ruckart et al. |
| 7,019,770 B1 | 3/2006 | Katz |
| 7,028,077 B2 | 4/2006 | Toshimitsu et al. |
| 7,030,880 B2 | 4/2006 | Tanioka et al. |
| 7,035,666 B2 | 4/2006 | Silberfenig et al. |
| 7,058,356 B2 | 6/2006 | Slotznick |
| 7,076,052 B2 | 7/2006 | Yoshimura |
| 7,081,832 B2 | 7/2006 | Nelson et al. |
| 7,085,578 B2 | 8/2006 | Barclay et al. |
| 7,085,739 B1 | 8/2006 | Winter et al. |
| 7,089,298 B2 | 8/2006 | Nyman et al. |
| 7,106,846 B2 | 9/2006 | Nguyen et al. |
| 7,107,081 B1 | 9/2006 | Fujisaki |
| 7,113,981 B2 | 9/2006 | Slate |
| 7,117,152 B1 | 10/2006 | Mukherji et al. |
| 7,126,951 B2 | 10/2006 | Belcea et al. |
| 7,127,238 B2 | 10/2006 | Vandermeijden et al. |
| 7,127,271 B1 | 10/2006 | Fujisaki |
| 7,130,630 B1 | 10/2006 | Morton, Jr. et al. |
| 7,139,555 B2 | 11/2006 | Apfel |
| 7,142,810 B2 | 11/2006 | Oesterling |
| 7,142,890 B2 | 11/2006 | Irimajiri et al. |
| 7,146,179 B2 | 12/2006 | Parulski et al. |
| 7,224,792 B2 | 5/2007 | Fusco |
| 7,224,851 B2 | 5/2007 | Kinjo |
| 7,224,987 B1 | 5/2007 | Bhela et al. |
| 7,231,231 B2 | 6/2007 | Kokko et al. |
| 7,233,781 B2 | 6/2007 | Hunter et al. |
| 7,233,795 B1 | 6/2007 | Ryden |
| 7,245,293 B2 | 7/2007 | Hoshino et al. |
| 7,251,255 B1 | 7/2007 | Young |
| 7,254,408 B2 | 8/2007 | Kim |
| 7,260,416 B2 | 8/2007 | Shippee |
| 7,266,186 B1 | 9/2007 | Henderson |
| 7,277,711 B2 | 10/2007 | Nyu |
| 7,321,783 B2 | 1/2008 | Kim |
| 7,346,373 B2 | 3/2008 | Kim |
| 7,372,447 B1 | 5/2008 | Jacobsen et al. |
| 7,383,067 B2 | 6/2008 | Phillips et al. |
| 7,433,845 B1 | 10/2008 | Flitcroft et al. |

| | | |
|---|---|---|
| 7,444,168 B2 | 10/2008 | Nakagawa et al. |
| 7,450,709 B2 | 11/2008 | Gonzalez et al. |
| 7,451,084 B2 | 11/2008 | Funakura |
| 7,532,879 B1 | 5/2009 | Fujisaki |
| 7,551,899 B1 | 6/2009 | Nicolas et al. |
| 7,593,712 B2 | 9/2009 | Moton, Jr. et al. |
| 7,642,929 B1 | 1/2010 | Pinkus et al. |
| 7,643,037 B1 | 1/2010 | Langmacher et al. |
| 7,657,252 B2 | 2/2010 | Futami |
| 7,707,592 B2 | 4/2010 | Wesslen et al. |
| 7,707,602 B2 | 4/2010 | Cragun et al. |
| 7,725,077 B2 | 5/2010 | Jung et al. |
| 7,769,364 B2 | 8/2010 | Logan et al. |
| 7,787,857 B2 | 8/2010 | Peterman |
| 7,787,887 B2 | 8/2010 | Gupta et al. |
| 7,853,295 B1 | 12/2010 | Fujisaki |
| 7,853,297 B1 | 12/2010 | Fujisaki |
| 7,865,567 B1 | 1/2011 | Hendricks et al. |
| 7,873,349 B1 | 1/2011 | Smith et al. |
| 7,890,089 B1 | 2/2011 | Fujisaki |
| 7,899,410 B2 | 3/2011 | Rakshani et al. |
| 7,922,086 B2 | 4/2011 | Jung et al. |
| 7,941,141 B2 | 5/2011 | Shoykhet et al. |
| 7,953,439 B2 | 5/2011 | Rofougaran |
| 7,970,414 B1 | 6/2011 | Werden et al. |
| 8,099,108 B2 | 1/2012 | Camp et al. |
| 8,126,400 B2 | 2/2012 | Jung et al. |
| 8,145,040 B2 | 3/2012 | Toyoshima |
| 8,208,954 B1 | 6/2012 | Fujisaki |
| 2001/0005826 A1 | 6/2001 | Shibuya |
| 2001/0011293 A1 | 8/2001 | Murakami et al. |
| 2001/0029425 A1 | 10/2001 | Myr |
| 2001/0035829 A1 | 11/2001 | Yu et al. |
| 2001/0048364 A1 | 12/2001 | Kalthoff et al. |
| 2001/0049470 A1 | 12/2001 | Mault et al. |
| 2002/0002044 A1 | 1/2002 | Naruse et al. |
| 2002/0002705 A1 | 1/2002 | Byrnes et al. |
| 2002/0006804 A1 | 1/2002 | Mukai et al. |
| 2002/0009978 A1 | 1/2002 | Dukach et al. |
| 2002/0016724 A1 | 2/2002 | Yang et al. |
| 2002/0019225 A1 | 2/2002 | Miyashita |
| 2002/0026348 A1 | 2/2002 | Fowler et al. |
| 2002/0028690 A1 | 3/2002 | McKenna et al. |
| 2002/0031120 A1 | 3/2002 | Rakib |
| 2002/0034292 A1 | 3/2002 | Tuoriniemi et al. |
| 2002/0036231 A1 | 3/2002 | Monaghan et al. |
| 2002/0037738 A1 | 3/2002 | Wycherley et al. |
| 2002/0038219 A1 | 3/2002 | Yanay et al. |
| 2002/0039914 A1 | 4/2002 | Hama et al. |
| 2002/0041262 A1 | 4/2002 | Mukai et al. |
| 2002/0047787 A1 | 4/2002 | Mikkola et al. |
| 2002/0049630 A1 | 4/2002 | Furuta et al. |
| 2002/0052754 A1 | 5/2002 | Joyce et al. |
| 2002/0054068 A1 | 5/2002 | Ellis et al. |
| 2002/0055872 A1 | 5/2002 | LaBrie et al. |
| 2002/0061767 A1 | 5/2002 | Sladen et al. |
| 2002/0065037 A1 | 5/2002 | Messina et al. |
| 2002/0066115 A1 | 5/2002 | Wendelrup |
| 2002/0068558 A1 | 6/2002 | Janik |
| 2002/0068585 A1 | 6/2002 | Chan et al. |
| 2002/0068599 A1 | 6/2002 | Rodriguez et al. |
| 2002/0072395 A1 | 6/2002 | Miramontes |
| 2002/0077808 A1 | 6/2002 | Liu et al. |
| 2002/0080163 A1 | 6/2002 | Morey |
| 2002/0085700 A1 | 7/2002 | Metcalf |
| 2002/0094806 A1 | 7/2002 | Kamimura |
| 2002/0097984 A1 | 7/2002 | Abecassis |
| 2002/0098857 A1 | 7/2002 | Ishii |
| 2002/0102960 A1 | 8/2002 | Lechner |
| 2002/0103872 A1 | 8/2002 | Watanabe |
| 2002/0104095 A1 | 8/2002 | Nguyen et al. |
| 2002/0110246 A1 | 8/2002 | Gosior et al. |
| 2002/0115469 A1 | 8/2002 | Rekimoto et al. |
| 2002/0120718 A1 | 8/2002 | Lee |
| 2002/0123336 A1 | 9/2002 | Kamada |
| 2002/0127997 A1 | 9/2002 | Karlstedt et al. |
| 2002/0128000 A1 | 9/2002 | do Nascimento |
| 2002/0133342 A1 | 9/2002 | McKenna |
| 2002/0137470 A1 | 9/2002 | Baron et al. |
| 2002/0137503 A1 | 9/2002 | Roderique |
| 2002/0137526 A1 | 9/2002 | Shinohara |
| 2002/0141086 A1 | 10/2002 | Lang et al. |
| 2002/0142763 A1 | 10/2002 | Kolsky |
| 2002/0147645 A1 | 10/2002 | Alao et al. |
| 2002/0151326 A1 | 10/2002 | Awada et al. |
| 2002/0151327 A1 | 10/2002 | Levitt |
| 2002/0164975 A1 | 11/2002 | Lu |
| 2002/0164996 A1 | 11/2002 | Dorenbosch |
| 2002/0165850 A1 | 11/2002 | Roberts et al. |
| 2002/0173344 A1 | 11/2002 | Cupps et al. |
| 2002/0177407 A1 | 11/2002 | Mitsumoto |
| 2002/0178225 A1 | 11/2002 | Madenberg et al. |
| 2002/0183045 A1 | 12/2002 | Emmerson et al. |
| 2002/0183098 A1 | 12/2002 | Lee et al. |
| 2002/0191951 A1 | 12/2002 | Sodeyama et al. |
| 2002/0198813 A1 | 12/2002 | Patterson, Jr. et al. |
| 2002/0198936 A1 | 12/2002 | McIntyre et al. |
| 2003/0003967 A1 | 1/2003 | Ito |
| 2003/0005056 A1 | 1/2003 | Yamamoto et al. |
| 2003/0006879 A1 | 1/2003 | Kang et al. |
| 2003/0007556 A1 | 1/2003 | Oura et al. |
| 2003/0013483 A1 | 1/2003 | Ausems et al. |
| 2003/0014286 A1 | 1/2003 | Cappellini |
| 2003/0016189 A1 | 1/2003 | Abe et al. |
| 2003/0017857 A1 | 1/2003 | Kitson et al. |
| 2003/0018744 A1 | 1/2003 | Johanson et al. |
| 2003/0032406 A1 | 2/2003 | Minear et al. |
| 2003/0037265 A1 | 2/2003 | Sameshima et al. |
| 2003/0038800 A1 | 2/2003 | Kawahara |
| 2003/0038893 A1 | 2/2003 | Rajamaki et al. |
| 2003/0045311 A1 | 3/2003 | Larikka et al. |
| 2003/0045329 A1 | 3/2003 | Kinoshita |
| 2003/0052964 A1 | 3/2003 | Priestman et al. |
| 2003/0055994 A1 | 3/2003 | Herrmann et al. |
| 2003/0061606 A1 | 3/2003 | Hartwig et al. |
| 2003/0063580 A1 | 4/2003 | Pond |
| 2003/0063732 A1 | 4/2003 | Mcknight |
| 2003/0065784 A1 | 4/2003 | Herrod |
| 2003/0065805 A1 | 4/2003 | Barnes, Jr. |
| 2003/0069693 A1 | 4/2003 | Snapp et al. |
| 2003/0070162 A1 | 4/2003 | Oshima et al. |
| 2003/0073432 A1 | 4/2003 | Meade, II |
| 2003/0083055 A1 | 5/2003 | Riordan et al. |
| 2003/0084104 A1 | 5/2003 | Salem et al. |
| 2003/0084121 A1 | 5/2003 | De Boor et al. |
| 2003/0093503 A1 | 5/2003 | Yamaki et al. |
| 2003/0093790 A1 | 5/2003 | Logan et al. |
| 2003/0099367 A1 | 5/2003 | Okamura |
| 2003/0107580 A1 | 6/2003 | Egawa et al. |
| 2003/0110450 A1 | 6/2003 | Sakai |
| 2003/0117376 A1 | 6/2003 | Ghulam |
| 2003/0119479 A1 | 6/2003 | Arima et al. |
| 2003/0119485 A1 | 6/2003 | Ogasawara |
| 2003/0119562 A1 | 6/2003 | Kokubo |
| 2003/0120784 A1 | 6/2003 | Johnson et al. |
| 2003/0125008 A1 | 7/2003 | Shimamura |
| 2003/0132928 A1 | 7/2003 | Kori |
| 2003/0135563 A1 | 7/2003 | Bodin et al. |
| 2003/0137970 A1 | 7/2003 | Odman |
| 2003/0144024 A1 | 7/2003 | Luo |
| 2003/0148772 A1 | 8/2003 | Ben-Ari |
| 2003/0149662 A1 | 8/2003 | Shore |
| 2003/0153310 A1 | 8/2003 | Ishii |
| 2003/0153355 A1 | 8/2003 | Warren |
| 2003/0156208 A1 | 8/2003 | Obradovich |
| 2003/0166399 A1 | 9/2003 | Tokkonen et al. |
| 2003/0169329 A1 | 9/2003 | Parker et al. |
| 2003/0201982 A1 | 10/2003 | Iesaka |
| 2003/0204562 A1 | 10/2003 | Hwang |
| 2003/0208541 A1 | 11/2003 | Musa |
| 2003/0220835 A1 | 11/2003 | Barnes, Jr. |
| 2003/0222762 A1 | 12/2003 | Beigl et al. |
| 2003/0222982 A1 | 12/2003 | Hamdan et al. |
| 2003/0223554 A1 | 12/2003 | Zhang |
| 2003/0224760 A1 | 12/2003 | Day |
| 2003/0227570 A1 | 12/2003 | Kim et al. |
| 2003/0229900 A1 | 12/2003 | Reisman |
| 2003/0236709 A1 | 12/2003 | Hendra et al. |

| | | |
|---|---|---|
| 2003/0236866 A1 | 12/2003 | Light |
| 2004/0003307 A1 | 1/2004 | Tsuji |
| 2004/0004616 A1 | 1/2004 | Konya et al. |
| 2004/0027369 A1 | 2/2004 | Kellock et al. |
| 2004/0029640 A1 | 2/2004 | Masuyama et al. |
| 2004/0033795 A1 | 2/2004 | Walsh et al. |
| 2004/0034692 A1 | 2/2004 | Eguchi et al. |
| 2004/0052504 A1 | 3/2004 | Yamada et al. |
| 2004/0060061 A1 | 3/2004 | Parker |
| 2004/0068399 A1 | 4/2004 | Ding |
| 2004/0072595 A1 | 4/2004 | Anson et al. |
| 2004/0082321 A1 | 4/2004 | Kontianinen |
| 2004/0087326 A1 | 5/2004 | Dunko et al. |
| 2004/0092255 A1 | 5/2004 | Ji et al. |
| 2004/0103303 A1 | 5/2004 | Yamauchi et al. |
| 2004/0107072 A1 | 6/2004 | Dietrich et al. |
| 2004/0114732 A1 | 6/2004 | Choe et al. |
| 2004/0117108 A1 | 6/2004 | Nemeth |
| 2004/0128359 A1 | 7/2004 | Horvitz et al. |
| 2004/0137893 A1 | 7/2004 | Muthuswamy et al. |
| 2004/0139208 A1 | 7/2004 | Tuli |
| 2004/0142678 A1 | 7/2004 | Krasner |
| 2004/0150725 A1 | 8/2004 | Taguchi |
| 2004/0157664 A1 | 8/2004 | Link |
| 2004/0166832 A1 | 8/2004 | Portman et al. |
| 2004/0166879 A1 | 8/2004 | Meadows et al. |
| 2004/0174863 A1 | 9/2004 | Caspi et al. |
| 2004/0183937 A1 | 9/2004 | Viinikanoja et al. |
| 2004/0185865 A1 | 9/2004 | Maanoja |
| 2004/0189827 A1 | 9/2004 | Kim et al. |
| 2004/0198374 A1 | 10/2004 | Bajikar |
| 2004/0203520 A1 | 10/2004 | Schirtzinger et al. |
| 2004/0203904 A1 | 10/2004 | Gwon et al. |
| 2004/0203909 A1 | 10/2004 | Koster |
| 2004/0204018 A1 | 10/2004 | Kuo |
| 2004/0204035 A1 | 10/2004 | Raghuram et al. |
| 2004/0204126 A1 | 10/2004 | Reyes et al. |
| 2004/0216037 A1 | 10/2004 | Hishida et al. |
| 2004/0218738 A1 | 11/2004 | Arai et al. |
| 2004/0219951 A1 | 11/2004 | Holder |
| 2004/0223049 A1 | 11/2004 | Taniguchi et al. |
| 2004/0235520 A1 | 11/2004 | Cadiz et al. |
| 2004/0242240 A1 | 12/2004 | Lin |
| 2004/0248586 A1 | 12/2004 | Patel et al. |
| 2004/0252197 A1 | 12/2004 | Fraley et al. |
| 2004/0259537 A1 | 12/2004 | Ackley |
| 2004/0266418 A1 | 12/2004 | Kotzin |
| 2004/0267628 A1 | 12/2004 | Stillman |
| 2005/0004749 A1 | 1/2005 | Park |
| 2005/0032527 A1 | 2/2005 | Sheha et al. |
| 2005/0036509 A1 | 2/2005 | Acharya et al. |
| 2005/0046584 A1 | 3/2005 | Breed |
| 2005/0048987 A1 | 3/2005 | Glass |
| 2005/0070257 A1 | 3/2005 | Saarinen et al. |
| 2005/0075097 A1 | 4/2005 | Lehikoinen et al. |
| 2005/0090768 A1 | 4/2005 | Brattesani et al. |
| 2005/0113080 A1 | 5/2005 | Nishimura |
| 2005/0113113 A1 | 5/2005 | Reed |
| 2005/0120225 A1 | 6/2005 | Kirsch et al. |
| 2005/0136949 A1 | 6/2005 | Barnes, Jr. |
| 2005/0144560 A1 | 6/2005 | Gruen et al. |
| 2005/0151877 A1 | 7/2005 | Fisher |
| 2005/0159189 A1 | 7/2005 | Iyer |
| 2005/0163289 A1 | 7/2005 | Caspi et al. |
| 2005/0164684 A1 | 7/2005 | Chen et al. |
| 2005/0165871 A1 | 7/2005 | Barrs et al. |
| 2005/0166242 A1 | 7/2005 | Matsumoto et al. |
| 2005/0186954 A1 | 8/2005 | Kenney |
| 2005/0192030 A1 | 9/2005 | Asthana et al. |
| 2005/0207555 A1 | 9/2005 | Lee et al. |
| 2005/0227731 A1 | 10/2005 | Kall |
| 2005/0235312 A1 | 10/2005 | Karaoguz et al. |
| 2005/0261945 A1 | 11/2005 | Mougin et al. |
| 2005/0272504 A1 | 12/2005 | Eguchi et al. |
| 2005/0282582 A1 | 12/2005 | Slotznick |
| 2006/0003813 A1 | 1/2006 | Seligmann et al. |
| 2006/0031407 A1 | 2/2006 | Dispensa et al. |
| 2006/0033809 A1 | 2/2006 | Farley |
| 2006/0041923 A1 | 2/2006 | McQuaide, Jr. |
| 2006/0052100 A1 | 3/2006 | Almgren |
| 2006/0059038 A1 | 3/2006 | Iuchi et al. |
| 2006/0084413 A1 | 4/2006 | Myoung |
| 2006/0114100 A1 | 6/2006 | Ghabra et al. |
| 2006/0126284 A1 | 6/2006 | Moscovitch |
| 2006/0133590 A1 | 6/2006 | Jiang |
| 2006/0140173 A1 | 6/2006 | Hoover |
| 2006/0140387 A1 | 6/2006 | Boldt |
| 2006/0143655 A1 | 6/2006 | Ellis et al. |
| 2006/0166650 A1 | 7/2006 | Berger et al. |
| 2006/0167677 A1 | 7/2006 | Bitzer |
| 2006/0206913 A1 | 9/2006 | Jerding et al. |
| 2006/0229114 A2 | 10/2006 | Kim, II |
| 2006/0234693 A1 | 10/2006 | Isidore et al. |
| 2006/0234758 A1 | 10/2006 | Parupudi et al. |
| 2006/0276172 A1 | 12/2006 | Rydgren et al. |
| 2006/0284732 A1 | 12/2006 | Brock-Fisher |
| 2007/0005809 A1 | 1/2007 | Kobayashi et al. |
| 2007/0015550 A1 | 1/2007 | Kayanuma |
| 2007/0037605 A1 | 2/2007 | Logan |
| 2007/0050832 A1 | 3/2007 | Wright et al. |
| 2007/0109262 A1 | 5/2007 | Oshima et al. |
| 2007/0135145 A1 | 6/2007 | Lee et al. |
| 2007/0135150 A1 | 6/2007 | Ushiki et al. |
| 2007/0142047 A1 | 6/2007 | Heeschen et al. |
| 2007/0190944 A1 | 8/2007 | Doan et al. |
| 2007/0191029 A1 | 8/2007 | Zarem et al. |
| 2007/0204014 A1 | 8/2007 | Greer et al. |
| 2007/0216760 A1 | 9/2007 | Kondo et al. |
| 2007/0218891 A1 | 9/2007 | Cox |
| 2007/0262848 A1 | 11/2007 | Berstis et al. |
| 2007/0293240 A1 | 12/2007 | Drennan et al. |
| 2008/0021728 A1 | 1/2008 | Khoo |
| 2008/0058005 A1 | 3/2008 | Zicker et al. |
| 2008/0104544 A1 | 5/2008 | Collins et al. |
| 2008/0146272 A1 | 6/2008 | Rao et al. |
| 2008/0151696 A1 | 6/2008 | Giroud et al. |
| 2008/0172173 A1 | 7/2008 | Chang et al. |
| 2008/0176545 A1 | 7/2008 | Dicke et al. |
| 2008/0242271 A1 | 10/2008 | Schmidt et al. |
| 2008/0242283 A1 | 10/2008 | Ruckart |
| 2008/0254811 A1 | 10/2008 | Stewart |
| 2008/0299989 A1 | 12/2008 | King et al. |
| 2009/0047972 A1 | 2/2009 | Neeraj |
| 2009/0111486 A1 | 4/2009 | Burstrom |
| 2009/0124243 A1 | 5/2009 | Routley et al. |
| 2009/0150807 A1 | 6/2009 | George et al. |
| 2009/0153490 A1 | 6/2009 | Nymark et al. |
| 2009/0186628 A1 | 7/2009 | Yonker et al. |
| 2009/0221330 A1 | 9/2009 | Tomimori |
| 2009/0290369 A1 | 11/2009 | Schofield et al. |
| 2010/0030557 A1 | 2/2010 | Molloy et al. |
| 2010/0062740 A1 | 3/2010 | Ellis et al. |
| 2010/0145700 A1 | 6/2010 | Kennewick et al. |
| 2011/0136508 A1 | 6/2011 | Fomukong et al. |

FOREIGN PATENT DOCUMENTS

| | | |
|---|---|---|
| JP | H11/195137 A | 7/1999 |
| JP | 2002/252691 A1 | 9/2002 |
| JP | 2003/078977 A1 | 3/2003 |
| JP | 2003/228726 A1 | 8/2003 |
| JP | 2003/263656 A1 | 9/2003 |
| JP | 2005/216149 A1 | 8/2005 |
| WO | 03001457 A1 | 1/2003 |
| WO | 03096660 A1 | 11/2003 |

OTHER PUBLICATIONS

Casio, "Pocket PC User's Guide" published on Feb. 3, 2000.
Audiovox, "Pocket PC Phone User Manual" published on Mar. 19, 2004.
Palm, "Using your Treo" published in Feb. 2004.
Palm, "Palm Treo 600 Support Knowledge Library, Solution ID 29492" published in Jan. 2004.
Dataviz, "Documents to Go included on Treo 600 Smartphone from palmOne" published in Nov. 2003.
Palm, "Treo 600 smartphone" published in 2003.
FCC's wireless Enhanced 911 (E911) rules, Phase I and Phase II.

HI Corporation's company history (http://www.hicorp.co.jp/english/corporate/history.html) Copyright notice on the web: (c) 2007-2011 HI Corporation. All Rights Reserved.

HI Corporation to Offer 3D Graphics to Motorola Mobile Phone Platform Customers (http://www.wirelessdevnet.com/news/2003/203/news7.html) Published on the web on: Jul. 21, 2003.

Development of NTT docomo Mova N504i—NEC Gi-Ho (Technology Magazine) vol. 56 No. 5/2003, p. 144 Published in: May 2003.

Winners of Tokyo Venture Technology Grand Prize in 2000-2009 (http://www.sangyo-rodo.metro.tokyo.jp/shoko/sogyo/venture/2000-2009winners.pdf) Published in: 2000-2009.

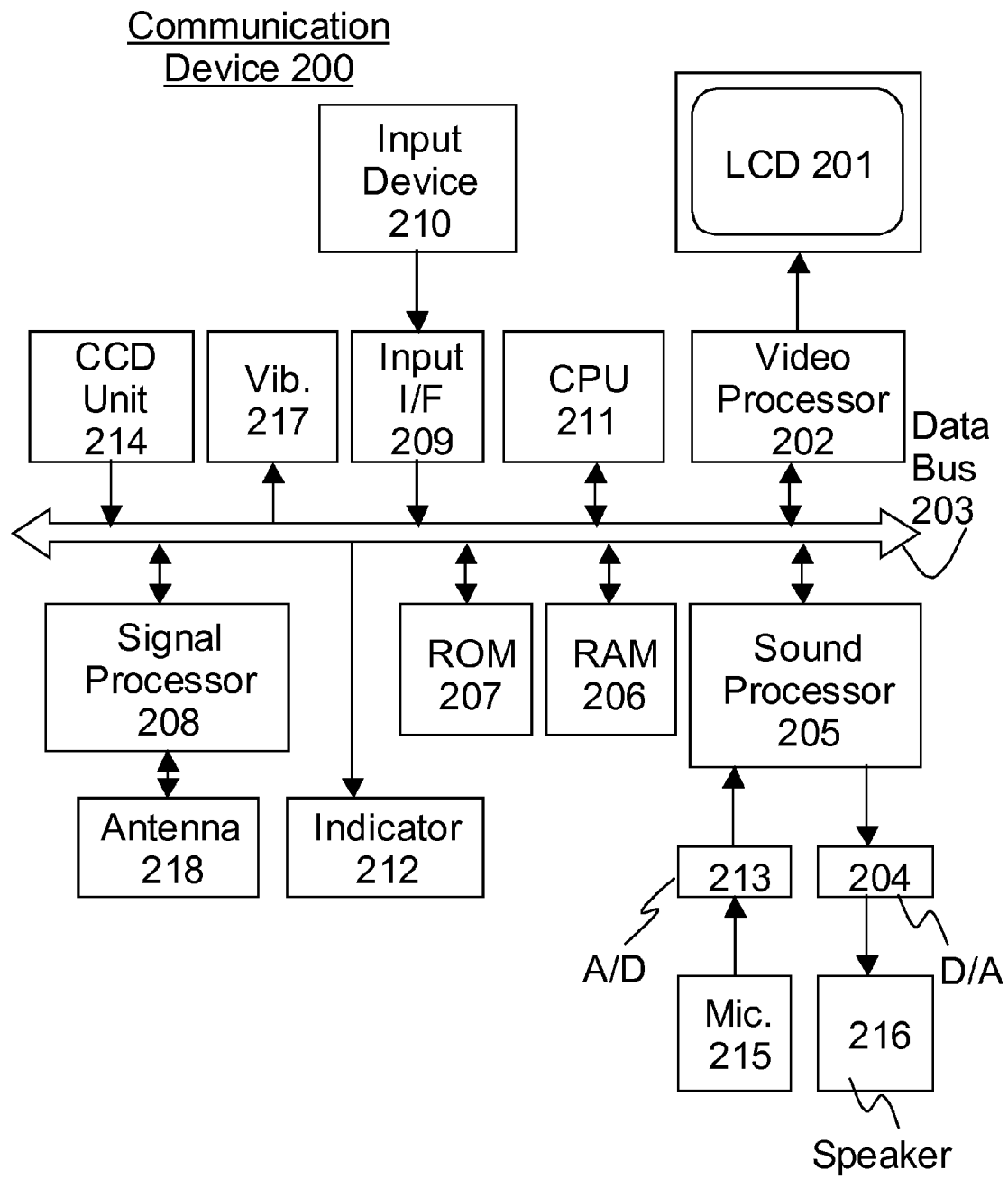

COMMUNICATION DEVICE

CROSS REFERENCE TO RELATED APPLICATIONS

This application is a continuation of U.S. Ser. No. 13/026,210 filed 2011 Feb. 12, which is a continuation of U.S. Ser. No. 12/344,306 filed 2008 Dec. 26, which is a continuation of U.S. Ser. No. 10/905,836 filed 2005 Jan. 22, which is a continuation of U.S. Ser. No. 10/711,265 filed 2004 Sep. 7, which claims the benefit of U.S. Provisional Application No. 60/481,695 filed 2003 Nov. 22, all of which are hereby incorporated herein by reference in their entirety.

BACKGROUND OF INVENTION

The invention relates to communication device and more particularly to the communication device which is capable to communicate with another communication device in a wireless fashion.

U.S. Patent Publication No. 20030013483 is introduced as prior art of the present invention of which the summary is the following: "A user interface includes a main screen segregated into various screen areas. At least one of the screen areas is devoted to a system application for displaying status icons, and another of the screen areas is devoted to an interface page which may or may not link to other interface pages which are used for displaying current or recent application information for respective user applications, which user applications may be accessed through interaction with the interface page. The application information may be application status information, recent communication messages (such as e-mail messages, SMS messages, or instant messaging messages) and/or one or more upcoming events or to do items for a user. The user interaction may occur through selection with a pointing device such as a stylus, a fingertip stylus, a finger, or one or more buttons, or even through voice commands. The user interface may also include an area reserved for displaying advertisements." However, this prior art does not disclose the mobile phone comprising a voice communication implementer, a caller's information displaying implementer, and a mobile phone updating implementer.

For the avoidance of doubt, the number of the prior arts introduced herein (and/or in IDS) may be of a large one, however, applicant has no intent to hide the more relevant prior art(s) in the less relevant ones.

SUMMARY OF INVENTION

It is an object of the present invention to provide a device capable to implement a plurality of functions.

It is another object of the present invention to provide merchandise to merchants attractive to the customers in the U.S.

It is another object of the present invention to provide mobility to the users of communication device.

It is another object of the present invention to provide more convenience to the customers in the U.S.

It is another object of the present invention to provide more convenience to the users of communication device or any tangible thing in which the communication device is fixedly or detachably (i.e., removably) installed.

It is another object of the present invention to overcome the shortcomings associated with the foregoing prior art.

The present invention introduces the mobile phone comprising a voice communication implementer, a caller's information displaying implementer, and a mobile phone updating implementer.

BRIEF DESCRIPTION OF DRAWINGS

The above and other aspects, features, and advantages of the invention will be better understood by reading the following more particular description of the invention, presented in conjunction with the following drawing, wherein:

FIG. 1 is a block diagram illustrating an exemplary embodiment of the present invention.

DETAILED DESCRIPTION

Paragraph [0020]—The following description is of the best presently contemplated mode of carrying out the present invention. This description is not to be taken in a limiting sense but is made merely for the purpose of describing the general principles of the invention. For example, each description of random access memory in this specification illustrate(s) only one function or mode in order to avoid complexity in its explanation, however, such description does not mean that only one function or mode can be implemented at a time. In other words, more than one function or mode can be implemented simultaneously by way of utilizing the same random access memory. In addition, the FIGURE number is cited after the elements in parenthesis in a manner for example 'RAM 206 (FIG. 1)'. It is done so merely to assist the readers to have a better understanding of this specification, and must not be used to limit the scope of the claims in any manner since the FIGURE numbers cited are not exclusive. There are only few data stored in each storage area described in this specification. This is done so merely to simplify the explanation and, thereby, to enable the reader of this specification to understand the content of each function with less confusion. Therefore, more than few data (hundreds and thousands of data, if necessary) of the same kind, not to mention, are preferred to be stored in each storage area to fully implement each function described herein. The scope of the invention should be determined by referencing the appended claims.

Paragraph [0021]—FIG. 1 is a simplified block diagram of the Communication Device 200 utilized in the present invention. Referring to FIG. 1, Communication Device 200 includes CPU 211 which controls and administers the overall function and operation of Communication Device 200. CPU 211 uses RAM 206 to temporarily store data and/or to perform calculation to perform its function, and to implement the present invention, modes, functions, and systems explained hereinafter. Video Processor 202 generates analog and/or digital video signals which are displayed on LCD 201. ROM 207 stores the data and programs which are essential to operate Communication Device 200. Wireless signals are received by Antenna 218 and processed by Signal Processor 208. Input signals are input by Input Device 210, such as a dial pad, a joystick, and/or a keypad, and the signals are transferred via Input Interface 209 and Data Bus 203 to CPU 211. Indicator 212 is an LED lamp which is designed to output different colors (e.g., red, blue, green, etc). Analog audio data is input to Microphone 215. A/D 213 converts the analog audio data into a digital format. Speaker 216 outputs analog audio data which is converted into an analog format from digital format by D/A 204. Sound Processor 205 produces digital audio signals that are transferred to D/A 204 and also processes the digital audio signals transferred from A/D 213. CCD Unit 214 captures video image which is stored in RAM 206 in a digital format. Vibrator 217 vibrates the entire device by the command from CPU 211.

Paragraph [0022]—As another embodiment, LCD 201 or LCD 201/Video Processor 202 may be separated from the other elements described in FIG. 1, and be connected in a wireless fashion to be wearable and/or head-mountable.

Paragraph [0023]—When Communication Device 200 is in the voice communication mode, the analog audio data input to Microphone 215 is converted to a digital format by A/D 213 and transmitted to another device via Antenna 218 in a wireless fashion after being processed by Signal Processor 208, and the wireless signal representing audio data which is received via Antenna 218 is output from Speaker 216 after being processed by Signal Processor 208 and converted to analog signal by D/A 204. For the avoidance of doubt, the definition of Communication Device 200 in this specification includes so-called 'PDA'. The definition of Communication Device 200 also includes in this specification any device which is mobile and/or portable and which is capable to send and/or receive audio data, text data, image data, video data, and/or other types of data in a wireless fashion via Antenna 218. The definition of Communication Device 200 further includes any micro device embedded or installed into devices and equipments (e.g., VCR, TV, tape recorder, heater, air conditioner, fan, clock, micro wave oven, dish washer, refrigerator, oven, washing machine, dryer, door, window, automobile, motorcycle, and modem) to remotely control these devices and equipments. The size of Communication Device 200 is irrelevant. Communication Device 200 may be installed in houses, buildings, bridges, boats, ships, submarines, airplanes, and spaceships, and firmly fixed therein.

Paragraph [0024]—This Paragraph [0024] illustrate(s) the elements of Communication Device 200. The elements of Communication Device 200 described in this Paragraph [0024] is identical to the ones described in FIG. 1, except Communication Device 200 has new element, i.e., LED 219. Here, LED 219 receives infra red signals from other wireless devices, which are transferred to CPU 211 via Data Bus 203. LED 219 also sends infra red signals in a wireless fashion which are composed by CPU 211 and transferred via Data Bus 203. As the second embodiment, LED 219 may be connected to Signal Processor 208. Here, LED 219 transfers the received infra red signals to Signal Processor 208, and Signal Processor 208 processes and converts the signals to a CPU readable format which are transferred to CPU 211 via Data Bus 203. The data produced by CPU 211 are processed by Signal Processor 208 and transferred to another device via LED 219 in a wireless fashion. The task of LED 219 is as same as that of Antenna 218 described in FIG. 1 except that LED 219 utilizes infra red signals for implementing wireless communication in the second embodiment. For the avoidance of doubt, the reference to FIG. 1 (e.g., referring to FIG. 1 in parenthesis) automatically refers to this Paragraph [0024] in this specification.

Paragraph [0025]—This Paragraph [0025] illustrate(s) the data stored in Host H. In the present embodiment, Host H includes Host Information Storage Area H00a which stores various types of data to assist and/or co-operate with Communication Device 200 to implement all modes, functions, and systems described in this specification. As another embodiment, Host H may be composed of a plurality of computers, i.e., one master computer and a plurality of slave computers, wherein the master computer is connected to the plurality of slave computers. As another embodiment, Host H may also be composed of a plurality of master computers by way of utilizing peer-to-peer connection.

Paragraph [0026]—<<Multiple Language Displaying Function>>

Paragraph [0027]—Paragraph [0028] through Paragraph [0076] illustrate the multiple language displaying function wherein a language is selected from a plurality of languages, such as English, Japanese, French, and German, which is utilized to operate Communication Device 200.

Paragraph [0028]—This Paragraph [0028] illustrates the storage area included in RAM 206 (FIG. 1). In the present embodiment, RAM 206 includes Multiple Language Displaying Info Storage Area 20654a of which the data and the software programs stored therein are described in Paragraph [0030].

Paragraph [0029]—The data and/or the software programs stored in Multiple Language Displaying Info Storage Area 20654a (Paragraph [0028]) may be downloaded from Host H (Paragraph [0025]).

Paragraph [0030]—This Paragraph [0030] illustrates the storage areas included in Multiple Language Displaying Info Storage Area 20654a (Paragraph [0028]). In the present embodiment, Multiple Language Displaying Info Storage Area 20654a includes Multiple Language Displaying Data Storage Area 20654b and Multiple Language Displaying Software Storage Area 20654c. Multiple Language Displaying Data Storage Area 20654b stores the data necessary to implement the present function, such as the ones described in Paragraph [0031] through Paragraph [0039]. Multiple Language Displaying Software Storage Area 20654c stores the software programs necessary to implement the present function, such as the ones described in Paragraph [0040].

Paragraph [0031]—This Paragraph [0031] illustrates the storage areas included in Multiple Language Displaying Data Storage Area 20654b (Paragraph [0030]). In the present embodiment, Multiple Language Displaying Data Storage Area 20654b includes Language Tables Storage Area 20654b1, Language Type Data Storage Area 20654b2, Language Item Data Storage Area 20654b3, and Selected Language Table ID Storage Area 20654b4. Language Tables Storage Area 20654b1 stores the data described in Paragraph [0032]. Language Type Data Storage Area 20654b2 stores the data described in Paragraph [0038]. Language Item Data Storage Area 20654b3 stores the data described in Paragraph [0039]. Selected Language Table ID Storage Area 20654b4 stores the language table ID selected in S4s of Paragraph [0042], Paragraph [0051], Paragraph [0060], and Paragraph [0069].

Paragraph [0032]—This Paragraph [0032] illustrates the storage areas included in Language Tables Storage Area 20654b1 (Paragraph [0031]). In the present embodiment, Language Tables Storage Area 20654b1 includes Language Table#1 Storage Area 20654b1a, Language Table#2 Storage Area 20654b1b, Language Table#3 Storage Area 20654b1c, and Language Table#4 Storage Area 20654b1d. Language Table#1 Storage Area 20654b1a stores the data described in Paragraph [0033]. Language Table#2 Storage Area 20654b1b stores the data described in Paragraph [0035]. Language Table#3 Storage Area 20654b1c stores the data described in Paragraph [0036]. Language Table#4 Storage Area 20654b1d stores the data described in Paragraph [0037].

Paragraph [0033]—This Paragraph [0033] illustrates the data stored in Language Table#1 Storage Area 20654b1a (Paragraph [0032]). In the present embodiment, Language Table#1 Storage Area 20654b1a comprises two columns, i.e., 'Language Item ID' and 'Language Text Data'. Column 'Language Item ID' stores the language item IDs, and each language item ID represents the identification of the corresponding language text data.

Paragraph [0034]—Column 'Language Text Data' stores the language text data, and each language text data represents the English text data displayed on LCD 201 (FIG. 1). In the present embodiment, Language Table#1 Storage Area 20654*b*1*a* stores the following data: the language item ID 'Language Item#1' and the corresponding language text data 'Open file'; the language item ID 'Language Item#2' and the corresponding language text data 'Close file'; the language item ID 'Language Item#3' and the corresponding language text data 'Delete'; the language item ID 'Language Item#4' and the corresponding language text data 'Copy'; the language item ID 'Language Item#5' and the corresponding language text data 'Cut'; the language item ID 'Language Item#6' and the corresponding language text data 'Paste'; the language item ID 'Language Item#7' and the corresponding language text data 'Insert'; the language item ID 'Language Item#8' and the corresponding language text data 'File'; the language item ID 'Language Item#9' and the corresponding language text data 'Edit'; the language item ID 'Language Item#10' and the corresponding language text data 'View'; the language item ID 'Language Item#11' and the corresponding language text data 'Format'; the language item ID 'Language Item#12' and the corresponding language text data 'Tools'; the language item ID 'Language Item#13' and the corresponding language text data 'Window'; the language item ID 'Language Item#14' and the corresponding language text data 'Help'; the language item ID 'Language Item#15' and the corresponding language text data 'My Network'; the language item ID 'Language Item#16' and the corresponding language text data 'Trash'; the language item ID 'Language Item#17' and the corresponding language text data 'Local Disk'; the language item ID 'Language Item#18' and the corresponding language text data 'Save'; the language item ID 'Language Item#19' and the corresponding language text data 'Yes'; the language item ID 'Language Item#20' and the corresponding language text data 'No'; and the language item ID 'Language Item#21' and the corresponding language text data 'Cancel'.

Paragraph [0035]—This Paragraph [0035] illustrates the data stored in Language Table#1 Storage Area 20654*b*1*b* (Paragraph [0032]). In the present embodiment, Language Table#1 Storage Area 20654*b*1*b* comprises two columns, i.e., 'Language Item ID' and 'Language Text Data'. Column 'Language Item ID' stores the language item IDs, and each language item ID represents the identification of the corresponding language text data. Column 'Language Text Data' stores the language text data, and each language text data represents the Japanese text data displayed on LCD 201 (FIG. 1). In the present embodiment, Language Table#1 Storage Area 20654*b*1*b* stores the following data: the language item ID 'Language Item#1' and the corresponding language text data meaning 'Open file' in Japanese; the language item ID 'Language Item#2' and the corresponding language text data meaning 'Close file' in Japanese; the language item ID 'Language Item#3' and the corresponding language text data meaning 'Delete' in Japanese; the language item ID 'Language Item#4' and the corresponding language text data meaning 'Copy' in Japanese; the language item ID 'Language Item#5' and the corresponding language text data meaning 'Cut' in Japanese; the language item ID 'Language Item#6' and the corresponding language text data meaning 'Paste' in Japanese; the language item ID 'Language Item#7' and the corresponding language text data meaning 'Insert' in Japanese; the language item ID 'Language Item#8' and the corresponding language text data meaning 'File' in Japanese; the language item ID 'Language Item#9' and the corresponding language text data meaning 'Edit' in Japanese; the language item ID 'Language Item#10' and the corresponding language text data meaning 'View' in Japanese; the language item ID 'Language Item#11' and the corresponding language text data meaning 'Format' in Japanese; the language item ID 'Language Item#12' and the corresponding language text data meaning Tools' in Japanese; the language item ID 'Language Item#13' and the corresponding language text data meaning 'Window' in Japanese; the language item ID 'Language Item#14' and the corresponding language text data meaning 'Help' in Japanese; the language item ID 'Language Item#15' and the corresponding language text data meaning 'My Network' in Japanese; the language item ID 'Language Item#16' and the corresponding language text data meaning 'Trash' in Japanese; the language item ID 'Language Item#17' and the corresponding language text data meaning 'Local Disk' in Japanese; the language item ID 'Language Item#18' and the corresponding language text data meaning 'Save' in Japanese; the language item ID 'Language Item#19' and the corresponding language text data meaning 'Yes' in Japanese; the language item ID 'Language Item#20' and the corresponding language text data meaning 'No' in Japanese; and the language item ID 'Language Item#21' and the corresponding language text data meaning 'Cancel' in Japanese.

Paragraph [0036]—This Paragraph [0036] illustrates the data stored in Language Table#1 Storage Area 20654*b*1*c* (Paragraph [0032]). In the present embodiment, Language Table#1 Storage Area 20654*b*1*c* comprises two columns, i.e., 'Language Item ID' and 'Language Text Data'. Column 'Language Item ID' stores the language item IDs, and each language item ID represents the identification of the corresponding language text data. Column 'Language Text Data' stores the language text data, and each language text data represents the French text data displayed on LCD 201 (FIG. 1). In the present embodiment, Language Table#1 Storage Area 20654*b*1*c* stores the following data: the language item ID 'Language Item#1' and the corresponding language text data 'French#1' meaning 'Open file' in French; the language item ID 'Language Item#2' and the corresponding language text data 'French#2' meaning 'Close file' in French; the language item ID 'Language Item#3' and the corresponding language text data 'French#3' meaning 'Delete' in French; the language item ID 'Language Item#4' and the corresponding language text data 'French#4' meaning 'Copy' in French; the language item ID 'Language Item#5' and the corresponding language text data 'French#5' meaning 'Cut' in French; the language item ID 'Language Item#6' and the corresponding language text data 'French#6' meaning 'Paste' in French; the language item ID 'Language Item#7' and the corresponding language text data 'French#7' meaning 'Insert' in French; the language item ID 'Language Item#8' and the corresponding language text data 'French#8' meaning 'File' in French; the language item ID 'Language Item#9' and the corresponding language text data 'French#9' meaning 'Edit' in French; the language item ID 'Language Item#10' and the corresponding language text data 'French#10' meaning 'View' in French; the language item ID 'Language Item#11' and the corresponding language text data 'French#11' meaning 'Format' in French; the language item ID 'Language Item#12' and the corresponding language text data 'French#12' meaning 'Tools' in French; the language item ID 'Language Item#13' and the corresponding language text data 'French#13' meaning 'Window' in French; the language item ID 'Language Item#14' and the corresponding language text data 'French#14' meaning 'Help' in French; the language item ID 'Language Item#15' and the corresponding language text data 'French#15' meaning 'My Network' in French; the language item ID 'Language Item#16' and the corresponding language text data 'French#16' meaning 'Trash' in French; the language item ID 'Language Item#17' and the corresponding language text data 'French#17' meaning 'Local Disk' in French; the language item ID 'Language Item#18' and the corresponding language text data 'French#18' meaning 'Save' in French; the language item ID 'Language Item#19' and the corresponding language text data 'French#19' meaning 'Yes' in French; the language item ID 'Language Item#20' and the corresponding language text data 'French#20' meaning 'No' in French; and the language item ID 'Language Item#21' and the corresponding language text data 'French#21' meaning 'Cancel' in French.

Paragraph [0037]—This Paragraph [0037] illustrates the data stored in Language Table#1 Storage Area 20654b1d (Paragraph [0032]). In the present embodiment, Language Table#1 Storage Area 20654b1d comprises two columns, i.e., 'Language Item ID' and 'Language Text Data'. Column 'Language Item ID' stores the language item IDs, and each language item ID represents the identification of the corresponding language text data. Column 'Language Text Data' stores the language text data, and each language text data represents the German text data displayed on LCD 201 (FIG. 1). In the present embodiment, Language Table#1 Storage Area 20654b1d stores the following data: the language item ID 'Language Item#1' and the corresponding language text data 'German#1' meaning 'Open file' in German; the language item ID 'Language Item#2' and the corresponding language text data 'German#2' meaning 'Close file' in German; the language item ID 'Language Item#3' and the corresponding language text data 'German#3' meaning 'Delete' in German; the language item ID 'Language Item#4' and the corresponding language text data 'German#4' meaning 'Copy' in German; the language item ID 'Language Item#5' and the corresponding language text data 'German#5' meaning 'Cut' in German; the language item ID 'Language Item#6' and the corresponding language text data 'German#6' meaning 'Paste' in German; the language item ID 'Language Item#7' and the corresponding language text data 'German#7' meaning 'Insert' in German; the language item ID 'Language Item#8' and the corresponding language text data 'German#8' meaning 'File' in German; the language item ID 'Language Item#9' and the corresponding language text data 'German#9' meaning 'Edit' in German; the language item ID 'Language Item#10' and the corresponding language text data 'German#10' meaning 'View' in German; the language item ID 'Language Item#11' and the corresponding language text data 'German#11' meaning 'Format' in German; the language item ID 'Language Item#12' and the corresponding language text data 'German#12' meaning 'Tools' in German; the language item ID 'Language Item#13' and the corresponding language text data 'German#13' meaning 'Window' in German; the language item ID 'Language Item#14' and the corresponding language text data 'German#14' meaning 'Help' in German; the language item ID 'Language Item#15' and the corresponding language text data 'German#15' meaning 'My Network' in German; the language item ID 'Language Item#16' and the corresponding language text data 'German#16' meaning 'Trash' in German; the language item ID 'Language Item#17' and the corresponding language text data 'German#17' meaning 'Local Disk' in German; the language item ID 'Language Item#18' and the corresponding language text data 'German#18' meaning 'Save' in German; the language item ID 'Language Item#19' and the corresponding language text data 'German#19' meaning 'Yes' in German; the language item ID 'Language Item#20' and the corresponding language text data 'German#20' meaning 'No' in German; and the language item ID 'Language Item#21' and the corresponding language text data 'German#21' meaning 'Cancel' in German.

Paragraph [0038]—This Paragraph [0038] illustrates data stored in Language Type Data Storage Area 20654b2 (Paragraph [0031]). In the present embodiment, Language Type Data Storage Area 20654b2 comprises two columns, i.e., 'Language Table ID' and 'Language Type Data'. Column 'Language Table ID' stores the language table ID, and each language table ID represents the identification of the storage areas included in Language Tables Storage Area 20654b1 (Paragraph [0032]). Column 'Language Type Data' stores the language type data, and each language type data represents the type of the language utilized in the language table of the corresponding language table ID. In the present embodiment, Language Type Data Storage Area 20654b2 stores the following data: the language table ID 'Language Table#1' and the corresponding language type data 'English'; the language table ID 'Language Table#2' and the corresponding language type data 'Japanese'; the language table ID 'Language Table#3' and the corresponding language type data 'French'; and the language table ID 'Language Table#4' and the corresponding language type data 'German' Here, the language table ID 'Language Table#1' is an identification of Language Table#1 Storage Area 20654b1a (Paragraph [0033]); the language table ID 'Language Table#2' is an identification of Language Table#2 Storage Area 20654b1b (Paragraph [0035]); the language table ID 'Language Table#3' is an identification of Language Table#3 Storage Area 20654b1c (Paragraph [0036]); and the language table ID 'Language Table#4' is an identification of Language Table#4 Storage Area 20654b1d (Paragraph [0037]).

Paragraph [0039]—This Paragraph [0039] illustrates the data stored in Language Item Data Storage Area 20654b3 (Paragraph [0031]). In the present embodiment, Language Item Data Storage Area 20654b3 comprises two columns, i.e., 'Language Item ID' and 'Language Item Data'. Column 'Language Item ID' stores the language item IDs, and each language item ID represents the identification of the corresponding language item data. Column 'Language Item Data' stores the language item data, and each language item data represents the content and/or the meaning of the language text data displayed on LCD 201 (FIG. 1). In the present embodiment, Language Item Data Storage Area 20654b3 stores the following data: the language item ID 'Language Item#1' and the corresponding language item data 'Open file'; the language item ID 'Language Item#2' and the corresponding language item data 'Close file'; the language item ID 'Language Item#3' and the corresponding language item data 'Delete'; the language item ID 'Language Item#4' and the corresponding language item data 'Copy'; the language item ID 'Language Item#5' and the corresponding language item data 'Cut'; the language item ID 'Language Item#6' and the corresponding language item data 'Paste'; the language item ID 'Language Item#7' and the corresponding language item data 'Insert'; the language item ID 'Language Item#8' and the corresponding language item data 'File'; the language item ID 'Language Item#9' and the corresponding language item data 'Edit'; the language item ID 'Language Item#10' and the corresponding language item data 'View'; the language item ID 'Language Item#11' and the corresponding language item data 'Format'; the language item ID 'Language Item#12' and the corresponding language item data 'Tools'; the language item ID 'Language Item#13' and the corresponding language item data 'Window'; the language item ID 'Language Item#14' and the corresponding language item data 'Help'; the language item ID 'Language Item#15' and the corresponding language item data 'My Network'; the language item ID 'Language Item#16' and the corresponding language item data 'Trash'; the language item ID 'Language Item#17' and the corresponding language item data 'Local Disk'; the language item ID 'Language Item#18' and the corresponding language item data 'Save'; the language item ID 'Language Item#19' and the corresponding language item data 'Yes'; the language item ID 'Language Item#20' and the corresponding language item data 'No'; and the language item ID 'Language Item#21' and the corresponding language item data 'Cancel'. Primarily, the data stored in column 'Language Item Data' are same as the ones stored in column 'Language Text Data' of Language Table#1 Storage Area 20654b1a (Paragraph [0033]).

Paragraph [0040]—This Paragraph [0040] illustrates the software program stored in Multiple Language Displaying Software Storage Area 20654c (Paragraph [0030]). In the present embodiment, Multiple Language Displaying Software Storage Area 20654c stores Language Selecting Software 20654c1, Selected Language Displaying Software 20654c2, Language Text Data Displaying Software For Word Processor 20654c3a, Language Text Data Displaying Software For Word Processor 20654c3b, and Language Text Data Displaying Software For Explorer 20654c4. Language Selecting Software 20654c1 is the software program described in Paragraph [0042], Paragraph [0051], Paragraph [0060], and Paragraph [0069]. Selected Language Displaying Software 20654c2 is the software program described in Paragraph [0043], Paragraph [0052], Paragraph [0061], and Paragraph [0070]. Language Text Data Displaying Software For Word Processor 20654c3a is the software program described in Paragraph [0044], Paragraph [0053], Paragraph [0062], and Paragraph [0071]. Language Text Data Displaying Software For Word Processor 20654c3b is the software program described in Paragraph [0046], Paragraph [0055], Paragraph [0064], and Paragraph [0073]. Language Text Data Displaying Software For Explorer 20654c4 is the software program described in Paragraph [0048], Paragraph [0057], Paragraph [0066], and Paragraph [0075].

Paragraph [0041]—<<Multiple Language Displaying Function—Utilizing English>>

Paragraph [0042]—This Paragraph [0042] illustrates Language Selecting Software 20654c1 stored in Multiple Language Displaying Software Storage Area 20654c (Paragraph [0040]) which selects the language utilized to operate Communication Device 200 from a plurality of languages. In the present embodiment, CPU 211 (FIG. 1) of Communication Device 200 retrieves the language type data from Language Type Data Storage Area 20654b2 (Paragraph [0038]) (S1), and Displays a list of available languages on LCD 201 (FIG. 1) (S2). In the present example, the following languages are displayed on LCD 201: English, Japanese, French, and German. A certain language is selected therefrom by utilizing Input Device 210 (FIG. 1) or via voice recognition system (S3). Assume that 'English' is selected in S3. CPU 211 then identifies the language table ID corresponding to the language type data in Language Type Data Storage Area 20654b2 (Paragraph [0038]), and stores the language table ID (Language Table#1) in Selected Language Table ID Storage Area 20654b4 (Paragraph [0031]) (S4).

Paragraph [0043]—This Paragraph [0043] illustrates Selected Language Displaying Software 20654c2 stored in Multiple Language Displaying Software Storage Area 20654c (Paragraph [0040]) which displays and operates with the language selected in S3 of Paragraph [0042] (i.e., English). In the present embodiment, when Communication Device 200 is powered on (S1), CPU 211 (FIG. 1) of Communication Device 200 retrieves the selected language table ID (Language Table#1) from Selected Language Table ID Storage Area 20654b4 (Paragraph [0031]) (S2). CPU 211 then identifies the storage area corresponding to the language table ID selected in S2 (Language Table#1 Storage Area 20654b1a (Paragraph [0033])) in Language Tables Storage Area 20654b1 (Paragraph [0032]) (S3). Language text data displaying process is initiated thereafter of which the details are described hereinafter (S4).

Paragraph [0044]—This Paragraph [0044] illustrates Language Text Data Displaying Software For Word Processor 20654c3a stored in Multiple Language Displaying Software Storage Area 20654c (Paragraph [0040]) which displays the language text data at the time a word processor, such as MS Word and WordPerfect is executed. In the present embodiment, CPU 211 (FIG. 1) of Communication Device 200 executes a word processor in response to the signal input by the user of Communication Device 200 indicating to activate and execute the word processor (S1). In the process of displaying the word processor on LCD 201 (FIG. 1), the following steps of S2 through S8 are implemented. Namely, CPU 211 identifies the language item ID 'Language Item#8' in Language Table#1 Storage Area 20654b1a (Paragraph [0033]) and displays the corresponding language text data 'File' at the predetermined location in the word processor (S2). CPU 211 identifies the language item ID 'Language Item#9' in Language Table#1 Storage Area 20654b1a (Paragraph [0033]) and displays the corresponding language text data 'Edit' at the predetermined location in the word processor (S3). CPU 211 identifies the language item ID 'Language Item#10' in Language Table#1 Storage Area 20654b1a (Paragraph [0033]) and displays the corresponding language text data 'View' at the predetermined location in the word processor (S4). CPU 211 identifies the language item ID 'Language Item#11' in Language Table#1 Storage Area 20654b1a (Paragraph [0033]) and displays the corresponding language text data 'Format' at the predetermined location in the word processor (S5). CPU 211 identifies the language item ID 'Language Item#12' in Language Table#1 Storage Area 20654b1a (Paragraph [0033]) and displays the corresponding language text data 'Tools' at the predetermined location in the word processor (S6). CPU 211 identifies the language item ID 'Language Item#13' in Language Table#1 Storage Area 20654b1a (Paragraph [0033]) and displays the corresponding language text data 'Window' at the predetermined location in the word processor (S7). CPU 211 identifies the language item ID 'Language Item#14' in Language Table#1 Storage Area 20654b1a (Paragraph [0033]) and displays the corresponding language text data 'Help' at the predetermined location in the word processor (S8). Alphanumeric data is input to the word processor by utilizing Input Device 210 (FIG. 1) or via voice recognition system thereafter (S9).

Paragraph [0045]—This Paragraph [0045] illustrates the data displayed on LCD 201 (FIG. 1) of Communication Device 200 at the time Language Text Data Displaying Software For Word Processor 20654c3a (Paragraph [0044]) is implemented. In the present embodiment, the word processor described in Paragraph [0044] is primarily composed of Menu Bar 20154MB and Alphanumeric Data Input Area 20154ADIA wherein the language text data described in S2 through S8 of Paragraph [0044] are displayed on Menu Bar 20154MB and alphanumeric data are input in Alphanumeric Data Input Area 20154ADIA. In the present embodiment, 20154MBF is the language text data processed in S2 of the previous paragraph; 20154MBE is the language text data processed in S3 of the previous paragraph; 20154MBV is the language text data processed in S4 of the previous paragraph; 20154MBF is the language text data processed in S5 of the previous paragraph; 20154MBT is the language text data processed in S6 of the previous paragraph; 20154MBW is the language text data processed in S7 of the previous paragraph; and 20154MBH is the language text data processed in S8 of the previous paragraph.

Paragraph [0046]—This Paragraph [0046] illustrates Language Text Data Displaying Software For Word Processor 20654c3b stored in Multiple Language Displaying Software Storage Area 20654c (Paragraph [0040]) which displays a prompt on LCD 201 (FIG. 1) at the time a word processor is closed. In the present embodiment, CPU 211 (FIG. 1) of Communication Device 200 initiates the closing process of the word processor in response to the signal input by the user of Communication Device 200 indicating to close the word processor (S1). In the process of closing the word processor, the following steps of S2 through S5 are implemented. Namely, CPU 211 identifies the language item ID 'Language Item#18' in Language Table#1 Storage Area 20654b1a (Paragraph [0033]) and displays the corresponding language text data 'Save' at the predetermined location in the word processor (S2). CPU 211 identifies the language item ID 'Language Item#19' in Language Table#1 Storage Area 20654b1a (Paragraph [0033]) and displays the corresponding language text data 'Yes' at the predetermined location in the word processor (S3). CPU 211 identifies the language item ID 'Language Item#20' in Language Table#1 Storage Area 20654b1a (Paragraph [0033]) and displays the corresponding language text data 'No' at the predetermined location in the word processor (S4). CPU 211 identifies the language item ID 'Language Item#21' in Language Table#1 Storage Area 20654b1a (Paragraph [0033]) and displays the corresponding language text data 'Cancel' at the predetermined location in the word processor (S5). The save signal indicating to save the alphanumeric data input in S9 of Paragraph [0044] is input by utilizing Input Device 210 (FIG. 1) or via voice recognition system, assuming that the user of Communication Device 200 intends to save the data (S6), and the data are saved in a predetermined location in RAM 206 (FIG. 1) (S7). The word processor is closed thereafter (S8).

Paragraph [0047]—This Paragraph [0047] illustrates the data displayed on LCD 201 (FIG. 1) of Communication Device 200 at the time Language Text Data Displaying Software For Word Processor 20654c3b (Paragraph [0046]) is implemented. In the present embodiment, Prompt 20154Pr is displayed on LCD 201 (FIG. 1) at the time Language Text Data Displaying Software For Word Processor 20654c3a (Paragraph [0044]) is closed. In the present embodiment, Prompt 20154Pr is primarily composed of 20154PrS, 20154PrY, 20154PrN, and 20154PrC. In the present embodiment, 20154PrS is the language text data processed in S2 of the previous paragraph; 20154PrY is the language text data processed in S3 of the previous paragraph; 20154PrN is the language text data processed in S4 of the previous paragraph; and 20154PrC is the language text data processed in S5 of the previous paragraph.

Paragraph [0048]—This Paragraph [0048] illustrates Language Text Data Displaying Software For Explorer 20654c4 stored in Multiple Language Displaying Software Storage Area 20654c (Paragraph [0040]) which displays the language text data at the time a Windows Explorer like software program which displays folders and/or directories and the structures thereof is executed. In the present embodiment, CPU 211 (FIG. 1) of Communication Device 200 executes Windows Explorer like software program in response to the signal input by the user of Communication Device 200 indicating to activate and execute the software program (S1). In the process of displaying the Windows Explorer like software program on LCD 201 (FIG. 1), the steps of S2 through S4 are implemented. Namely, CPU 211 identifies the language item ID 'Language Item#15' in Language Table#1 Storage Area 20654b1a (Paragraph [0033]) and displays the corresponding language text data 'My Network' at the predetermined location in the Windows Explorer like software program (S2). CPU 211 identifies the language item ID 'Language Item#16' in Language Table#1 Storage Area 20654b1a (Paragraph [0033]) and displays the corresponding language text data 'Trash' at the predetermined location in the Windows Explorer like software program (S3). CPU 211 identifies the language item ID 'Language Item#17' in Language Table#1 Storage Area 20654b1a (Paragraph [0033]) and displays the corresponding language text data 'Local Disk' at the predetermined location in the Windows Explorer like software program (S4).

Paragraph [0049]—This Paragraph [0049] illustrates the data displayed on LCD 201 (FIG. 1) of Communication Device 200 at the time Language Text Data Displaying Software For Explorer 20654c4 (Paragraph [0048]) is executed. In the present embodiment, 20154LD, 20154MN, and 20154Tr are displayed on LCD 201 (FIG. 1) at the time Language Text Data Displaying Software For Explorer 20654c4 is executed. In the present embodiment, 20154LD is the language text data processed in S4 of the previous paragraph; 20154MN is the language text data processed in S2 of the previous paragraph; and 20154Tr is the language text data processed in S3 of the previous paragraph.

Paragraph [0050]—<<Multiple Language Displaying Function—Utilizing Japanese>>

Paragraph [0051]—This Paragraph [0051] illustrates Language Selecting Software 20654c1 stored in Multiple Language Displaying Software Storage Area 20654c (Paragraph [0040]) which selects the language utilized to operate Communication Device 200 from a plurality of languages. In the present embodiment, CPU 211 (FIG. 1) of Communication Device 200 retrieves the language type data from Language Type Data Storage Area 20654b2 (Paragraph [0038]) (S1), and Displays a list of available languages on LCD 201 (FIG. 1) (S2). In the present example, the following languages are displayed on LCD 201: English, Japanese, French, and German. A certain language is selected therefrom by utilizing Input Device 210 (FIG. 1) or via voice recognition system (S3). Assume that 'Japanese' is selected in S3. CPU 211 then identifies the language table ID corresponding to the language type data in Language Type Data Storage Area 20654b2 (Paragraph [0038]), and stores the language table ID (Language Table#2) in Selected Language Table ID Storage Area 20654b4 (Paragraph [0031]) (S4).

Paragraph [0052]—This Paragraph [0052] illustrates Selected Language Displaying Software 20654c2 stored in Multiple Language Displaying Software Storage Area 20654c (Paragraph [0040]) which displays and operates with the language selected in S3 of Paragraph [0051] (i.e., Japanese). In the present embodiment, when Communication Device 200 is powered on (S1), CPU 211 (FIG. 1) of Communication Device 200 retrieves the selected language table ID (Language Table#2) from Selected Language Table ID Storage Area 20654b4 (Paragraph [0031]) (S2). CPU 211 then identifies the storage area corresponding to the language table ID selected in S2 (Language Table#2 Storage Area 20654b1b (Paragraph [0035])) in Language Tables Storage Area 20654b1 (Paragraph [0032]) (S3). Language text data displaying process is initiated thereafter of which the details are described hereinafter (S4).

Paragraph [0053]—This Paragraph [0053] illustrates Language Text Data Displaying Software For Word Processor

20654*c*3*a* stored in Multiple Language Displaying Software Storage Area 20654*c* (Paragraph [0040]) which displays the language text data at the time a word processor, such as MS Word and WordPerfect is executed. In the present embodiment, CPU 211 (FIG. 1) of Communication Device 200 executes a word processor in response to the signal input by the user of Communication Device 200 indicating to activate and execute the word processor (S1). In the process of displaying the word processor on LCD 201 (FIG. 1), the following steps of S2 through S8 are implemented. Namely, CPU 211 identifies the language item ID 'Language Item#8' in Language Table#2 Storage Area 20654*b*1*b* (Paragraph [0035]) and displays the corresponding language text data indicating 'File' in Japanese at the predetermined location in the word processor (S2). CPU 211 identifies the language item ID 'Language Item#9' in Language Table#2 Storage Area 20654*b*1*b* (Paragraph [0035]) and displays the corresponding language text data indicating 'Edit' in Japanese at the predetermined location in the word processor (S3). CPU 211 identifies the language item ID 'Language Item#10' in Language Table#2 Storage Area 20654*b*1*b* (Paragraph [0035]) and displays the corresponding language text data indicating 'View' in Japanese at the predetermined location in the word processor (S4). CPU 211 identifies the language item ID 'Language Item#11' in Language Table#2 Storage Area 20654*b*1*b* (Paragraph [0035]) and displays the corresponding language text data indicating 'Format' in Japanese at the predetermined location in the word processor (S5). CPU 211 identifies the language item ID 'Language Item#12' in Language Table#2 Storage Area 20654*b*1*b* (Paragraph [0035]) and displays the corresponding language text data indicating 'Tools' in Japanese at the predetermined location in the word processor (S6). CPU 211 identifies the language item ID 'Language Item#13' in Language Table#2 Storage Area 20654*b*1*b* (Paragraph [0035]) and displays the corresponding language text data indicating 'Window' in Japanese at the predetermined location in the word processor (S7). CPU 211 identifies the language item ID 'Language Item#14' in Language Table#2 Storage Area 20654*b*1*b* (Paragraph [0035]) and displays the corresponding language text data indicating 'Help' in Japanese at the predetermined location in the word processor (S8). Alphanumeric data is input to the word processor by utilizing Input Device 210 (FIG. 1) or via voice recognition system thereafter (S9).

Paragraph [0054]—This Paragraph [0054] illustrates the data displayed on LCD 201 (FIG. 1) of Communication Device 200 at the time Language Text Data Displaying Software For Word Processor 20654*c*3*a* (Paragraph [0053]) is implemented. In the present embodiment, the word processor described in Paragraph [0053] is primarily composed of Menu Bar 20154MB and Alphanumeric Data Input Area 20154ADIA wherein the language text data described in S2 through S8 of Paragraph [0053] are displayed on Menu Bar 20154MB and alphanumeric data are input in Alphanumeric Data Input Area 20154ADIA. In the present embodiment, 20154MBF is the language text data processed in S2 of the previous paragraph; 20154MBE is the language text data processed in S3 of the previous paragraph; 20154MBV is the language text data processed in S4 of the previous paragraph; 20154MBF is the language text data processed in S5 of the previous paragraph; 20154MBT is the language text data processed in S6 of the previous paragraph; 20154MBW is the language text data processed in S7 of the previous paragraph; and 20154MBH is the language text data processed in S8 of the previous paragraph.

Paragraph [0055]—This Paragraph [0055] illustrates Language Text Data Displaying Software For Word Processor 20654*c*3*b* stored in Multiple Language Displaying Software Storage Area 20654*c* (Paragraph [0040]) which displays a prompt on LCD 201 (FIG. 1) at the time a word processor is closed. In the present embodiment, CPU 211 (FIG. 1) of Communication Device 200 initiates the closing process of the word processor in response to the signal input by the user of Communication Device 200 indicating to close the word processor (S1). In the process of closing the word processor, the following steps of S2 through S5 are implemented. Namely, CPU 211 identifies the language item ID 'Language Item#18' in Language Table#2 Storage Area 20654*b*1*b* (Paragraph [0035]) and displays the corresponding language text data indicating 'Save' in Japanese at the predetermined location in the word processor (S2). CPU 211 identifies the language item ID 'Language Item#19' in Language Table#2 Storage Area 20654*b*1*b* (Paragraph [0035]) and displays the corresponding language text data indicating 'Yes' in Japanese at the predetermined location in the word processor (S3). CPU 211 identifies the language item ID 'Language Item#20' in Language Table#2 Storage Area 20654*b*1*b* (Paragraph [0035]) and displays the corresponding language text data indicating 'No' in Japanese at the predetermined location in the word processor (S4). CPU 211 identifies the language item ID 'Language Item#21' in Language Table#2 Storage Area 20654*b*1*b* (Paragraph [0035]) and displays the corresponding language text data indicating 'Cancel' in Japanese at the predetermined location in the word processor (S5). The save signal indicating to save the alphanumeric data input in S9 of Paragraph [0053] is input by utilizing Input Device 210 (FIG. 1) or via voice recognition system, assuming that the user of Communication Device 200 intends to save the data (S6), and the data are saved in a predetermined location in RAM 206 (FIG. 1) (S7). The word processor is closed thereafter (S8).

Paragraph [0056]—This Paragraph [0056] illustrates the data displayed on LCD 201 (FIG. 1) of Communication Device 200 at the time Language Text Data Displaying Software For Word Processor 20654*c*3*b* (Paragraph [0055]) is implemented. In the present embodiment, Prompt 20154Pr is displayed on LCD 201 (FIG. 1) at the time Language Text Data Displaying Software For Word Processor 20654*c*3*a* (Paragraph [0053]) is closed. In the present embodiment, Prompt 20154Pr is primarily composed of 20154PrS, 20154PrY, 20154PrN, and 20154PrC. In the present embodiment, 20154PrS is the language text data processed in S2 of the previous paragraph; 20154PrY is the language text data processed in S3 of the previous paragraph; 20154PrN is the language text data processed in S4 of the previous paragraph; and 20154PrC is the language text data processed in S5 of the previous paragraph.

Paragraph [0057]—This Paragraph [0057] illustrates Language Text Data Displaying Software For Explorer 20654*c*4 stored in Multiple Language Displaying Software Storage Area 20654*c* (Paragraph [0040]) which displays the language text data at the time a Windows Explorer like software program which displays folders and/or directories and the structures thereof is executed. In the present embodiment, CPU 211 (FIG. 1) of Communication Device 200 executes Windows Explorer like software program in response to the signal input by the user of Communication Device 200 indicating to activate and execute the software program (S1). In the process of displaying the Windows Explorer like software program on LCD 201 (FIG. 1), the following steps of S2 through S4 are implemented. Namely, CPU 211 identifies the language item ID 'Language Item#15' in Language Table#2 Storage Area 20654*b*1*b* (Paragraph [0035]) and displays the corresponding language text data indicating 'My Network' in Japanese at the predetermined location in the Windows Explorer like software program (S2). CPU 211 identifies the language item ID 'Language Item#16' in Language Table#2 Storage Area 20654b1b (Paragraph [0035]) and displays the corresponding language text data indicating 'Trash' in Japanese at the predetermined location in the Windows Explorer like software program (S3). CPU 211 identifies the language item ID 'Language Item#17' in Language Table#2 Storage Area 20654b1b (Paragraph [0035]) and displays the corresponding language text data indicating 'Local Disk' in Japanese at the predetermined location in the Windows Explorer like software program (S4).

Paragraph [0058]—This Paragraph [0058] illustrates the data displayed on LCD 201 (FIG. 1) of Communication Device 200 at the time Language Text Data Displaying Software For Explorer 20654c4 (Paragraph [0057]) is executed. In the present embodiment, 20154LD, 20154MN, and 20154Tr are displayed on LCD 201 (FIG. 1) at the time Language Text Data Displaying Software For Explorer 20654c4 is executed. In the present embodiment, 20154LD is the language text data processed in S4 of the previous paragraph; 20154MN is the language text data processed in S2 of the previous paragraph; and 20154Tr is the language text data processed in S3 of the previous paragraph.

Paragraph [0059]—<<Multiple Language Displaying Function—Utilizing French>>

Paragraph [0060]—This Paragraph [0060] illustrates Language Selecting Software 20654c1 stored in Multiple Language Displaying Software Storage Area 20654c (Paragraph [0040]) which selects the language utilized to operate Communication Device 200 from a plurality of languages. In the present embodiment, CPU 211 (FIG. 1) of Communication Device 200 retrieves the language type data from Language Type Data Storage Area 20654b2 (Paragraph [0038]) (S1), and Displays a list of available languages on LCD 201 (FIG. 1) (S2). In the present example, the following languages are displayed on LCD 201: English, Japanese, French, and German. A certain language is selected therefrom by utilizing Input Device 210 (FIG. 1) or via voice recognition system (S3). Assume that 'French' is selected in S3. CPU 211 then identifies the language table ID corresponding to the language type data in Language Type Data Storage Area 20654b2 (Paragraph [0038]), and stores the language table ID (Language Table#3) in Selected Language Table ID Storage Area 20654b4 (Paragraph [0031]) (S4).

Paragraph [0061]—This Paragraph [0061] illustrates Selected Language Displaying Software 20654c2 stored in Multiple Language Displaying Software Storage Area 20654c (Paragraph [0040]) which displays and operates with the language selected in S3 of Paragraph [0060] (i.e., French). In the present embodiment, when Communication Device 200 is powered on (S1), CPU 211 (FIG. 1) of Communication Device 200 retrieves the selected language table ID (Language Table#3) from Selected Language Table ID Storage Area 20654b4 (Paragraph [0031]) (S2). CPU 211 then identifies the storage area corresponding to the language table ID selected in S2 (Language Table#3 Storage Area 20654b1c (Paragraph [0036])) in Language Tables Storage Area 20654b1 (Paragraph [0032]) (S3). Language text data displaying process is initiated thereafter of which the details are described hereinafter (S4).

Paragraph [0062]—This Paragraph [0062] illustrates Language Text Data Displaying Software For Word Processor 20654c3a stored in Multiple Language Displaying Software Storage Area 20654c (Paragraph [0040]) which displays the language text data at the time a word processor, such as MS Word and WordPerfect is executed. In the present embodiment, CPU 211 (FIG. 1) of Communication Device 200 executes a word processor in response to the signal input by the user of Communication Device 200 indicating to activate and execute the word processor (S1). In the process of displaying the word processor on LCD 201 (FIG. 1), the following steps of S2 through S8 are implemented. Namely, CPU 211 identifies the language item ID 'Language Item#8' in Language Table#3 Storage Area 20654b1c (Paragraph [0036]) and displays the corresponding language text data 'French#8' indicating 'File' in French at the predetermined location in the word processor (S2). CPU 211 identifies the language item ID 'Language Item#9' in Language Table#3 Storage Area 20654b1c (Paragraph [0036]) and displays the corresponding language text data 'French#9' indicating 'Edit' in French at the predetermined location in the word processor (S3). CPU 211 identifies the language item ID 'Language Item#10' in Language Table#3 Storage Area 20654b1c (Paragraph [0036]) and displays the corresponding language text data 'French#10' indicating 'View' in French at the predetermined location in the word processor (S4). CPU 211 identifies the language item ID 'Language Item#11' in Language Table#3 Storage Area 20654b1c (Paragraph [0036]) and displays the corresponding language text data 'French#11' indicating 'Format' in French at the predetermined location in the word processor (S5). CPU 211 identifies the language item ID 'Language Item#12' in Language Table#3 Storage Area 20654b1c (Paragraph [0036]) and displays the corresponding language text data 'French#12' indicating 'Tools' in French at the predetermined location in the word processor (S6). CPU 211 identifies the language item ID 'Language Item#13' in Language Table#3 Storage Area 20654b1c (Paragraph [0036]) and displays the corresponding language text data 'French#13' indicating 'Window' in French at the predetermined location in the word processor (S7). CPU 211 identifies the language item ID 'Language Item#14' in Language Table#3 Storage Area 20654b1c (Paragraph [0036]) and displays the corresponding language text data 'French#14' indicating 'Help' in French at the predetermined location in the word processor (S 8). Alphanumeric data is input to the word processor by utilizing Input Device 210 (FIG. 1) or via voice recognition system thereafter (S9).

Paragraph [0063]—This Paragraph [0063] illustrates the data displayed on LCD 201 (FIG. 1) of Communication Device 200 at the time Language Text Data Displaying Software For Word Processor 20654c3a (Paragraph [0062]) is implemented. In the present embodiment, the word processor described in Paragraph [0062] is primarily composed of Menu Bar 20154MB and Alphanumeric Data Input Area 20154ADIA wherein the language text data described in S2 through S8 of Paragraph [0062] are displayed on Menu Bar 20154MB and alphanumeric data are input in Alphanumeric Data Input Area 20154ADIA. In the present embodiment, 20154MBF is the language text data processed in S2 of the previous paragraph; 20154MBE is the language text data processed in S3 of the previous paragraph; 20154MBV is the language text data processed in S4 of the previous paragraph; 20154MBF is the language text data processed in S5 of the previous paragraph; 20154MBT is the language text data processed in S6 of the previous paragraph; 20154MBW is the language text data processed in S7 of the previous paragraph; and 20154MBH is the language text data processed in S8 of the previous paragraph.

Paragraph [0064]—This Paragraph [0064] illustrates Language Text Data Displaying Software For Word Processor 20654c3b stored in Multiple Language Displaying Software Storage Area 20654c (Paragraph [0040]) which displays a prompt on LCD 201 (FIG. 1) at the time a word processor is closed. In the present embodiment, CPU 211 (FIG. 1) of Communication Device 200 initiates the closing process of the word processor in response to the signal input by the user of Communication Device 200 indicating to close the word processor (S1). In the process of closing the word processor, the following steps of S2 through S5 are implemented. Namely, CPU 211 identifies the language item ID 'Language Item#18' in Language Table#3 Storage Area 20654b1c (Paragraph [0036]) and displays the corresponding language text data 'French#18' indicating 'Save' in French at the predetermined location in the word processor (S2). CPU 211 identifies the language item ID 'Language Item#19' in Language Table#3 Storage Area 20654b1c (Paragraph [0036]) and displays the corresponding language text data 'French#19' indicating 'Yes' in French at the predetermined location in the word processor (S3). CPU 211 identifies the language item ID 'Language Item#20' in Language Table#3 Storage Area 20654b1c (Paragraph [0036]) and displays the corresponding language text data 'French#20' indicating 'No' in French at the predetermined location in the word processor (S4). CPU 211 identifies the language item ID 'Language Item#21' in Language Table#3 Storage Area 20654b1c (Paragraph [0036]) and displays the corresponding language text data 'French#21' indicating 'Cancel' in French at the predetermined location in the word processor (S5). The save signal indicating to save the alphanumeric data input in S9 of Paragraph [0062] is input by utilizing Input Device 210 (FIG. 1) or via voice recognition system, assuming that the user of Communication Device 200 intends to save the data (S6), and the data are saved in a predetermined location in RAM 206 (FIG. 1) (S7). The word processor is closed thereafter (S8).

Paragraph [0065]—This Paragraph [0065] illustrates the data displayed on LCD 201 (FIG. 1) of Communication Device 200 at the time Language Text Data Displaying Software For Word Processor 20654c3b (Paragraph [0064]) is implemented. In the present embodiment, Prompt 20154Pr is displayed on LCD 201 (FIG. 1) at the time Language Text Data Displaying Software For Word Processor 20654c3a (Paragraph [0062]) is closed. In the present embodiment, Prompt 20154Pr is primarily composed of 20154PrS, 20154PrY, 20154PrN, and 20154PrC. In the present embodiment, 20154PrS is the language text data processed in S2 of the previous paragraph; 20154PrY is the language text data processed in S3 of the previous paragraph; 20154PrN is the language text data processed in S4 of the previous paragraph; and 20154PrC is the language text data processed in S5 of the previous paragraph.

Paragraph [0066]—This Paragraph [0066] illustrates Language Text Data Displaying Software For Explorer 20654c4 stored in Multiple Language Displaying Software Storage Area 20654c (Paragraph [0040]) which displays the language text data at the time a Windows Explorer like software program which displays folders and/or directories and the structures thereof is executed. In the present embodiment, CPU 211 (FIG. 1) of Communication Device 200 executes Windows Explorer like software program in response to the signal input by the user of Communication Device 200 indicating to activate and execute the software program (S1). In the process of displaying the Windows Explorer like software program on LCD 201 (FIG. 1), the following steps of S2 through S4 are implemented. Namely, CPU 211 identifies the language item ID 'Language Item#15' in Language Table#3 Storage Area 20654b1c (Paragraph [0036]) and displays the corresponding language text data 'French#15' indicating 'My Network' in French at the predetermined location in the Windows Explorer like software program (S2). CPU 211 identifies the language item ID 'Language Item#16' in Language Table#3 Storage Area 20654b1c (Paragraph [0036]) and displays the corresponding language text data 'French#16' indicating 'Trash' in French at the predetermined location in the Windows Explorer like software program (S3). CPU 211 identifies the language item ID 'Language Item#17' in Language Table#3 Storage Area 20654b1c (Paragraph [0036]) and displays the corresponding language text data 'French#17' indicating 'Local Disk' in French at the predetermined location in the Windows Explorer like software program (S4).

Paragraph [0067]—This Paragraph [0067] illustrates the data displayed on LCD 201 (FIG. 1) of Communication Device 200 at the time Language Text Data Displaying Software For Explorer 20654c4 (Paragraph [0066]) is executed. In the present embodiment, 20154LD, 20154MN, and 20154Tr are displayed on LCD 201 (FIG. 1) at the time Language Text Data Displaying Software For Explorer 20654c4 is executed. In the present embodiment, 20154LD is the language text data processed in S4 of the previous paragraph; 20154MN is the language text data processed in S2 of the previous paragraph; and 20154Tr is the language text data processed in S3 of the previous paragraph.

Paragraph [0068]—<<Multiple Language Displaying Function—Utilizing German>>

Paragraph [0069]—This Paragraph [0069] illustrates Language Selecting Software 20654c1 stored in Multiple Language Displaying Software Storage Area 20654c (Paragraph [0040]) which selects the language utilized to operate Communication Device 200 from a plurality of languages. In the present embodiment, CPU 211 (FIG. 1) of Communication Device 200 retrieves the language type data from Language Type Data Storage Area 20654b2 (Paragraph [0038]) (S1), and Displays a list of available languages on LCD 201 (FIG. 1) (S2). In the present example, the following languages are displayed on LCD 201: English, Japanese, French, and German. A certain language is selected therefrom by utilizing Input Device 210 (FIG. 1) or via voice recognition system (S3). Assume that 'German' is selected in S3. CPU 211 then identifies the language table ID corresponding to the language type data in Language Type Data Storage Area 20654b2 (Paragraph [0038]), and stores the language table ID (Language Table#4) in Selected Language Table ID Storage Area 20654b4 (Paragraph [0031]) (S4).

Paragraph [0070]—This Paragraph [0070] illustrates Selected Language Displaying Software 20654c2 stored in Multiple Language Displaying Software Storage Area 20654c (Paragraph [0040]) which displays and operates with the language selected in S3 of Paragraph [0069] (i.e., German). In the present embodiment, when Communication Device 200 is powered on (S1), CPU 211 (FIG. 1) of Communication Device 200 retrieves the selected language table ID (Language Table#4) from Selected Language Table ID Storage Area 20654b4 (Paragraph [0031]) (S2). CPU 211 then identifies the storage area corresponding to the language table ID selected in S2 (Language Table#4 Storage Area 20654b1d (Paragraph [0037])) in Language Tables Storage Area 20654b1 (Paragraph [0032]) (S3). Language text data displaying process is initiated thereafter of which the details are described hereinafter (S4).

Paragraph [0071]—This Paragraph [0071] illustrates Language Text Data Displaying Software For Word Processor 20654c3a stored in Multiple Language Displaying Software Storage Area 20654c (Paragraph [0040]) which displays the language text data at the time a word processor, such as MS Word and WordPerfect is executed. In the present embodiment, CPU 211 (FIG. 1) of Communication Device 200 executes a word processor in response to the signal input by the user of Communication Device 200 indicating to activate and execute the word processor (S1). In the process of displaying the word processor on LCD 201 (FIG. 1), the following steps of S2 through S8 are implemented. Namely, CPU 211 identifies the language item ID 'Language Item#8' in Language Table#4 Storage Area 20654b1d (Paragraph [0037]) and displays the corresponding language text data 'German#8' indicating 'File' in German at the predetermined location in the word processor (S2). CPU 211 identifies the language item ID 'Language Item#9' in Language Table#4 Storage Area 20654b1d (Paragraph [0037]) and displays the corresponding language text data 'German#9' indicating 'Edit' in German at the predetermined location in the word processor (S3). CPU 211 identifies the language item ID 'Language Item#10' in Language Table#4 Storage Area 20654b1d (Paragraph [0037]) and displays the corresponding language text data 'German#10' indicating 'View' in German at the predetermined location in the word processor (S4). CPU 211 identifies the language item ID 'Language Item#11' in Language Table#4 Storage Area 20654b1d (Paragraph [0037]) and displays the corresponding language text data 'German#11' indicating 'Format' in German at the predetermined location in the word processor (S5). CPU 211 identifies the language item ID 'Language Item#12' in Language Table#4 Storage Area 20654b1d (Paragraph [0037]) and displays the corresponding language text data 'German#12' indicating 'Tools' in German at the predetermined location in the word processor (S6). CPU 211 identifies the language item ID 'Language Item#13' in Language Table#4 Storage Area 20654b1d (Paragraph [0037]) and displays the corresponding language text data 'German#13' indicating 'Window' in German at the predetermined location in the word processor (S7). CPU 211 identifies the language item ID 'Language Item#14' in Language Table#4 Storage Area 20654b1d (Paragraph [0037]) and displays the corresponding language text data 'German#14' indicating 'Help' in German at the predetermined location in the word processor (S8). Alphanumeric data is input to the word processor by utilizing Input Device 210 (FIG. 1) or via voice recognition system thereafter (S9).

Paragraph [0072]—This Paragraph [0072] illustrates the data displayed on LCD 201 (FIG. 1) of Communication Device 200 at the time Language Text Data Displaying Software For Word Processor 20654c3a (Paragraph [0071]) is implemented. In the present embodiment, the word processor described in Paragraph [0071] is primarily composed of Menu Bar 20154MB and Alphanumeric Data Input Area 20154ADIA wherein the language text data described in S2 through S8 of Paragraph [0071] are displayed on Menu Bar 20154MB and alphanumeric data are input in Alphanumeric Data Input Area 20154ADIA. In the present embodiment, 20154MBF is the language text data processed in S2 of the previous paragraph; 20154MBE is the language text data processed in S3 of the previous paragraph; 20154MBV is the language text data processed in S4 of the previous paragraph; 20154MBF is the language text data processed in S5 of the previous paragraph; 20154MBT is the language text data processed in S6 of the previous paragraph; 20154MBW is the language text data processed in S7 of the previous paragraph; and 20154MBH is the language text data processed in S8 of the previous paragraph.

Paragraph [0073]—This Paragraph [0073] illustrates Language Text Data Displaying Software For Word Processor 20654c3b stored in Multiple Language Displaying Software Storage Area 20654c (Paragraph [0040]) which displays a prompt on LCD 201 (FIG. 1) at the time a word processor is closed. In the present embodiment, CPU 211 (FIG. 1) of Communication Device 200 initiates the closing process of the word processor in response to the signal input by the user of Communication Device 200 indicating to close the word processor (S1). In the process of closing the word processor, the following steps of S2 through S5 are implemented. Namely, CPU 211 identifies the language item ID 'Language Item#18' in Language Table#4 Storage Area 20654b1d (Paragraph [0037]) and displays the corresponding language text data 'German#18' indicating 'Save' in German at the predetermined location in the word processor (S2). CPU 211 identifies the language item ID 'Language Item#19' in Language Table#4 Storage Area 20654b1d (Paragraph [0037]) and displays the corresponding language text data 'German#19' indicating 'Yes' in German at the predetermined location in the word processor (S3). CPU 211 identifies the language item ID 'Language Item#20' in Language Table#4 Storage Area 20654b1d (Paragraph [0037]) and displays the corresponding language text data 'German#20' indicating 'No' in German at the predetermined location in the word processor (S4). CPU 211 identifies the language item ID 'Language Item#21' in Language Table#4 Storage Area 20654b1d (Paragraph [0037]) and displays the corresponding language text data 'German#21' indicating 'Cancel' in German at the predetermined location in the word processor (S5). The save signal indicating to save the alphanumeric data input in S9 of Paragraph [0071] is input by utilizing Input Device 210 (FIG. 1) or via voice recognition system, assuming that the user of Communication Device 200 intends to save the data (S6), and the data are saved in a predetermined location in RAM 206 (FIG. 1) (S7). The word processor is closed thereafter (S8).

Paragraph [0074]—This Paragraph [0074] illustrates the data displayed on LCD 201 (FIG. 1) of Communication Device 200 at the time Language Text Data Displaying Software For Word Processor 20654c3b (Paragraph [0073]) is implemented. In the present embodiment, Prompt 20154Pr is displayed on LCD 201 (FIG. 1) at the time Language Text Data Displaying Software For Word Processor 20654c3a (Paragraph [0071]) is closed. In the present embodiment, Prompt 20154Pr is primarily composed of 20154PrS, 20154PrY, 20154PrN, and 20154PrC. In the present embodiment, 20154PrS is the language text data processed in S2 of the previous paragraph; 20154PrY is the language text data processed in S3 of the previous paragraph; 20154PrN is the language text data processed in S4 of the previous paragraph; and 20154PrC is the language text data processed in S5 of the previous paragraph.

Paragraph [0075]—This Paragraph [0075] illustrates Language Text Data Displaying Software For Explorer 20654c4 stored in Multiple Language Displaying Software Storage Area 20654c (Paragraph [0040]) which displays the language text data at the time a Windows Explorer like software program which displays folders and/or directories and the structures thereof is executed. In the present embodiment, CPU 211 (FIG. 1) of Communication Device 200 executes Windows Explorer like software program in response to the signal input by the user of Communication Device 200 indicating to activate and execute the software program (S1). In the process of displaying the Windows Explorer like software program on LCD 201 (FIG. 1), the following steps of S2 through S4 are implemented. Namely, CPU 211 identifies the language item ID 'Language Item#15' in Language Table#4 Storage Area 20654b1d (Paragraph [0037]) and displays the corresponding language text data 'German#15' indicating 'My Network' in German at the predetermined location in the Windows Explorer like software program (S2). CPU 211 identifies the language item ID 'Language Item#16' in Language Table#4 Storage Area 20654b1d (Paragraph [0037]) and displays the corresponding language text data 'German#16' indicating 'Trash' in German at the predetermined location in the Windows Explorer like software program (S3). CPU 211 identifies the language item ID 'Language Item#17' in Language Table#4 Storage Area 20654b1d (Paragraph [0037]) and displays the corresponding language text data 'German#17' indicating 'Local Disk' in German at the predetermined location in the Windows Explorer like software program (S4).

Paragraph [0076]—This Paragraph [0076] illustrates the data displayed on LCD 201 (FIG. 1) of Communication Device 200 at the time Language Text Data Displaying Software For Explorer 20654c4 (Paragraph [0075]) is executed. In the present embodiment, 20154LD, 20154MN, and 20154Tr are displayed on LCD 201 (FIG. 1) at the time Language Text Data Displaying Software For Explorer 20654c4 is executed. In the present embodiment, 20154LD is the language text data processed in S4 of the previous paragraph; 20154MN is the language text data processed in S2 of the previous paragraph; and 20154Tr is the language text data processed in S3 of the previous paragraph.

Paragraph [0077]—<<Multiple Language Displaying Function—Utilizing Other Languages>>

Paragraph [0078]—For the avoidance of doubt, the present function is not limited to select a language, to operate Communication Device 200, only from the foregoing four languages of English, Japanese, French, and German. The present function is also capable to select a language from Dutch, Chinese, Arabic, Korean, Spanish, Italian, and any other languages existing in this world, in addition to the foregoing four languages.

Paragraph [0079]—<<Caller's Information Displaying Function>>

Paragraph [0080]—Paragraph [0084] through Paragraph [0129] illustrate the Caller's Information displaying function which displays the Information regarding the caller (e.g., name, phone number, email address, and home address, etc.) on LCD 201 (FIG. 1) when Communication Device 200 is utilized as a 'TV phone'.

Paragraph [0081]—Paragraph [0084] through Paragraph [0091] illustrate the data and software programs stored in RAM 206 (FIG. 1) of Caller's Device, a Communication Device 200, utilized by the caller.

Paragraph [0082]—Paragraph [0092] through Paragraph [0099] illustrate the data and software programs stored in RAM 206 (FIG. 1) of Callee's Device, a Communication Device 200, utilized by the callee.

Paragraph [0083]—Paragraph [0100] through Paragraph [0103] illustrate the data and software programs stored in Host H (Paragraph [0025]).

Paragraph [0084]—This Paragraph [0084] illustrates the storage area included in RAM 206 (FIG. 1) of Caller's Device. In the present embodiment, RAM 206 of Caller's Device includes Caller's Information Displaying Information Storage Area 20655a of which the data and the software programs stored therein are described in Paragraph [0085].

Paragraph [0085]—This Paragraph [0085] illustrates the storage areas included in Caller's Information Displaying Information Storage Area 20655a (Paragraph [0084]). In the present embodiment, Caller's Information Displaying Information Storage Area 20655a includes Caller's Information Displaying Data Storage Area 20655b and Caller's Information Displaying Software Storage Area 20655c. Caller's Information Displaying Data Storage Area 20655b stores the data necessary to implement the present function on the side of Caller's Device, such as the ones described in Paragraph [0086] through Paragraph [0090]. Caller's Information Displaying Software Storage Area 20655c stores the software programs necessary to implement the present function on the side of Caller's Device, such as the ones described in Paragraph [0091].

Paragraph [0086]—This Paragraph [0086] illustrates the storage areas included in Caller's Information Displaying Data Storage Area 20655b. In the present embodiment, Caller's Information Displaying Data Storage Area 20655b includes Caller's Audiovisual Data Storage Area 20655b1, Callee's Audiovisual Data Storage Area 20655b2, Caller's Personal Data Storage Area 20655b3, Callee's Personal Data Storage Area 20655b4, Caller's Calculated GPS Data Storage Area 20655b5, Callee's Calculated GPS Data Storage Area 20655b6, Caller's Map Data Storage Area 20655b7, Callee's Map Data Storage Area 20655b8, and Work Area 20655b9. Caller's Audiovisual Data Storage Area 20655b1 stores the data described in Paragraph [0087]. Callee's Audiovisual Data Storage Area 20655b2 stores the data described in Paragraph [0088]. Caller's Personal Data Storage Area 20655b3 stores the data described in Paragraph [0089]. Callee's Personal Data Storage Area 20655b4 stores the data described in Paragraph [0090]. Caller's Calculated GPS Data Storage Area 20655b5 stores the caller's calculated GPS data which represents the current geographic location of Caller's Device in (x, y, z) format. Callee's Calculated GPS Data Storage Area 20655b6 stores the callee's calculated GPS data which represents the current geographic location of Callee's Device in (x, y, z) format. Caller's Map Data Storage Area 20655b7 stores the map data representing the surrounding area of the location indicated by the caller's calculated GPS data. Callee's Map Data Storage Area 20655b8 stores the map data representing the surrounding area of the location indicated by the callee's calculated GPS data. Work Area 20655b9 is a storage area utilized to perform calculation and to temporarily store data.

Paragraph [0087]—This Paragraph [0087] illustrates the storage areas included in Caller's Audiovisual Data Storage Area 20655b1 (Paragraph [0086]). In the present embodiment, Caller's Audiovisual Data Storage Area 20655b1 includes Caller's Audio Data Storage Area 20655b1a and Caller's Visual Data Storage Area 20655b1b. Caller's Audio Data Storage Area 20655b1a stores the caller's audio data which represents the audio data input via Microphone 215 (FIG. 1) of Caller's Device. Caller's Visual Data Storage Area 20655b1b stores the caller's visual data which represents the visual data input via CCD Unit 214 (FIG. 1) of Caller's Device.

Paragraph [0088]—This Paragraph [0088] illustrates the storage areas included in Callee's Audiovisual Data Storage Area 20655b2 (Paragraph [0086]). In the present embodiment, Callee's Audiovisual Data Storage Area 20655b2 includes Callee's Audio Data Storage Area 20655b2a and Callee's Visual Data Storage Area 20655b2b. Callee's Audio Data Storage Area 20655b2a stores the callee's audio data which represents the audio data sent from Callee's Device. Callee's Visual Data Storage Area 20655b2b stores the callee's visual data which represents the visual data sent from Callee's Device.

Paragraph [0089]—This Paragraph [0089] illustrates the data stored in Caller's Personal Data Storage Area 20655b3 (Paragraph [0086]). In the present embodiment, Caller's Personal Data Storage Area 20655b3 comprises two columns, i.e., 'Caller's Personal Data' and 'Permitted Caller's Personal Data Flag'. Column 'Caller's Personal Data' stores the caller's personal data which represent the personal data of the caller. Column 'Permitted Caller's Personal Data Flag' stores the permitted caller's personal data flag and each permitted caller's personal data flag represents whether the corresponding caller's personal data is permitted to be displayed on Callee's Device. The permitted caller's personal data flag is represented by either '1' or '0' wherein '1' indicates that the corresponding caller's personal data is permitted to be displayed on Callee's Device, and '0' indicates that the corresponding caller's personal data is not permitted to be displayed on Callee's Device. In the present embodiment, Caller's Personal Data Storage Area 20655$b$3 stores the following data: the caller's name and the corresponding permitted caller's personal data flag '1'; the caller's phone number and the corresponding permitted caller's personal data flag '1'; the caller's email address and the corresponding permitted caller's personal data flag '1'; the caller's home address and the corresponding permitted caller's personal data flag '1'; the caller's business address and the corresponding permitted caller's personal data flag '0'; the caller's title and the corresponding permitted caller's personal data flag '0'; the caller's hobby and the corresponding permitted caller's personal data flag '0'; the caller's blood type and the corresponding permitted caller's personal data flag '0'; the caller's gender and the corresponding permitted caller's personal data flag '0'; the caller's age and the corresponding permitted caller's personal data flag '0'; and caller's date of birth and the corresponding permitted caller's personal data flag '0'.

Paragraph [0090]—This Paragraph [0090] illustrates the data stored in Callee's Personal Data Storage Area 20655$b$4 (Paragraph [0086]). In the present embodiment, Callee's Personal Data Storage Area 20655$b$4 stores the callee's personal data which represent the personal data of the callee which are displayed on LCD 201 (FIG. 1) of Caller's Device. In the present embodiment, Callee's Personal Data Storage Area 20655$b$4 stores the callee's name and phone number.

Paragraph [0091]—This Paragraph [0091] illustrates the software programs stored in Caller's Information Displaying Software Storage Area 20655$c$ (Paragraph [0085]). In the present embodiment, Caller's Information Displaying Software Storage Area 20655$c$ stores Permitted Caller's Personal Data Selecting Software 20655$c$1, Dialing Software 20655$c$2, Caller's Device Pin-pointing Software 20655$c$3, Map Data Sending/Receiving Software 20655$c$4, Caller's Audiovisual Data Collecting Software 20655$c$5, Caller's Information Sending/Receiving Software 20655$c$6, Callee's Information Sending/Receiving Software 20655$c$6$a$, Permitted Callee's Personal Data Displaying Software 20655$c$7, Map Displaying Software 20655$c$8, Callee's Audio Data Outputting Software 20655$c$9, and Callee's Visual Data Displaying Software 20655$c$10. Permitted Caller's Personal Data Selecting Software 20655$c$1 is the software program described in Paragraph [0105]. Dialing Software 20655$c$2 is the software program described in Paragraph [0106]. Caller's Device Pin-pointing Software 20655$c$3 is the software program described in Paragraph [0107] and Paragraph [0108]. Map Data Sending/Receiving Software 20655$c$4 is the software program described in Paragraph [0109]. Caller's Audiovisual Data Collecting Software 20655$c$5 is the software program described in Paragraph [0110]. Caller's Information Sending/Receiving Software 20655$c$6 is the software program described in Paragraph [0111]. Callee's Information Sending/Receiving Software 20655$c$6$a$ is the software program described in Paragraph [0125]. Permitted Callee's Personal Data Displaying Software 20655$c$7 is the software program described in Paragraph [0126]. Map Displaying Software 20655$c$8 is the software program described in Paragraph [0127]. Callee's Audio Data Outputting Software 20655$c$9 is the software program described in Paragraph [0128]. Callee's Visual Data Displaying Software 20655$c$10 is the software program described in Paragraph [0129].

Paragraph [0092]—This Paragraph [0092] illustrates the storage area included in RAM 206A (FIG. 1) of Callee's Device. In the present embodiment, RAM 206A of Callee's Device includes Callee's Information Displaying Information Storage Area 20655$a$A of which the data and the software programs stored therein are described in Paragraph [0093].

Paragraph [0093]—This Paragraph [0093] illustrates the storage areas included in Callee's Information Displaying Information Storage Area 20655$a$A (Paragraph [0092]). In the present embodiment, Callee's Information Displaying Information Storage Area 20655$a$A includes Callee's Information Displaying Data Storage Area 20655$b$A and Callee's Information Displaying Software Storage Area 20655$c$A. Callee's Information Displaying Data Storage Area 20655$b$A stores the data necessary to implement the present function on the side of Callee's Device, such as the ones described in Paragraph [0094] through Paragraph [0098]. Callee's Information Displaying Software Storage Area 20655$c$A stores the software programs necessary to implement the present function on the side of Callee's Device, such as the ones described in Paragraph [0099].

Paragraph [0094]—This Paragraph [0094] illustrates the storage areas included in Callee's Information Displaying Data Storage Area 20655$b$A. In the present embodiment, Callee's Information Displaying Data Storage Area 20655$b$A includes Caller's Audiovisual Data Storage Area 20655$b$1A, Callee's Audiovisual Data Storage Area 20655$b$2A, Caller's Personal Data Storage Area 20655$b$3A, Callee's Personal Data Storage Area 20655$b$4A, Caller's Calculated GPS Data Storage Area 20655$b$5A, Callee's Calculated GPS Data Storage Area 20655$b$6A, Caller's Map Data Storage Area 20655$b$7A, Callee's Map Data Storage Area 20655$b$8A, and Work Area 20655$b$9A. Caller's Audiovisual Data Storage Area 20655$b$1A stores the data described in Paragraph [0095]. Callee's Audiovisual Data Storage Area 20655$b$2A stores the data described in Paragraph [0096]. Caller's Personal Data Storage Area 20655$b$3A stores the data described in Paragraph [0097]. Callee's Personal Data Storage Area 20655$b$4A stores the data described in Paragraph [0098]. Caller's Calculated GPS Data Storage Area 20655$b$5A stores the caller's calculated GPS data which represents the current geographic location of Caller's Device in (x, y, z) format. Callee's Calculated GPS Data Storage Area 20655$b$6A stores the callee's calculated GPS data which represents the current geographic location of Callee's Device in (x, y, z) format. Caller's Map Data Storage Area 20655$b$7A stores the map data representing the surrounding area of the location indicated by the caller's calculated GPS data. Callee's Map Data Storage Area 20655$b$8A stores the map data representing the surrounding area of the location indicated by the callee's calculated GPS data. Work Area 20655$b$9A is a storage area utilized to perform calculation and to temporarily store data.

Paragraph [0095]—This Paragraph [0095] illustrates the storage areas included in Caller's Audiovisual Data Storage Area 20655$b$1A (Paragraph [0094]). In the present embodiment, Caller's Audiovisual Data Storage Area 20655$b$1A includes Caller's Audio Data Storage Area 20655$b$1$a$A and Caller's Visual Data Storage Area 20655$b$1$b$A. Caller's Audio Data Storage Area 20655$b$1$a$A stores the caller's audio data which represents the audio data sent from Caller's Device in a wireless fashion. Caller's Visual Data Storage Area 20655$b$1$b$A stores the caller's visual data which represents the visual data input sent from Caller's Device in a wireless fashion.

Paragraph [0096]—This Paragraph [0096] illustrates the storage areas included in Callee's Audiovisual Data Storage Area 20655$b$2A (Paragraph [0094]). In the present embodiment, Callee's Audiovisual Data Storage Area 20655b2A includes Callee's Audio Data Storage Area 20655b2aA and Callee's Visual Data Storage Area 20655b2bA. Callee's Audio Data Storage Area 20655b2aA stores the callee's audio data which represents the audio data input via Microphone 215 (FIG. 1) of Callee's Device. Callee's Visual Data Storage Area 20655b2bA stores the callee's visual data which represents the visual data input via CCD Unit 214 (FIG. 1) of Callee's Device.

Paragraph [0097]—This Paragraph [0097] illustrates the data stored in Caller's Personal Data Storage Area 20655b3A (Paragraph [0094]). In the present embodiment, Caller's Personal Data Storage Area 20655b3A stores the caller's personal data which represent the personal data of the caller which are displayed on LCD 201 (FIG. 1) of Caller's Device. In the present embodiment, Caller's Personal Data Storage Area 20655b3A stores the caller's name, phone number, email address, and home address.

Paragraph [0098]—This Paragraph [0098] illustrates the data stored in Callee's Personal Data Storage Area 20655b4A (Paragraph [0094]). In the present embodiment, Callee's Personal Data Storage Area 20655b4A comprises two columns, i.e., 'Callee's Personal Data' and 'Permitted Callee's Personal Data Flag'. Column 'Callee's Personal Data' stores the callee's personal data which represent the personal data of the callee. Column 'Permitted Callee's Personal Data Flag' stores the permitted callee's personal data flag and each permitted callee's personal data flag represents whether the corresponding callee's personal data is permitted to be displayed on Caller's Device. The permitted callee's personal data flag is represented by either '1' or '0' wherein '1' indicates that the corresponding callee's personal data is permitted to be displayed on Caller's Device, and '0' indicates that the corresponding callee's personal data is not permitted to be displayed on Caller's Device. In the present embodiment, Callee's Personal Data Storage Area 20655b4A stores the following data: callee's name and the corresponding permitted callee's personal data flag '1'; the callee's phone number and the corresponding permitted callee's personal data flag '1'; the callee's email address and the corresponding permitted caller's personal data flag '0'; the callee's home address and the corresponding permitted callee's personal data flag '0'; the callee's business address and the corresponding permitted callee's personal data flag '0'; the callee's title and the corresponding permitted callee's personal data flag '0'; the callee's hobby and the corresponding permitted callee's personal data flag '0'; the callee's blood type and the corresponding permitted callee's personal data flag '0'; the callee's gender and the corresponding permitted callee's personal data flag '0'; the callee's age and the corresponding permitted callee's personal data flag '0'; and callee's date of birth and the corresponding permitted callee's personal data flag '0'.

Paragraph [0099]—This Paragraph [0099] illustrates the software programs stored in Callee's Information Displaying Software Storage Area 20655cA (Paragraph [0093]). In the present embodiment, Callee's Information Displaying Software Storage Area 20655cA stores Permitted Callee's Personal Data Selecting Software 20655c1A, Dialing Software 20655c2A, Callee's Device Pin-pointing Software 20655c3A, Map Data Sending/Receiving Software 20655c4A, Callee's Audiovisual Data Collecting Software 20655c5A, Callee's Information Sending/Receiving Software 20655c6A, Caller's Information Sending/Receiving Software 20655c6aA, Permitted Caller's Personal Data Displaying Software 20655c7A, Map Displaying Software 20655c8A, Caller's Audio Data Outputting Software 20655c9A, and Caller's Visual Data Displaying Software 20655c10A. Permitted Callee's Personal Data Selecting Software 20655c1A is the software program described in Paragraph [0118]. Dialing Software 20655c2A is the software program described in Paragraph [0119]. Callee's Device Pin-pointing Software 20655c3A is the software program described in Paragraph [0120] and Paragraph [0121]. Map Data Sending/Receiving Software 20655c4A is the software program described in Paragraph [0122]. Callee's Audiovisual Data Collecting Software 20655c5A is the software program described in Paragraph [0123]. Callee's Information Sending/Receiving Software 20655c6A is the software program described in Paragraph [0124]. Caller's Information Sending/Receiving Software 20655c6aA is the software program described in Paragraph [0112]. Permitted Caller's Personal Data Displaying Software 20655c7A is the software program described in Paragraph [0113]. Map Displaying Software 20655c8A is the software program described in Paragraph [0114]. Caller's Audio Data Outputting Software 20655c9A is the software program described in Paragraph [0115]. Caller's Visual Data Displaying Software 20655c10A is the software program described in Paragraph [0116].

Paragraph [0100]—This Paragraph [0100] illustrates the storage area included in Host H (Paragraph [0025]). In the present embodiment, Host H includes Caller/Callee Information Storage Area H55a of which the data and the software programs stored therein are described in Paragraph [0101].

Paragraph [0101]—This Paragraph [0101] illustrates the storage areas included in Caller/Callee Information Storage Area H55a. In the present embodiment, Caller/Callee Information Storage Area H55a includes Caller/Callee Data Storage Area H55b and Caller/Callee Software Storage Area H55c. Caller/Callee Data Storage Area H55b stores the data necessary to implement the present function on the side of Host H (Paragraph [0025]), such as the ones described in Paragraph [0102]. Caller/Callee Software Storage Area H55c stores the software programs necessary to implement the present function on the side of Host H, such as the ones described in Paragraph [0103].

Paragraph [0102]—This Paragraph [0102] illustrates the storage areas included in Caller/Callee Data Storage Area H55b. In the present embodiment, Caller/Callee Data Storage Area H55b includes Caller's Information Storage Area H55b1, Callee's Information Storage Area H55b2, Map Data Storage Area H55b3, Work Area h55b4, Caller's Calculated GPS Data Storage Area H55b5, and Callee's Calculated GPS Data Storage Area H55b6. Caller's Information Storage Area H55b1 stores the Caller's Information received Caller's Device. Callee's Information Storage Area H55b2 stores the Callee's Information received Callee's Device. Map Data Storage Area H55b3 stores the map data received from Caller's Device and Callee's Device. Work Area H55b4 is a storage area utilized to perform calculation and to temporarily store data. Caller's Calculated GPS Data Storage Area H55b5 stores the caller's calculated GPS data. Callee's Calculated GPS Data Storage Area H55b6 stores the callee's calculated GPS data.

Paragraph [0103]—This Paragraph [0103] illustrates the software programs stored in Caller/Callee Software Storage Area H55c (Paragraph [0103]). In the present embodiment, Caller/Callee Software Storage Area H55c stores Dialing Software H55c2, Caller's Device Pin-pointing Software H55c3, Callee's Device Pin-pointing Software H55c3a, Map Data Sending/Receiving Software H55c4, Caller's Information Sending/Receiving Software H55c6, and Callee's Information Sending/Receiving Software H55c6a. Dialing Software H55c2 is the software program described in Paragraph

[0106] and Paragraph [0119]. Caller's Device Pin-pointing Software H55c3 is the software program described in Paragraph [0107]. Callee's Device Pin-pointing Software H55c3a is the software program described in Paragraph [0120]. Map Data Sending/Receiving Software H55c4 is the software program described in Paragraph [0109] and Paragraph [0122]. Caller's Information Sending/Receiving Software H55c6 is the software program described in Paragraph [0111]. Callee's Information Sending/Receiving Software H55c6a is the software program described in Paragraph [0124] and Paragraph [0125].

Paragraph [0104]—Paragraph [0105] through Paragraph [0116] primarily illustrate the sequence to output the Caller's Information (which is defined hereinafter) from Callee's Device.

Paragraph [0105]—This Paragraph [0105] illustrates Permitted Caller's Personal Data Selecting Software 20655c1 stored in Caller's Information Displaying Software Storage Area 20655c (Paragraph [0091]) of Caller's Device, which selects the permitted caller's personal data to be displayed on LCD 201 (FIG. 1) of Callee's Device. In the present embodiment, CPU 211 (FIG. 1) of Caller's Device retrieves all of the caller's personal data from Caller's Personal Data Storage Area 20655b3 (Paragraph [0089]) (S1). CPU 211 then displays a list of caller's personal data on LCD 201 (FIG. 1) (S2). The caller selects, by utilizing Input Device 210 (FIG. 1) or via voice recognition system, the caller's personal data permitted to be displayed on Callee's Device (S3). The permitted caller's personal data flag of the data selected in S3 is registered as '1' (S4).

Paragraph [0106]—This Paragraph [0106] illustrates Dialing Software H55c2 stored in Caller/Callee Software Storage Area H55c (Paragraph [0103]) of Host H (Paragraph [0025]), Dialing Software 20655c2 stored in Caller's Information Displaying Software Storage Area 20655c (Paragraph [0091]) of Caller's Device, and Dialing Software 20655c2A stored in Callee's Information Displaying Software Storage Area 20655cA (Paragraph [0099]) of Callee's Device, which enables to connect between Caller's Device and Callee's Device via Host H (Paragraph [0025]) in a wireless fashion. In the present embodiment, a connection is established between Caller's Device and Host H (S1). Next, a connection is established between Host H and Callee's Device (S2). As a result, Caller's Device and Callee's Device are able to exchange audiovisual data, text data, and various types of data with each other. The connection is maintained until Caller's Device, Host H, or Callee's Device terminates the connection.

Paragraph [0107]—This Paragraph [0107] illustrates Caller's Device Pin-pointing Software H55c3 (Paragraph [0103]) stored in Caller/Callee Software Storage Area H55c (Paragraph [0103]) of Host H (Paragraph [0025]) and Caller's Device Pin-pointing Software 20655c3 stored in Caller's Information Displaying Software Storage Area 20655c (Paragraph [0091]) of Caller's Device, which identifies the current geographic location of Caller's Device. In the present embodiment, CPU 211 (FIG. 1) of Caller's Device collects the GPS raw data from the near base stations (S1). CPU 211 sends the raw GPS data to Host H (S2). Upon receiving the raw GPS data (S3), Host H produces the caller's calculated GPS data by referring to the raw GPS data (S4). Host H stores the caller's calculated GPS data in Caller's Calculated GPS Data Storage Area H55b5 (Paragraph [0102]) (S5). Host H then retrieves the caller's calculated GPS data from Caller's Calculated GPS Data Storage Area H55b5 (Paragraph [0102]) (S6), and sends the data to Caller's Device (S7). Upon receiving the caller's calculated GPS data from Host H (S8), CPU 211 stores the data in Caller's Calculated GPS Data Storage Area 20655b5 (Paragraph [0086]) (S9). Here, the GPS raw data are the primitive data utilized to produce the caller's calculated GPS data, and the caller's calculated GPS data is the data representing the location of Caller's Device in (x, y, z) format. The sequence described in the present paragraph is repeated periodically.

Paragraph [0108]—This Paragraph [0108] illustrates another embodiment of the sequence described in Paragraph [0107] in which the entire process is performed solely by Caller's Device Pin-pointing Software 20655c3 stored in Caller's Information Displaying Software Storage Area 20655c (Paragraph [0091]) of Caller's Device. In the present embodiment, CPU 211 (FIG. 1) of Caller's Device collects the raw GPS data from the near base stations (S1). CPU 211 then produces the caller's calculated GPS data by referring to the raw GPS data (S2), and stores the caller's calculated GPS data in Caller's Calculated GPS Data Storage Area 20655b5 (Paragraph [0086]) (S3). The sequence described in the present paragraph is repeated periodically.

Paragraph [0109]—This Paragraph [0109] illustrates Map Data Sending/Receiving Software H55c4 stored in Caller/Callee Software Storage Area H55c (Paragraph [0103]) of Host H (Paragraph [0025]) and Map Data Sending/Receiving Software 20655c4 stored in Caller's Information Displaying Software Storage Area 20655c (Paragraph [0091]) of Caller's Device, which sends and receives the map data. In the present embodiment, CPU 211 (FIG. 1) of Caller's Device retrieves the caller's calculated GPS data from Caller's Calculated GPS Data Storage Area 20655b5 (Paragraph [0086]) (S1), and sends the data to Host H (S2). Upon receiving the calculated GPS data from Caller's Device (S3), Host H identifies the map data in Map Data Storage Area H55b3 (Paragraph [0102]) (S4). Here, the map data represents the surrounding area of the location indicated by the caller's calculated GPS data. Host H retrieves the map data from Map Data Storage Area H55b3 (Paragraph [0102]) (S5), and sends the data to Caller's Device (S6). Upon receiving the map data from Host H (S7), Caller's Device stores the data in Caller's Map Data Storage Area 20655b7 (Paragraph [0086]) (S8). The sequence described in the present paragraph is repeated periodically.

Paragraph [0110]—This Paragraph [0110] illustrates Caller's Audiovisual Data Collecting Software 20655c5 stored in Caller's Information Displaying Software Storage Area 20655c (Paragraph [0091]) of Caller's Device, which collects the audiovisual data of the caller to be sent to Callee's Device via Antenna 218 (FIG. 1) thereof. CPU 211 (FIG. 1) of Caller's Device retrieves the caller's audiovisual data from CCD Unit 214 and Microphone 215 (S1). CPU 211 then stores the caller's audio data in Caller's Audio Data Storage Area 20655b1a (Paragraph [0087]) (S2), and the caller's visual data in Caller's Visual Data Storage Area 20655b1b (Paragraph [0087]) (S3). The sequence described in the present paragraph is repeated periodically.

Paragraph [0111]—This Paragraph [0111] illustrates Caller's Information Sending/Receiving Software H55c6 stored in Caller/Callee Software Storage Area H55c (Paragraph [0103]) of Host H (Paragraph [0025]) and Caller's Information Sending/Receiving Software 20655c6 stored in Caller's Information Displaying Software Storage Area 20655c (Paragraph [0091]) of Caller's Device, which sends and receives the Caller's Information (which is defined hereinafter) between Caller's Device and Host H. In the present embodiment, CPU 211 (FIG. 1) of Caller's Device retrieves the permitted caller's personal data from Caller's Personal Data Storage Area 20655b3 (Paragraph [0089]) (S1). CPU 211 retrieves the caller's calculated GPS data from Caller's Calculated GPS Data Storage Area 20655b5 (Paragraph [0086]) (S2). CPU 211 retrieves the map data from Caller's Map Data Storage Area 20655b7 (Paragraph [0086]) (S3). CPU 211 retrieves the caller's audio data from Caller's Audio Data Storage Area 20655b1a (Paragraph [0087]) (S4). CPU 211 retrieves the caller's visual data from Caller's Visual Data Storage Area 20655b1b (Paragraph [0087]) (S5). CPU 211 then sends the data retrieved in S1 through S5 (collectively defined as the 'Caller's Information' hereinafter) to Host H (S6). Upon receiving the Caller's Information from Caller's Device (S7), Host H stores the Caller's Information in Caller's Information Storage Area H55b1 (Paragraph [0102]) (S8). The sequence described in the present paragraph is repeated periodically.

Paragraph [0112]—This Paragraph [0112] illustrates Caller's Information Sending/Receiving Software H55c6 stored in Caller/Callee Software Storage Area H55c (Paragraph [0103]) of Host H (Paragraph [0025]) and Caller's Information Sending/Receiving Software 20655c6aA (Paragraph [0099]) stored in Caller's Information Displaying Software Storage Area 20655c (Paragraph [0091]) of Caller's Device, which sends and receives the Caller's Information between Host H and Callee's Device. In the present embodiment, Host H retrieves the Caller's Information from Caller's Information Storage Area H55b1 (Paragraph [0102]) (S1), and sends the Caller's Information to Callee's Device (S2). CPU 211 (FIG. 1) of Callee's Device receives the Caller's Information from Host H (S3). CPU 211 stores the permitted caller's personal data in Caller's Personal Data Storage Area 20655b3A (Paragraph [0097]) (S4). CPU 211 stores the caller's calculated GPS data in Caller's Calculated GPS Data Storage Area 20655b5A (Paragraph [0094]) (S5). CPU 211 stores the map data in Caller's Map Data Storage Area 20655b7A (Paragraph [0094]) (S6). CPU 211 stores the caller's audio data in Caller's Audio Data Storage Area 20655b1aA (Paragraph [0095]) (S7). CPU 211 stores the caller's visual data in Caller's Visual Data Storage Area 20655b1bA (Paragraph [0095]) (S8). The sequence described in the present paragraph is repeated periodically.

Paragraph [0113]—This Paragraph [0113] illustrates Permitted Caller's Personal Data Displaying Software 20655c7A stored in Callee's Information Displaying Software Storage Area 20655cA (Paragraph [0099]) of Callee's Device, which displays the permitted caller's personal data on LCD 201 (FIG. 1) of Callee's Device. In the present embodiment, CPU 211 (FIG. 1) of Callee's Device retrieves the permitted caller's personal data from Caller's Personal Data Storage Area 20655b3A (Paragraph [0097]) (S1). CPU 211 then displays the permitted caller's personal data on LCD 201 (FIG. 1) (S2). The sequence described in the present paragraph is repeated periodically.

Paragraph [0114]—This Paragraph [0114] illustrates Map Displaying Software 20655c8A stored in Callee's Information Displaying Software Storage Area 20655cA (Paragraph [0099]) of Callee's Device, which displays the map representing the surrounding area of the location indicated by the caller's calculated GPS data. In the present embodiment, CPU 211 (FIG. 1) of Callee's Device retrieves the caller's calculated GPS data from Caller's Calculated GPS Data Storage Area 20655b5A (Paragraph [0094]) (S1). CPU 211 then retrieves the map data from Caller's Map Data Storage Area 20655b7A (Paragraph [0094]) (S2), and arranges on the map data the caller's current location icon in accordance with the caller's calculated GPS data (S3). Here, the caller's current location icon is an icon which represents the location of Caller's Device in the map data. The map with the caller's current location icon is displayed on LCD 201 (FIG. 1) (S4). The sequence described in the present paragraph is repeated periodically.

Paragraph [0115]—This Paragraph [0115] illustrates Caller's Audio Data Outputting Software 20655c9A stored in Caller's Information Displaying Software Storage Area 20655c (Paragraph [0091]) of Caller's Device, which outputs the caller's audio data from Speaker 216 (FIG. 1) of Callee's Device. In the present embodiment, CPU 211 (FIG. 1) of Callee's Device retrieves the caller's audio data from Caller's Audio Data Storage Area 20655b1aA (Paragraph [0095]) (S1). CPU 211 then outputs the caller's audio data from Speaker 216 (FIG. 1) (S2). The sequence described in the present paragraph is repeated periodically.

Paragraph [0116]—This Paragraph [0116] illustrates Caller's Visual Data Displaying Software 20655c10A stored in Callee's Information Displaying Software Storage Area 20655cA (Paragraph [0099]) of Callee's Device, which displays the caller's visual data on LCD 201 (FIG. 1) of Callee's Device. In the present embodiment, CPU 211 (FIG. 1) of Callee's Device retrieves the caller's visual data from Caller's Visual Data Storage Area 20655b1bA (Paragraph [0095]) (S1). CPU 211 then displays the caller's visual data on LCD 201 (FIG. 1) (S2). The sequence described in the present paragraph is repeated periodically.

Paragraph [0117]—Paragraph [0118] through Paragraph [0129] primarily illustrate the sequence to output the Callee's Information (which is defined hereinafter) from Caller's Device.

Paragraph [0118]—This Paragraph [0118] illustrates Permitted Callee's Personal Data Selecting Software 20655c1A stored in Callee's Information Displaying Software Storage Area 20655cA (Paragraph [0099]) of Callee's Device, which selects the permitted callee's personal data to be displayed on LCD 201 (FIG. 1) of Caller's Device. In the present embodiment, CPU 211 (FIG. 1) of Callee's Device retrieves all of the callee's personal data from Callee's Personal Data Storage Area 20655b4A (Paragraph [0098]) (S1). CPU 211 then displays a list of callee's personal data on LCD 201 (FIG. 1) (S2). The callee selects, by utilizing Input Device 210 (FIG. 1) or via voice recognition system, the callee's personal data permitted to be displayed on Caller's Device (S3). The permitted callee's personal data flag of the data selected in S3 is registered as '1' (S4).

Paragraph [0119]—This Paragraph [0119] illustrates Dialing Software H55c2 stored in Caller/Callee Software Storage Area H55c (Paragraph [0103]) of Host H (Paragraph [0025]), Dialing Software 20655c2A stored in Callee's Information Displaying Software Storage Area 20655cA (Paragraph [0099]) of Callee's Device, and Dialing Software 20655c2 stored in Caller's Information Displaying Software Storage Area 20655c (Paragraph [0091]) of Caller's Device, which enables to connect between Callee's Device and Caller's Device via Host H (Paragraph [0025]) in a wireless fashion. In the present embodiment, a connection is established between Callee's Device and Host H (S1). Next, a connection is established between Host H and Caller's Device (S2). As a result, Callee's Device and Caller's Device are able to exchange audiovisual data, text data, and various types of data with each other. The sequence described in the present paragraph is not necessarily implemented if the connection between Caller's Device and Callee's Device is established as described in Paragraph [0106]. The sequence described in the present paragraph may be implemented if the connection is accidentally terminated by Callee's Device and the connection process is initiated by Callee's Device.

Paragraph [0120]—This Paragraph [0120] illustrates Callee's Device Pin-pointing Software H55c3a stored in Caller/Callee Software Storage Area H55c (Paragraph [0103]) of Host H (Paragraph [0025]) and Callee's Device Pin-pointing Software 20655c3A stored in Callee's Information Displaying Software Storage Area 20655cA of Callee's Device, which identifies the current geographic location of Callee's Device. In the present embodiment, CPU 211 (FIG. 1) of Callee's Device collects the GPS raw data from the near base stations (S1). CPU 211 sends the raw GPS data to Host H (S2). Upon receiving the raw GPS data (S3), Host H produces the callee's calculated GPS data by referring to the raw GPS data (S4). Host H stores the callee's calculated GPS data in Callee's Calculated GPS Data Storage Area H55b6 (Paragraph [0102]) (S5). Host H then retrieves the callee's calculated GPS data from Callee's Calculated GPS Data Storage Area H55b6 (Paragraph [0102]) (S6), and sends the data to Callee's Device (S7). Upon receiving the callee's calculated GPS data from Host H (S8), CPU 211 stores the data in Callee's Calculated GPS Data Storage Area 20655b6A (Paragraph [0094]) (S9). Here, the GPS raw data are the primitive data utilized to produce the callee's calculated GPS data, and the callee's calculated GPS data is the data representing the location of Callee's Device in (x, y, z) format. The sequence described in the present paragraph is repeated periodically.

Paragraph [0121]—This Paragraph [0121] illustrates another embodiment of the sequence described in Paragraph [0120] in which the entire process is performed solely by Callee's Device Pin-pointing Software 20655c3A stored in Callee's Information Displaying Software Storage Area 20655cA (Paragraph [0099]) of Callee's Device. In the present embodiment, CPU 211 (FIG. 1) of Callee's Device collects the raw GPS data from the near base stations (S1). CPU 211 then produces the callee's calculated GPS data by referring to the raw GPS data (S2), and stores the callee's calculated GPS data in Callee's Calculated GPS Data Storage Area 20655b6A (Paragraph [0094]) (S3). The sequence described in the present paragraph is repeated periodically.

Paragraph [0122]—This Paragraph [0122] illustrates Map Data Sending/Receiving Software H55c4 stored in Caller/Callee Software Storage Area H55c (Paragraph [0103]) of Host H (Paragraph [0025]) and Map Data Sending/Receiving Software 20655c4A stored in Callee's Information Displaying Software Storage Area 20655cA (Paragraph [0099]) of Callee's Device, which sends and receives the map data. In the present embodiment, CPU 211 (FIG. 1) of Callee's Device retrieves the callee's calculated GPS data from Callee's Calculated GPS Data Storage Area 20655b6A (Paragraph [0094]) (S1), and sends the data to Host H (S2). Upon receiving the calculated GPS data from Callee's Device (S3), Host H identifies the map data in Map Data Storage Area H55b3 (Paragraph [0102]) (S4). Here, the map data represents the surrounding area of the location indicated by the callee's calculated GPS data. Host H retrieves the map data from Map Data Storage Area H55b3 (Paragraph [0102]) (S5), and sends the data to Callee's Device (S6). Upon receiving the map data from Host H (S7), Callee's Device stores the data in Callee's Map Data Storage Area 20655b8A (Paragraph [0094]) (S8). The sequence described in the present paragraph is repeated periodically.

Paragraph [0123]—This Paragraph [0123] illustrates Callee's Audiovisual Data Collecting Software 20655c5A stored in Callee's Information Displaying Software Storage Area 20655cA (Paragraph [0099]) of Callee's Device, which collects the audiovisual data of the callee to be sent to Caller's Device via Antenna 218 (FIG. 1) thereof. CPU 211 (FIG. 1) of Callee's Device retrieves the callee's audiovisual data from CCD Unit 214 and Microphone 215 (S1). CPU 211 then stores the callee's audio data in Callee's Audio Data Storage Area 20655b2aA (Paragraph [0096]) (S2), and the callee's visual data in Callee's Visual Data Storage Area 20655b2bA (Paragraph [0096]) (S3). The sequence described in the present paragraph is repeated periodically.

Paragraph [0124]—This Paragraph [0124] illustrates Callee's Information Sending/Receiving Software H55c6a (Paragraph [0103]) stored in Caller/Callee Software Storage Area H55c (Paragraph [0103]) of Host H (Paragraph [0025]) and Callee's Information Sending/Receiving Software 20655c6A (Paragraph [0099]) stored in Callee's Information Displaying Software Storage Area 20655cA of Callee's Device, which sends and receives the Callee's Information (which is defined hereinafter) between Callee's Device and Host H. In the present embodiment, CPU 211 (FIG. 1) of Callee's Device retrieves the permitted callee's personal data from Callee's Personal Data Storage Area 20655b4A (Paragraph [0098]) (S1). CPU 211 retrieves the callee's calculated GPS data from Callee's Calculated GPS Data Storage Area 20655b6A (Paragraph [0094]) (S2). CPU 211 retrieves the map data from Callee's Map Data Storage Area 20655b8A (Paragraph [0094]) (S3). CPU 211 retrieves the callee's audio data from Callee's Audio Data Storage Area 20655b2aA (Paragraph [0096]) (S4). CPU 211 retrieves the callee's visual data from Callee's Visual Data Storage Area 20655b2bA (Paragraph [0096]) (S5). CPU 211 then sends the data retrieved in S1 through S5 (collectively defined as the 'Callee's Information' hereinafter) to Host H (S6). Upon receiving the Callee's Information from Callee's Device (S7), Host H stores the Callee's Information in Callee's Information Storage Area H55b2 (Paragraph [0102]) (S8). The sequence described in the present paragraph is repeated periodically.

Paragraph [0125]—This Paragraph [0125] illustrates Callee's Information Sending/Receiving Software H55c6a stored in Caller/Callee Software Storage Area H55c (Paragraph [0103]) of Host H (Paragraph [0025]) and Callee's Information Sending/Receiving Software 20655c6a stored in Caller's Information Displaying Software Storage Area 20655c (Paragraph [0091]) of Caller's Device, which sends and receives the Callee's Information between Host H and Caller's Device. In the present embodiment, Host H retrieves the Callee's Information from Callee's Information Storage Area H55b2 (Paragraph [0102]) (S1), and sends the Callee's Information to Caller's Device (S2). CPU 211 (FIG. 1) of Caller's Device receives the Callee's Information from Host H (S3). CPU 211 stores the permitted callee's personal data in Callee's Personal Data Storage Area 20655b4 (Paragraph [0090]) (S4). CPU 211 stores the callee's calculated GPS data in Callee's Calculated GPS Data Storage Area 20655b6 (Paragraph [0086]) (S5). CPU 211 stores the map data in Callee's Map Data Storage Area 20655b8 (Paragraph [0086]) (S6). CPU 211 stores the callee's audio data in Callee's Audio Data Storage Area 20655b2a (Paragraph [0088]) (S7). CPU 211 stores the callee's visual data in Callee's Visual Data Storage Area 20655b2b (Paragraph [0088]) (S8). The sequence described in the present paragraph is repeated periodically.

Paragraph [0126]—This Paragraph [0126] illustrates Permitted Callee's Personal Data Displaying Software 20655c7 stored in Caller's Information Displaying Software Storage Area 20655c (Paragraph [0091]) of Caller's Device, which displays the permitted callee's personal data on LCD 201 (FIG. 1) of Caller's Device. In the present embodiment, CPU 211 (FIG. 1) of Caller's Device retrieves the permitted callee's personal data from Callee's Personal Data Storage Area 20655*b*4 (Paragraph [0090]) (S1). CPU 211 then displays the permitted callee's personal data on LCD 201 (FIG. 1) (S2). The sequence described in the present paragraph is repeated periodically.

Paragraph [0127]—This Paragraph [0127] illustrates Map Displaying Software 20655*c*8 stored in Caller's Information Displaying Software Storage Area 20655*c* (Paragraph [0091]) of Caller's Device, which displays the map representing the surrounding area of the location indicated by the callee's calculated GPS data. In the present embodiment, CPU 211 (FIG. 1) of Caller's Device retrieves the callee's calculated GPS data from Callee's Calculated GPS Data Storage Area 20655*b*6 (Paragraph [0086]) (S1). CPU 211 then retrieves the map data from Callee's Map Data Storage Area 20655*b*8 (Paragraph [0086]) (S2), and arranges on the map data the callee's current location icon in accordance with the callee's calculated GPS data (S3). Here, the callee's current location icon is an icon which represents the location of Callee's Device in the map data. The map with the callee's current location icon is displayed on LCD 201 (FIG. 1) (S4). The sequence described in the present paragraph is repeated periodically.

Paragraph [0128]—This Paragraph [0128] illustrates Callee's Audio Data Outputting Software 20655*c*9 stored in Caller's Information Displaying Software Storage Area 20655*c* (Paragraph [0091]) of Caller's Device, which outputs the callee's audio data from Speaker 216 (FIG. 1) of Caller's Device. In the present embodiment, CPU 211 (FIG. 1) of Caller's Device retrieves the callee's audio data from Callee's Audio Data Storage Area 20655*b*2*a* (Paragraph [0088]) (S1). CPU 211 then outputs the caller's audio data from Speaker 216 (FIG. 1) (S2). The sequence described in the present paragraph is repeated periodically.

Paragraph [0129]—This Paragraph [0129] illustrates Callee's Visual Data Displaying Software 20655*c*10 stored in Caller's Information Displaying Software Storage Area 20655*c* (Paragraph [0091]) of Caller's Device, which displays the callee's visual data on LCD 201 (FIG. 1) of Caller's Device. In the present embodiment, CPU 211 (FIG. 1) of Caller's Device retrieves the callee's visual data from Callee's Visual Data Storage Area 20655*b*2*b* (Paragraph [0088]) (S1). CPU 211 then displays the callee's visual data on LCD 201 (FIG. 1) (S2). The sequence described in the present paragraph is repeated periodically.

Paragraph [0130]—<<Communication Device Remote Controlling Function (By Phone)>>

Paragraph [0131]—Paragraph [0132] through Paragraph [0155] illustrate the communication device remote controlling function (by phone) which enables the user of Communication Device 200 to remotely control Communication Device 200 via conventional telephone Phone PH (not shown).

Paragraph [0132]—This Paragraph [0132] illustrates the storage areas included in Host H (Paragraph [0025]). In the present embodiment, Host H includes Communication Device Controlling Information Storage Area H57*a* of which the data and the software programs stored therein are described in Paragraph [0133].

Paragraph [0133]—This Paragraph [0133] illustrates the storage areas included in Communication Device Controlling Information Storage Area H57*a* (Paragraph [0132]). In the present embodiment, Communication Device Controlling Information Storage Area H57*a* includes Communication Device Controlling Data Storage Area H57*b* and Communication Device Controlling Software Storage Area H57*c*. Communication Device Controlling Data Storage Area H57*b* stores the data necessary to implement the present function on the side of Host H (Paragraph [0025]), such as the ones described in Paragraph [0134] through Paragraph [0137]. Communication Device Controlling Software Storage Area H57*c* stores the software programs necessary to implement the present function on the side of Host H, such as the ones described in Paragraph [0138].

Paragraph [0134]—This Paragraph [0134] illustrates the storage areas included in Communication Device Controlling Data Storage Area H57*b* (Paragraph [0133]). In the present embodiment, Communication Device Controlling Data Storage Area H57*b* includes Password Data Storage Area H57*b*1, Phone Number Data Storage Area H57*b*2, Audio Data Storage Area H57*b*3, and Work Area H57*b*4. Password Data Storage Area H57*b*1 stores the data described in Paragraph [0135]. Phone Number Data Storage Area H57*b*2 stores the data described in Paragraph [0136]. Audio Data Storage Area H57*b*3 stores the data described in Paragraph [0137]. Work Area H57*b*4 is utilized as a work area to perform calculation and to temporarily store data.

Paragraph [0135]—This Paragraph [0135] illustrates the data stored in Password Data Storage Area H57*b*1 (Paragraph [0134]). In the present embodiment, Password Data Storage Area H57*b*1 comprises two columns, i.e., 'User ID' and 'Password Data'. Column 'User ID' stores the user IDs, and each user ID represents the identification of the user of Communication Device 200. Column 'Password Data' stores the password data, and each password data represents the password set by the user of the corresponding user ID. Here, each password data is composed of alphanumeric data. In the present embodiment, Password Data Storage Area H57*b*1 stores the following data: the user ID 'User#1' and the corresponding password data 'Password Data#1'; the user ID 'User#2' and the corresponding password data 'Password Data#2'; the user ID 'User#3' and the corresponding password data 'Password Data#3'; the user ID 'User#4' and the corresponding password data 'Password Data#4'; and the user ID 'User#5' and the corresponding password data 'Password Data#5'.

Paragraph [0136]—This Paragraph [0136] illustrates the data stored in Phone Number Data Storage Area H57*b*2 (Paragraph [0134]). In the present embodiment, Phone Number Data Storage Area H57*b*2 comprises two columns, i.e., 'User ID' and 'Phone Number Data'. Column 'User ID' stores the user IDs, and each user ID represents the identification of the user of Communication Device 200. Column 'Phone Number Data' stores the phone number data, and each phone number data represents the phone number of the user of the corresponding user ID. Here, each phone number data is composed of numeric data. In the present embodiment, Phone Number Data Storage Area H57*b*2 stores the following data: the user ID 'User#1' and the corresponding phone number data 'Phone Number Data#1'; the user ID 'User#2' and the corresponding phone number data 'Phone Number Data#2'; the user ID 'User#3' and the corresponding phone number data 'Phone Number Data#3'; the user ID 'User#4' and the corresponding phone number data 'Phone Number Data#4'; and the user ID 'User#5' and the corresponding phone number data 'Phone Number Data#5'.

Paragraph [0137]—This Paragraph [0137] illustrates the data stored in Audio Data Storage Area H57*b*3 (Paragraph [0134]). In the present embodiment, Audio Data Storage Area H57*b*3 comprises two columns, i.e., 'Audio ID' and 'Audio Data'. Column 'Audio ID' stores the audio IDs, and each audio ID represents the identification of the audio data stored in column 'Audio Data'. Column 'Audio Data' stores the audio data, and each audio data represents a message output from a conventional telephone Phone PH. In the present embodiment, Audio Data Storage Area H57b3 stores the following data: the audio ID 'Audio#0' and the corresponding audio data 'Audio Data#0'; the audio ID 'Audio#1' and the corresponding audio data 'Audio Data#1'; the audio ID 'Audio#2' and the corresponding audio data 'Audio Data#2'; the audio ID 'Audio#3' and the corresponding audio data 'Audio Data#3'; the audio ID 'Audio#4' and the corresponding audio data 'Audio Data#4'; the audio ID 'Audio#5' and the corresponding audio data 'Audio Data#5'; and the audio ID 'Audio#6' and the corresponding audio data 'Audio Data#6'. 'Audio Data#0' represents the message: 'To deactivate manner mode, press 1. To deactivate manner mode and ring your mobile phone, press 2. To ring your mobile phone, press 3. To change password of your mobile phone, press 4. To lock your mobile phone, press 5. To power off your mobile phone, press 6.' 'Audio Data#1' represents the message: 'The manner mode has been deactivated.' 'Audio Data#2' represents the message: 'The manner mode has been deactivated and your mobile phone has been rung.' 'Audio Data#3' represents the message: 'Your mobile phone has been rung.' 'Audio Data#4' represents the message: 'The password of your mobile phone has been changed.' 'Audio Data#5' represents the message: 'Your mobile phone has been changed.' 'Audio Data#6' represents the message: 'Your mobile phone has been power-offed.' The foregoing audio data may be recorded in either male's voice or female's voice.

Paragraph [0138]—This Paragraph [0138] illustrates the software programs stored in Communication Device Controlling Software Storage Area H57c (Paragraph [0133]). In the present embodiment, Communication Device Controlling Software Storage Area H57c stores User Authenticating Software H57c1, Menu Introducing Software H57c2, Line Connecting Software H57c3, Manner Mode Deactivating Software H57c4, Manner Mode Deactivating & Ringing Software H57c5, Ringing Software H57c6, Password Changing Software H57c7, Device Locking Software H57c8, and Power Off Software H57c9. User Authenticating Software H57c1 is the software program described in Paragraph [0147]. Menu Introducing Software H57c2 is the software program described in Paragraph [0148]. Line Connecting Software H57c3 is the software program described in Paragraph [0149]. Manner Mode Deactivating Software H57c4 is the software program described in Paragraph [0150]. Manner Mode Deactivating & Ringing Software H57c5 is the software program described in Paragraph [0151]. Ringing Software H57c6 is the software program described in Paragraph [0152]. Password Changing Software H57c7 is the software program described in Paragraph [0153]. Device Locking Software H57c8 is the software program described in Paragraph [0154]. Power Off Software H57c9 is the software program described in Paragraph [0155].

Paragraph [0139]—This Paragraph [0139] illustrates the storage area included in RAM 206 (FIG. 1). In the present embodiment, RAM 206 includes Communication Device Controlling Information Storage Area 20657a of which the data and the software programs stored therein are described in Paragraph [0140].

Paragraph [0140]—This Paragraph [0140] illustrates the storage areas included in Communication Device Controlling Information Storage Area 20657a (Paragraph [0139]). In the present embodiment, Communication Device Controlling Information Storage Area 20657a includes Communication Device Controlling Data Storage Area 20657b and Communication Device Controlling Software Storage Area 20657c. Communication Device Controlling Data Storage Area 20657b stores the data necessary to implement the present function on the side of Communication Device 200, such as the ones described in Paragraph [0142] through Paragraph [0144]. Communication Device Controlling Software Storage Area 20657c stores the software programs necessary to implement the present function on the side of Communication Device 200, such as the ones described in Paragraph [0145].

Paragraph [0141]—The data and/or the software programs stored in Communication Device Controlling Information Storage Area 20657a (Paragraph [0140]) may be downloaded from Host H (Paragraph [0025]).

Paragraph [0142]—This Paragraph [0142] illustrates the storage areas included in Communication Device Controlling Data Storage Area 20657b (Paragraph [0140]). In the present embodiment, Communication Device Controlling Data Storage Area 20657b includes Password Data Storage Area 20657b1 and Work Area 20657b4. Password Data Storage Area 20657b1 stores the data described in Paragraph [0143]. Work Area 20657b4 is utilized as a work area to perform calculation and to temporarily store data.

Paragraph [0143]—This Paragraph [0143] illustrates the data stored in Password Data Storage Area 20657b1 (Paragraph [0142]). In the present embodiment, Password Data Storage Area 20657b1 comprises two columns, i.e., 'User ID' and 'Password Data'. Column 'User ID' stores the user ID which represents the identification of the user of Communication Device 200. Column 'Password Data' stores the password data set by the user of Communication Device 200. Here, the password data is composed of alphanumeric data. Assuming that the user ID of Communication Device 200 is 'User#1'. In the present embodiment, Password Data Storage Area H57b1 stores the following data: the user ID 'User#1' and the corresponding password data 'Password Data#1'.

Paragraph [0144]—This Paragraph [0144] illustrates the data stored in Phone Number Data Storage Area 20657b2 (Paragraph [0142]). In the present embodiment, Phone Number Data Storage Area 20657b2 comprises two columns, i.e., 'User ID' and 'Phone Number Data'. Column 'User ID' stores the user ID of the user of Communication Device 200. Column 'Phone Number Data' stores the phone number data which represents the phone number of Communication Device 200. Here, the phone number data is composed of numeric data. In the present embodiment, Phone Number Data Storage Area H57b2 stores the following data: the user ID 'User#1' and the corresponding phone number data 'Phone Number Data#1'.

Paragraph [0145]—This Paragraph [0145] illustrates the software programs stored in Communication Device Controlling Software Storage Area 20657c (Paragraph [0140]). In the present embodiment, Communication Device Controlling Software Storage Area 20657c stores Line Connecting Software 20657c3, Manner Mode Deactivating Software 20657c4, Manner Mode Deactivating & Ringing Software 20657c5, Ringing Software 20657c6, Password Changing Software 20657c7, Device Locking Software 20657c8, and Power Off Software 20657c9. Line Connecting Software 20657c3 is the software program described in Paragraph [0149]. Manner Mode Deactivating Software 20657c4 is the software program described in Paragraph [0150]. Manner Mode Deactivating & Ringing Software 20657c5 is the software program described in Paragraph [0151]. Ringing Software 20657c6 is the software program described in Paragraph [0152]. Password Changing Software 20657c7 is the software program described in Paragraph [0153]. Device Locking Software 20657c8 is the software program described in Paragraph [0154]. Power Off Software 20657c9 is the software program described in Paragraph [0155].

Paragraph [0146]—Paragraph [0147] through Paragraph [0155] illustrate the software programs which enables the user of Communication Device 200 to remotely control Communication Device 200 via conventional telephone Phone PH.

Paragraph [0147]—This Paragraph [0147] illustrates User Authenticating Software H57c1 (Paragraph [0138]) stored in Communication Device Controlling Software Storage Area H57c of Host H (Paragraph [0025]), which authenticates the user of Communication Device 200 to implement the present function via Phone PH. In the present embodiment, Phone PH calls Host H by dialing the predetermined phone number of Host H (S1). Upon receiving the call from Phone PH (S2) and the line is connected therebetween (S3), the user, by utilizing Phone PH, inputs both his/her password data (S4) and the phone number data of Communication Device 200 (S5). Host H initiates the authentication process by referring to Password Data Storage Area H57b1 (Paragraph [0135]) and Phone Number Data Storage Area H57b2 (Paragraph [0136])) (S6). The authentication process is completed (and the sequences described hereafter are enabled thereafter) if the password data and the phone number data described in S4 and S5 match with the data stored in Password Data Storage Area H57b1 and Phone Number Data Storage Area H57b2.

Paragraph [0148]—This Paragraph [0148] illustrates Menu Introducing Software H57c2 (Paragraph [0138]) stored in Communication Device Controlling Software Storage Area H57c of Host H (Paragraph [0025]), which introduces the menu via Phone PH. In the present embodiment, Host H retrieves Audio Data#0 from Audio Data Storage Area H57b3 (Paragraph [0137]) (S1), and sends the data to Phone PH (S2). Upon receiving Audio Data#0 from Host H (S3), Phone PH outputs Audio Data#0 from its speaker (S4). The user presses one of the keys of '1' through '6' wherein the sequences implemented thereafter are described in Paragraph [0149] through Paragraph [0155] (S5).

Paragraph [0149]—This Paragraph [0149] illustrates Line Connecting Software H57c3 (Paragraph [0138]) stored in Communication Device Controlling Software Storage Area H57c of Host H (Paragraph [0025]) and Line Connecting Software 20657c3 (Paragraph [0145]) stored in Communication Device Controlling Software Storage Area 20657c of Communication Device 200, which connect line between Host H and Communication Device 200. In the present embodiment, Host H calls Communication Device 200 by retrieving the corresponding phone number data from Phone Number Data Storage Area H57b2 (Paragraph [0136]) (S1). Upon Communication Device 200 receiving the call from Host H (S2), the line is connected therebetween (S3). For the avoidance of doubt, the line is connected between Host H and Communication Device 200 merely to implement the present function, and a voice communication between human beings is not enabled thereafter.

Paragraph [0150]—This Paragraph [0150] illustrates Manner Mode Deactivating Software H57c4 (Paragraph [0138]) stored in Communication Device Controlling Software Storage Area H57c of Host H (Paragraph [0025]) and Manner Mode Deactivating Software 20657c4 (Paragraph [0145]) stored in Communication Device Controlling Software Storage Area 20657c of Communication Device 200, which deactivate the manner mode of Communication Device 200. Here, Communication Device 200 activates Vibrator 217 (FIG. 1) when Communication Device 200 is in the manner mode and outputs a ringing sound from Speaker 216 (FIG. 1) when Communication Device 200 is not in the manner mode, upon receiving an incoming call. Assume that the user presses key '1' of Phone PH (S1). In response, Phone PH sends the corresponding signal to Host H (S2). Host H, upon receiving the signal described in S2, sends a manner mode deactivating command to Communication Device 200 (S3). Upon receiving the manner mode deactivating command from Host H (S4), Communication Device 200 deactivates the manner mode (S5). Host H retrieves Audio Data#1 from Audio Data Storage Area H57b3 (Paragraph [0137]) and sends the data to Phone PH (S6). Upon receiving Audio Data#1 from Host H, Phone PH outputs the data from its speaker (S7). Normally the purpose to output the ringing sound from Speaker 216 is to give a notification to the user that Communication Device 200 has received an incoming call, and a voice communication is enabled thereafter upon answering the call. In contrast, the purpose to output the ringing sound from Speaker 216 by executing Manner Mode Deactivating & Ringing Software H57c5 and Manner Mode Deactivating & Ringing Software 20657c5 is merely to let the user to identify the location of Communication Device 200. Therefore, a voice communication between human beings is not enabled thereafter.

Paragraph [0151]—This Paragraph [0151] illustrates Manner Mode Deactivating & Ringing Software H57c5 (Paragraph [0138]) stored in Communication Device Controlling Software Storage Area H57c of Host H (Paragraph [0025]) and Manner Mode Deactivating & Ringing Software 20657c5 (Paragraph [0145]) stored in Communication Device Controlling Software Storage Area 20657c of Communication Device 200, which deactivate the manner mode of Communication Device 200 and outputs a ringing sound thereafter. Assume that the user presses key '2' of Phone PH (S1). In response, Phone PH sends the corresponding signal to Host H (S2). Host H, upon receiving the signal described in S2, sends a manner mode deactivating & device ringing command to Communication Device 200 (S3). Upon receiving the manner mode deactivating & device ringing command from Host H (S4), Communication Device 200 deactivates the manner mode (S5) and outputs a ring data from Speaker 216 (S6). Host H retrieves Audio Data#2 from Audio Data Storage Area H57b3 (Paragraph [0137]) and sends the data to Phone PH (S7). Upon receiving Audio Data#2 from Host H, Phone PH outputs the data from its speaker (S8). Normally the purpose to output the ringing sound from Speaker 216 is to give a notification to the user that Communication Device 200 has received an incoming call, and a voice communication is enabled thereafter upon answering the call. In contrast, the purpose to output the ringing sound from Speaker 216 by executing Manner Mode Deactivating & Ringing Software H57c5 and Manner Mode Deactivating & Ringing Software 20657c5 is merely to let the user to identify the location of Communication Device 200. Therefore, a voice communication between human beings is not enabled thereafter by implementing the present function.

Paragraph [0152]—This Paragraph [0152] illustrates Ringing Software H57c6 (Paragraph [0138]) stored in Communication Device Controlling Software Storage Area H57c of Host H (Paragraph [0025]) and Ringing Software 20657c6 (Paragraph [0145]) stored in Communication Device Controlling Software Storage Area 20657c of Communication Device 200, which output a ringing sound from Speaker 216 (FIG. 1). Assume that the user presses key '3' of Phone PH (S1). In response, Phone PH sends the corresponding signal to Host H (S2). Host H, upon receiving the signal described in S2, sends a device ringing command to Communication Device 200 (S3). Upon receiving the device ringing command from Host H (S4), Communication Device 200 outputs a ring data from Speaker 216 (S5). Host H retrieves Audio Data#3 from Audio Data Storage Area H57b3 (Paragraph [0137]) and sends the data to Phone PH (S6). Upon receiving Audio Data#3 from Host H, Phone PH outputs the data from its speaker (S7). Normally the purpose to output the ringing sound from Speaker 216 is to give a notification to the user that Communication Device 200 has received an incoming call, and a voice communication is enabled thereafter upon answering the call. In contrast, the purpose to output the ringing sound from Speaker 216 by executing Ringing Software H57*c*6 and Ringing Software 20657*c*6 is merely to let the user to identify the location of Communication Device 200. Therefore, a voice communication between human beings is not enabled thereafter by implementing the present function.

Paragraph [0153]—This Paragraph [0153] illustrates Password Changing Software H57*c*7 (Paragraph [0138]) stored in Communication Device Controlling Software Storage Area H57*c* of Host H (Paragraph [0025]) and Password Changing Software 20657*c*7 (Paragraph [0145]) stored in Communication Device Controlling Software Storage Area 20657*c* of Communication Device 200, which change the password necessary to operate Communication Device 200. Assume that the user presses key '4' of Phone PH (S1). In response, Phone PH sends the corresponding signal to Host H (S2). The user then enters a new password data by utilizing Phone PH (S3), which is sent to Communication Device 200 by Host H (S4). Upon receiving the new password data from Host H (S5), Communication Device 200 stores the new password data in Password Data Storage Area 20657*b*1 (Paragraph [0143]) and the old password data is erased (S6). Host H retrieves Audio Data#4 from Audio Data Storage Area H57*b*3 (Paragraph [0137]) and sends the data to Phone PH (S7). Upon receiving Audio Data#4 from Host H, Phone PH outputs the data from its speaker (S8).

Paragraph [0154]—This Paragraph [0154] illustrates Device Locking Software H57*c*8 (Paragraph [0138]) stored in Communication Device Controlling Software Storage Area H57*c* of Host H (Paragraph [0025]) and Device Locking Software 20657*c*8 (Paragraph [0145]) stored in Communication Device Controlling Software Storage Area 20657*c* of Communication Device 200, which lock Communication Device 200, i.e., nullify any input signal input via Input Device 210 (FIG. 1). Assume that the user presses key '5' of Phone PH (S1). In response, Phone PH sends the corresponding signal to Host H (S2). Host H, upon receiving the signal described in S2, sends a device locking command to Communication Device 200 (S3). Upon receiving the device locking command from Host H (S4), Communication Device 200 is locked thereafter, i.e., any input via Input Device 210 is nullified unless a password data matching to the one stored in Password Data Storage Area 20657*b*1 (Paragraph [0143]) is entered (S5). Host H retrieves Audio Data#5 from Audio Data Storage Area H57*b*3 (Paragraph [0137]) and sends the data to Phone PH (S6). Upon receiving Audio Data#5 from Host H, Phone PH outputs the data from its speaker (S7).

Paragraph [0155]—This Paragraph [0155] illustrates Power Off Software H57*c*9 (Paragraph [0138]) stored in Communication Device Controlling Software Storage Area H57*c* of Host H (Paragraph [0025]) and Power Off Software 20657*c*9 (Paragraph [0145]) stored in Communication Device Controlling Software Storage Area 20657*c* of Communication Device 200, which turn off the power of Communication Device 200. Assume that the user presses key '6' of Phone PH (S1). In response, Phone PH sends the corresponding signal to Host H (S2). Host H, upon receiving the signal described in S2, sends a power off command to Communication Device 200 (S3). Upon receiving the power off command from Host H (S4), Communication Device 200 turns off the power of itself (S5). Host H retrieves Audio Data#6 from Audio Data Storage Area H57*b*3 (Paragraph [0137]) and sends the data to Phone PH (S6). Upon receiving Audio Data#6 from Host H, Phone PH outputs the data from its speaker (S7).

Paragraph [0156]—<<Communication Device Remote Controlling Function (By Web)>>

Paragraph [0157]—Paragraph [0158] through Paragraph [0181] illustrate the communication device remote controlling function (by web) which enables the user of Communication Device 200 to remotely control Communication Device 200 by an ordinary personal computer (Personal Computer PC) via the Internet, i.e., by accessing a certain web site. Here, Personal Computer PC may be any type of personal computer, including a desktop computer, lap top computer, and PDA.

Paragraph [0158]—This Paragraph [0158] illustrates the storage areas included in Host H (Paragraph [0025]). In the present embodiment, Host H includes Communication Device Controlling Information Storage Area H58*a* of which the data and the software programs stored therein are described in Paragraph [0159].

Paragraph [0159]—This Paragraph [0159] illustrates the storage areas included in Communication Device Controlling Information Storage Area H58*a* (Paragraph [0158]). In the present embodiment, Communication Device Controlling Information Storage Area H58*a* includes Communication Device Controlling Data Storage Area H58*b* and Communication Device Controlling Software Storage Area H58*c*. Communication Device Controlling Data Storage Area H58*b* stores the data necessary to implement the present function on the side of Host H (Paragraph [0025]), such as the ones described in Paragraph [0160] through Paragraph [0163]. Communication Device Controlling Software Storage Area H58*c* stores the software programs necessary to implement the present function on the side of Host H, such as the ones described in Paragraph [0164].

Paragraph [0160]—This Paragraph [0160] illustrates the storage areas included in Communication Device Controlling Data Storage Area H58*b* (Paragraph [0159]). In the present embodiment, Communication Device Controlling Data Storage Area H58*b* includes Password Data Storage Area H58*b*1, Phone Number Data Storage Area H58*b*2, Web Display Data Storage Area H58*b*3, and Work Area H58*b*4. Password Data Storage Area H58*b*1 stores the data described in Paragraph [0161]. Phone Number Data Storage Area H58*b*2 stores the data described in Paragraph [0162]. Web Display Data Storage Area H58*b*3 stores the data described in Paragraph [0163]. Work Area H58*b*4 is utilized as a work area to perform calculation and to temporarily store data.

Paragraph [0161]—This Paragraph [0161] illustrates the data stored in Password Data Storage Area H58*b*1 (Paragraph [0160]). In the present embodiment, Password Data Storage Area H58*b*1 comprises two columns, i.e., 'User ID' and 'Password Data'. Column 'User ID' stores the user IDs, and each user ID represents the identification of the user of Communication Device 200. Column 'Password Data' stores the password data, and each password data represents the password set by the user of the corresponding user ID. Here, each password data is composed of alphanumeric data. In the present embodiment, Password Data Storage Area H58*b*1 stores the following data: the user ID 'User#1' and the corresponding password data 'Password Data#1'; the user ID 'User#2' and the corresponding password data 'Password Data#2'; the user ID 'User#3' and the corresponding password data 'Password Data#3'; the user ID 'User#4' and the corresponding password data 'Password Data#4'; and the user ID 'User#5' and the corresponding password data 'Password Data#5'.

Paragraph [0162]—This Paragraph [0162] illustrates the data stored in Phone Number Data Storage Area H58*b*2 (Paragraph [0160]). In the present embodiment, Phone Number Data Storage Area H58*b*2 comprises two columns, i.e., 'User ID' and 'Phone Number Data'. Column 'User ID' stores the user IDs, and each user ID represents the identification of the user of Communication Device 200. Column 'Phone Number Data' stores the phone number data, and each phone number data represents the phone number of the user of the corresponding user ID. Here, each phone number data is composed of numeric data. In the present embodiment, Phone Number Data Storage Area H58*b*2 stores the following data: the user ID 'User#1' and the corresponding phone number data 'Phone Number Data#1'; the user ID 'User#2' and the corresponding phone number data 'Phone Number Data#2'; the user ID 'User#3' and the corresponding phone number data 'Phone Number Data#3'; the user ID 'User#4' and the corresponding phone number data 'Phone Number Data#4'; and the user ID 'User#5' and the corresponding phone number data 'Phone Number Data#5'.

Paragraph [0163]—This Paragraph [0163] illustrates the data stored in Web Display Data Storage Area H58*b*3 (Paragraph [0160]). In the present embodiment, Web Display Data Storage Area H58*b*3 comprises two columns, i.e., 'Web Display ID' and 'Web Display Data'. Column 'Web Display ID' stores the web display IDs, and each web display ID represents the identification of the web display data stored in column 'Web Display Data'. Column 'Web Display Data' stores the web display data, and each web display data represents a message displayed on Personal Computer PC. In the present embodiment, Web Display Data Storage Area H58*b*3 stores the following data: the web display ID 'Web Display#0' and the corresponding web display data 'Web Display Data#0'; the web display ID 'Web Display#1' and the corresponding web display data 'Web Display Data#1'; the web display ID 'Web Display#2' and the corresponding web display data 'Web Display Data#2'; the web display ID 'Web Display#3' and the corresponding web display data 'Web Display Data#3'; the web display ID 'Web Display#4' and the corresponding web display data 'Web Display Data#4'; the web display ID 'Web Display#5' and the corresponding web display data 'Web Display Data#5'; and the web display ID 'Web Display#6' and the corresponding web display data 'Web Display Data#6'. 'Web Display Data#0' represents the message: 'To deactivate manner mode, press 1. To deactivate manner mode and ring your mobile phone, press 2. To ring your mobile phone, press 3. To change password of your mobile phone, press 4. To lock your mobile phone, press 5. To power off your mobile phone, press 6.' 'Web Display Data#1' represents the message: 'The manner mode has been deactivated.' 'Web Display Data#2' represents the message: 'The manner mode has been deactivated and your mobile phone has been rung.' 'Web Display Data#3' represents the message: 'Your mobile phone has been rung.' 'Web Display Data#4' represents the message: 'The password of your mobile phone has been changed.' 'Web Display Data#5' represents the message: 'Your mobile phone has been changed.' 'Web Display Data#6' represents the message: 'Your mobile phone has been power-offed.' Paragraph [0163]a illustrates the display of Personal Computer PC. In the present embodiment, Home Page 20158HP, i.e., a home page to implement the present function is displayed on Personal Computer PC. Home Page 20158HP is primarily composed of Web Display Data#0 (Paragraph [0163]) and six buttons, i.e., Buttons 1 through 6. Following the instruction described in Web Display Data#0, the user may select one of the buttons to implement the desired function as described hereinafter.

Paragraph [0164]—This Paragraph [0164] illustrates the software programs stored in Communication Device Controlling Software Storage Area H58*c* (Paragraph [0159]). In the present embodiment, Communication Device Controlling Software Storage Area H58*c* stores User Authenticating Software H58*c*1, Menu Introducing Software H58*c*2, Line Connecting Software H58*c*3, Manner Mode Deactivating Software H58*c*4, Manner Mode Deactivating & Ringing Software H58*c*5, Ringing Software H58*c*6, Password Changing Software H58*c*7, Device Locking Software H58*c*8, and Power Off Software H58*c*9. User Authenticating Software H58*c*1 is the software program described in Paragraph [0173]. Menu Introducing Software H58*c*2 is the software program described in Paragraph [0174]. Line Connecting Software H58*c*3 is the software program described in Paragraph [0175]. Manner Mode Deactivating Software H58*c*4 is the software program described in Paragraph [0176]. Manner Mode Deactivating & Ringing Software H58*c*5 is the software program described in Paragraph [0177]. Ringing Software H58*c*6 is the software program described in Paragraph [0178]. Password Changing Software H58*c*7 is the software program described in Paragraph [0179]. Device Locking Software H58*c*8 is the software program described in Paragraph [0180]. Power Off Software H58*c*9 is the software program described in Paragraph [0181].

Paragraph [0165]—This Paragraph [0165] illustrates the storage area included in RAM 206 (FIG. 1). In the present embodiment, RAM 206 includes Communication Device Controlling Information Storage Area 20658*a* of which the data and the software programs stored therein are described in Paragraph [0166].

Paragraph [0166]—This Paragraph [0166] illustrates the storage areas included in Communication Device Controlling Information Storage Area 20658*a* (Paragraph [0165]). In the present embodiment, Communication Device Controlling Information Storage Area 20658*a* includes Communication Device Controlling Data Storage Area 20658*b* and Communication Device Controlling Software Storage Area 20658*c*. Communication Device Controlling Data Storage Area 20658*b* stores the data necessary to implement the present function on the side of Communication Device 200, such as the ones described in Paragraph [0168] through Paragraph [0170]. Communication Device Controlling Software Storage Area 20658*c* stores the software programs necessary to implement the present function on the side of Communication Device 200, such as the ones described in Paragraph [0171].

Paragraph [0167]—The data and/or the software programs stored in Communication Device Controlling Information Storage Area 20658*a* (Paragraph [0166]) may be downloaded from Host H (Paragraph [0025]).

Paragraph [0168]—This Paragraph [0168] illustrates the storage areas included in Communication Device Controlling Data Storage Area 20658*b* (Paragraph [0166]). In the present embodiment, Communication Device Controlling Data Storage Area 20658*b* includes Password Data Storage Area 20658*b*1 and Work Area 20658*b*4. Password Data Storage Area 20658*b*1 stores the data described in Paragraph [0169]. Work Area 20658*b*4 is utilized as a work area to perform calculation and to temporarily store data.

Paragraph [0169]—This Paragraph [0169] illustrates the data stored in Password Data Storage Area 20658*b*1 (Paragraph [0168]). In the present embodiment, Password Data Storage Area 20658*b*1 comprises two columns, i.e., 'User ID' and 'Password Data'. Column 'User ID' stores the user ID which represents the identification of the user of Communication Device 200. Column 'Password Data' stores the password data set by the user of Communication Device 200. Here, the password data is composed of alphanumeric data. Assuming that the user ID of Communication Device 200 is 'User#1'. In the present embodiment, Password Data Storage Area H58b1 stores the following data: the user ID 'User#1' and the corresponding password data 'Password Data#1'.

Paragraph [0170]—This Paragraph [0170] illustrates the data stored in Phone Number Data Storage Area 20658b2 (Paragraph [0168]). In the present embodiment, Phone Number Data Storage Area 20658b2 comprises two columns, i.e., 'User ID' and 'Phone Number Data'. Column 'User ID' stores the user ID of the user of Communication Device 200. Column 'Phone Number Data' stores the phone number data which represents the phone number of Communication Device 200. Here, the phone number data is composed of numeric data. In the present embodiment, Phone Number Data Storage Area H58b2 stores the following data: the user ID 'User#1' and the corresponding phone number data 'Phone Number Data#1'.

Paragraph [0171]—This Paragraph [0171] illustrates the software programs stored in Communication Device Controlling Software Storage Area 20658c (Paragraph [0166]). In the present embodiment, Communication Device Controlling Software Storage Area 20658c stores Line Connecting Software 20658c3, Manner Mode Deactivating Software 20658c4, Manner Mode Deactivating & Ringing Software 20658c5, Ringing Software 20658c6, Password Changing Software 20658c7, Device Locking Software 20658c8, and Power Off Software 20658c9. Line Connecting Software 20658c3 is the software program described in Paragraph [0175]. Manner Mode Deactivating Software 20658c4 is the software program described in Paragraph [0176]. Manner Mode Deactivating & Ringing Software 20658c5 is the software program described in Paragraph [0177]. Ringing Software 20658c6 is the software program described in Paragraph [0178]. Password Changing Software 20658c7 is the software program described in Paragraph [0179]. Device Locking Software 20658c8 is the software program described in Paragraph [0180]. Power Off Software 20658c9 is the software program described in Paragraph [0181].

Paragraph [0172]—Paragraph [0173] through Paragraph [0181] illustrate the software programs which enables the user of Communication Device 200 to remotely control Communication Device 200 by Personal Computer PC.

Paragraph [0173]—This Paragraph [0173] illustrates User Authenticating Software H58c1 (Paragraph [0164]) stored in Communication Device Controlling Software Storage Area H58c of Host H (Paragraph [0025]), which authenticates the user of Communication Device 200 to implement the present function via Personal Computer PC. In the present embodiment, Personal Computer PC sends an access request to Host H via the Internet (S1). Upon receiving the request from Personal Computer PC (S2) and the line is connected therebetween (S3), the user, by utilizing Personal Computer PC, inputs both his/her password data (S4) and the phone number data of Communication Device 200 (S5). Host H initiates the authentication process by referring to Password Data Storage Area H58b1 (Paragraph [0161]) and Phone Number Data Storage Area H58b2 (Paragraph [0162])) (S6). The authentication process is completed (and the sequences described hereafter are enabled thereafter) if the password data and the phone number data described in S4 and S5 match with the data stored in Password Data Storage Area H58b1 and Phone Number Data Storage Area H58b2.

Paragraph [0174]—This Paragraph [0174] illustrates Menu Introducing Software H58c2 (Paragraph [0164]) stored in Communication Device Controlling Software Storage Area H58c of Host H (Paragraph [0025]), which introduces the menu on Personal Computer PC. In the present embodiment, Host H retrieves Web Display Data#0 from Web Display Data Storage Area H58b3 (Paragraph [0163]) (S1), and sends the data to Personal Computer PC (S2). Upon receiving Web Display Data#0 from Host H (S3), Personal Computer PC displays Web Display Data#0 on its display (S4). The user selects from one of the buttons of '1' through '6' wherein the sequences implemented thereafter are described in Paragraph [0175] through Paragraph [0181] (S5).

Paragraph [0175]—This Paragraph [0175] illustrates Line Connecting Software H58c3 (Paragraph [0164]) stored in Communication Device Controlling Software Storage Area H58c of Host H (Paragraph [0025]) and Line Connecting Software 20658c3 (Paragraph [0171]) stored in Communication Device Controlling Software Storage Area 20658c of Communication Device 200, which connect line between Host H and Communication Device 200. In the present embodiment, Host H calls Communication Device 200 by retrieving the corresponding phone number data from Phone Number Data Storage Area H58b2 (Paragraph [0162]) (S1). Upon Communication Device 200 receiving the call from Host H (S2), the line is connected therebetween (S3). For the avoidance of doubt, the line is connected between Host H and Communication Device 200 merely to implement the present function, and a voice communication between human beings is not enabled thereafter.

Paragraph [0176]—This Paragraph [0176] illustrates Manner Mode Deactivating Software H58c4 (Paragraph [0164]) stored in Communication Device Controlling Software Storage Area H58c of Host H (Paragraph [0025]) and Manner Mode Deactivating Software 20658c4 (Paragraph [0171]) stored in Communication Device Controlling Software Storage Area 20658c of Communication Device 200, which deactivate the manner mode of Communication Device 200. Here, Communication Device 200 activates Vibrator 217 (FIG. 1) when Communication Device 200 is in the manner mode and outputs a ringing sound from Speaker 216 (FIG. 1) when Communication Device 200 is not in the manner mode, upon receiving an incoming call. Assume that the user selects button '1' displayed on Personal Computer PC (S1). In response, Personal Computer PC sends the corresponding signal to Host H via the Internet (S2). Host H, upon receiving the signal described in S2, sends a manner mode deactivating command to Communication Device 200 (S3). Upon receiving the manner mode deactivating command from Host H (S4), Communication Device 200 deactivates the manner mode (S5). Host H retrieves Web Display Data#1 from Web Display Data Storage Area H58b3 (Paragraph [0163]) and sends the data to Personal Computer PC (S6). Upon receiving Web Display Data#1 from Host H, Personal Computer PC displays the data (S7). Normally the purpose to output the ringing sound from Speaker 216 is to give a notification to the user that Communication Device 200 has received an incoming call, and a voice communication is enabled thereafter upon answering the call. In contrast, the purpose to output the ringing sound from Speaker 216 by executing Manner Mode Deactivating & Ringing Software H58c5 and Manner Mode Deactivating & Ringing Software 20658c5 is merely to let the user to identify the location of Communication Device 200. Therefore, a voice communication between human beings is not enabled thereafter.

Paragraph [0177]—This Paragraph [0177] illustrates Manner Mode Deactivating & Ringing Software H58c5 (Paragraph [0164]) stored in Communication Device Controlling Software Storage Area H58c of Host H (Paragraph [0025]) and Manner Mode Deactivating & Ringing Software 20658c5 (Paragraph [0171]) stored in Communication Device Controlling Software Storage Area 20658c of Communication Device 200, which deactivate the manner mode of Communication Device 200 and outputs a ringing sound thereafter. Assume that the user selects button '2' displayed on Personal Computer PC (S1). In response, Personal Computer PC sends the corresponding signal to Host H via the Internet (S2). Host H, upon receiving the signal described in S2, sends a manner mode deactivating & device ringing command to Communication Device 200 (S3). Upon receiving the manner mode deactivating & device ringing command from Host H (S4), Communication Device 200 deactivates the manner mode (S5) and outputs a ring data from Speaker 216 (S6). Host H retrieves Web Display Data#2 from Web Display Data Storage Area H58b3 (Paragraph [0163]) and sends the data to Personal Computer PC (S7). Upon receiving Web Display Data#2 from Host H, Personal Computer PC displays the data (S8). Normally the purpose to output the ringing sound from Speaker 216 is to give a notification to the user that Communication Device 200 has received an incoming call, and a voice communication is enabled thereafter upon answering the call. In contrast, the purpose to output the ringing sound from Speaker 216 by executing Manner Mode Deactivating & Ringing Software H58c5 and Manner Mode Deactivating & Ringing Software 20658c5 is merely to let the user to identify the location of Communication Device 200. Therefore, a voice communication between human beings is not enabled thereafter by implementing the present function.

Paragraph [0178]—This Paragraph [0178] illustrates Ringing Software H58c6 (Paragraph [0164]) stored in Communication Device Controlling Software Storage Area H58c of Host H (Paragraph [0025]) and Ringing Software 20658c6 (Paragraph [0171]) stored in Communication Device Controlling Software Storage Area 20658c of Communication Device 200, which output a ringing sound from Speaker 216 (FIG. 1). Assume that the user selects button '3' displayed on Personal Computer PC (S1). In response, Personal Computer PC sends the corresponding signal to Host H via the Internet (S2). Host H, upon receiving the signal described in S2, sends a device ringing command to Communication Device 200 (S3). Upon receiving the device ringing command from Host H (S4), Communication Device 200 outputs a ring data from Speaker 216 (S5). Host H retrieves Web Display Data#3 from Web Display Data Storage Area H58b3 (Paragraph [0163]) and sends the data to Personal Computer PC (S6). Upon receiving Web Display Data#3 from Host H, Personal Computer PC displays the data (S7). Normally the purpose to output the ringing sound from Speaker 216 is to give a notification to the user that Communication Device 200 has received an incoming call, and a voice communication is enabled thereafter upon answering the call. In contrast, the purpose to output the ringing sound from Speaker 216 by executing Ringing Software H58c6 and Ringing Software 20658c6 is merely to let the user to identify the location of Communication Device 200. Therefore, a voice communication between human beings is not enabled thereafter by implementing the present function.

Paragraph [0179]—This Paragraph [0179] illustrates Password Changing Software H58c7 (Paragraph [0164]) stored in Communication Device Controlling Software Storage Area H58c of Host H (Paragraph [0025]) and Password Changing Software 20658c7 (Paragraph [0171]) stored in Communication Device Controlling Software Storage Area 20658c of Communication Device 200, which change the password necessary to operate Communication Device 200. Assume that the user selects button '4' displayed on Personal Computer PC (S1). In response, Personal Computer PC sends the corresponding signal to Host H via the Internet (S2). The user then enters a new password data by utilizing Personal Computer PC (S3), which is sent to Communication Device 200 by Host H (S4). Upon receiving the new password data from Host H (S5), Communication Device 200 stores the new password data in Password Data Storage Area 20658b1 (Paragraph [0169]) and the old password data is erased (S6). Host H retrieves Web Display Data#4 from Web Display Data Storage Area H58b3 (Paragraph [0163]) and sends the data to Personal Computer PC (S7). Upon receiving Web Display Data#4 from Host H, Personal Computer PC displays the data (S8).

Paragraph [0180]—This Paragraph [0180] illustrates Device Locking Software H58c8 (Paragraph [0164]) stored in Communication Device Controlling Software Storage Area H58c of Host H (Paragraph [0025]) and Device Locking Software 20658c8 (Paragraph [0171]) stored in Communication Device Controlling Software Storage Area 20658c of Communication Device 200, which lock Communication Device 200, i.e., nullify any input signal input via Input Device 210 (FIG. 1). Assume that the user selects button '5' displayed on Personal Computer PC (S1). In response, Personal Computer PC sends the corresponding signal to Host H via the Internet (S2). Host H, upon receiving the signal described in S2, sends a device locking command to Communication Device 200 (S3). Upon receiving the device locking command from Host H (S4), Communication Device 200 is locked thereafter, i.e., any input via Input Device 210 is nullified unless a password data matching to the one stored in Password Data Storage Area 20658b1 (Paragraph [0169]) is entered (S5). Host H retrieves Web Display Data#5 from Web Display Data Storage Area H58b3 (Paragraph [0163]) and sends the data to Personal Computer PC (S6). Upon receiving Web Display Data#5 from Host H, Personal Computer PC displays the data (S7).

Paragraph [0181]—This Paragraph [0181] illustrates Power Off Software H58c9 (Paragraph [0164]) stored in Communication Device Controlling Software Storage Area H58c of Host H (Paragraph [0025]) and Power Off Software 20658c9 (Paragraph [0171]) stored in Communication Device Controlling Software Storage Area 20658c of Communication Device 200, which turn off the power of Communication Device 200. Assume that the user selects button '6' displayed on Personal Computer PC (S1). In response, Personal Computer PC sends the corresponding signal to Host H via the Internet (S2). Host H, upon receiving the signal described in S2, sends a power off command to Communication Device 200 (S3). Upon receiving the power off command from Host H (S4), Communication Device 200 turns off the power of itself (S5). Host H retrieves Web Display Data#6 from Web Display Data Storage Area H58b3 (Paragraph [0163]) and sends the data to Personal Computer PC (S6). Upon receiving Web Display Data#6 from Host H, Personal Computer PC displays the data (S7).

Paragraph [0182]—<<OS Updating Function>>

Paragraph [0183]—Paragraph [0184] through Paragraph [0244] illustrate the OS updating function which updates the operating system of Communication Device 200 in a wireless fashion. In other words, Communication Device 200 downloads the portion of the operating system of the latest version from Host H (Paragraph [0025]) via Antenna 218 (FIG. 1).

Paragraph [0184]—This Paragraph [0184] illustrates the storage areas included in RAM 206 (FIG. 1). In the present embodiment, RAM 206 includes Operating System 20663OS of which the data stored therein are described in Paragraph [0185], and OS Updating Information Storage Area 20663*a* of which the data and the software programs stored therein are described in Paragraph [0186].

Paragraph [0185]—This Paragraph [0185] illustrates the data stored in Operating System 20663OS (Paragraph [0184]). In the present embodiment, Operating System 20663OS includes Battery Controller 20663OSa, CCD Unit Controller 20663OSb, Flash Light Unit Controller 20663OSc, Indicator Controller 20663OSd, Input Device Controller 20663OSe, LCD Controller 20663OSf, LED Controller 20663OSg, Memory Card Interface Controller 20663OSh, Microphone Controller 20663OSi, Photometer Controller 20663OSj, RAM Controller 20663OSk, ROM Controller 20663OSl, Signal Processor Controller 20663OSm, Signal Processor Controller 20663OSn, Solar Panel Controller 20663OSo, Speaker Controller 20663OSp, Vibrator Controller 20663OSq, Video Processor Controller 20663OSr, Wireless Receiver Controller 20663OSs, Wireless Receiver Controller 20663OSt, Wireless Receiver Controller 20663OSu, Wireless Transmitter Controller 20663OSv, Wireless Transmitter Controller 20663OSw, and Wireless Transmitter Controller 20663OSx. Battery Controller 20663OSa is a controller which controls Battery 230 (not shown). CCD Unit Controller 20663OSb is a controller which controls CCD Unit 214 (not shown). Flash Light Unit Controller 20663OSc is a controller which controls Flash Light Unit 220 (not shown). Indicator Controller 20663OSd is a controller which controls Indicator 212 (not shown). Input Device Controller 20663OSe is a controller which controls Input Device 210 (not shown). LCD Controller 20663OSf is a controller which controls LCD 201 (not shown). LED Controller 20663OSg is a controller which controls LED 219 (not shown). Memory Card Interface Controller 20663OSh is a controller which controls Memory Card Interface 221 (not shown). Microphone Controller 20663OSi is a controller which controls Microphone 215 (not shown). Photometer Controller 20663OSj is a controller which controls Photometer 232 (not shown). RAM Controller 20663OSk is a controller which controls RAM 206 (not shown). ROM Controller 20663OSl is a controller which controls ROM 207 (not shown). Signal Processor Controller 20663OSm is a controller which controls Signal Processor 205 (not shown). Signal Processor Controller 20663OSn is a controller which controls Signal Processor 208 (not shown). Solar Panel Controller 20663OSo is a controller which controls Solar Panel 229 (not shown). Speaker Controller 20663OSp is a controller which controls Speaker 216L (not shown). Vibrator Controller 20663OSq is a controller which controls Vibrator 217 (not shown). Video Processor Controller 20663OSr is a controller which controls Video Processor 202 (not shown). Wireless Receiver Controller 20663OSs is a controller which controls Wireless Receiver 224 (not shown). Wireless Receiver Controller 20663OSt is a controller which controls Wireless Receiver 225 (not shown). Wireless Receiver Controller 20663OSu is a controller which controls Wireless Receiver 226 (not shown). Wireless Transmitter Controller 20663OSv is a controller which controls Wireless Transmitter 222 (not shown). Wireless Transmitter Controller 20663OSw is a controller which controls Wireless Transmitter 223 (not shown). Wireless Transmitter Controller 20663OSx is a controller which controls Wireless Transmitter 227 (not shown). For the avoidance of doubt, the data stored in Operating System 20663OS are illustrative, and other types of data, which are updated by implementing the present function, are also stored therein, such as DLLs, drivers, security implementing program.

Paragraph [0186]—This Paragraph [0186] illustrates the storage areas included in OS Updating Information Storage Area 20663*a* (Paragraph [0184]). In the present embodiment, OS Updating Information Storage Area 20663*a* includes OS Updating Data Storage Area 20663*b* and OS Updating Software Storage Area 20663*c*. OS Updating Data Storage Area 20663*b* stores the data necessary to implement the present function on the side of Communication Device 200, such as the ones described in Paragraph [0188]. OS Updating Software Storage Area 20663*c* stores the software programs necessary to implement the present function on the side of Communication Device 200, such as the ones described in Paragraph [0190].

Paragraph [0187]—The data and/or the software programs stored in OS Updating Software Storage Area 20663*c* (Paragraph [0186]) may be downloaded from Host H (Paragraph [0025]).

Paragraph [0188]—This Paragraph [0188] illustrates the storage area included in OS Updating Data Storage Area 20663*b* (Paragraph [0186]). In the present embodiment, OS Updating Data Storage Area 20663*b* includes OS Version Data Storage Area 20663*b*1. OS Version Data Storage Area 20663*b*1 stores the data described in Paragraph [0189].

Paragraph [0189]—This Paragraph [0189] illustrates the data stored in OS Version Data Storage Area 20663*b*1 (Paragraph [0188]). In the present embodiment, OS Version Data Storage Area 20663*b*1 includes Battery Controller Version Data 20663*b*1*a*, CCD Unit Controller Version Data 20663*b*1*b*, Flash Light Unit Controller Version Data 20663*b*1*c*, Indicator Controller Version Data 20663*b*1*d*, Input Device Controller Version Data 20663*b*1*e*, LCD Controller Version Data 20663*b*1*f*, LED Controller Version Data 20663*b*1*g*, Memory Card Interface Controller Version Data 20663*b*1*h*, Microphone Controller Version Data 20663*b*1*i*, Photometer Controller Version Data 20663*b*1*j*, RAM Controller Version Data 20663*b*1*k*, ROM Controller Version Data 20663*b*1*l*, Signal Processor Controller Version Data 20663*b*1*m*, Signal Processor Controller Version Data 20663*b*1*n*, Solar Panel Controller Version Data 20663*b*1*o*, Speaker Controller Version Data 20663*b*1*p*, Vibrator Controller Version Data 20663*b*1*q*, Video Processor Controller Version Data 20663*b*1*r*, Wireless Receiver Controller Version Data 20663*b*1*s*, Wireless Receiver Controller Version Data 20663*b*1*t*, Wireless Receiver Controller Version Data 20663*b*1*u*, Wireless Transmitter Controller Version Data 20663*b*1*v*, Wireless Transmitter Controller Version Data 20663*b*1*w*, and Wireless Transmitter Controller Version Data 20663*b*1*x*. Battery Controller Version Data 20663*b*1*a* is the version data representing the current version of Battery Controller 20663OSa (Paragraph [0185]). CCD Unit Controller Version Data 20663*b*1*b* is the version data representing the current version of CCD Unit Controller 20663OSb (Paragraph [0185]). Flash Light Unit Controller Version Data 20663*b*1*c* is the version data representing the current version of Flash Light Unit Controller 20663OSc (Paragraph [0185]). Indicator Controller Version Data 20663*b*1*d* is the version data representing the current version of Indicator Controller 20663OSd (Paragraph [0185]). Input Device Controller Version Data 20663*b*1*e* is the version data representing the current version of Input Device Controller 20663OSe (Paragraph [0185]). LCD Controller Version Data 20663*b*1*f* is the version data representing the current version of LCD Controller 20663OSf (Paragraph [0185]). LED Controller Version Data 20663*b*1*g* is the version data representing the current version of LED Controller 20663OSg (Paragraph [0185]). Memory Card Interface Controller Version Data 20663*b*1*h* is the version data representing the current version of Memory Card Interface Controller 20663OSh (Paragraph [0185]). Microphone Controller Version Data 20663*b*1*i* is the version data representing the current version of Microphone Controller 20663OSi (Paragraph [0185]). Photometer Controller Version Data 20663*b*1*j* is the version data representing the current version of Photometer Controller 20663OSj (Paragraph [0185]). RAM Controller Version Data 20663*b*1*k* is the version data representing the current version of RAM Controller 20663OSk (Paragraph [0185]). ROM Controller Version Data 20663*b*1*l* is the version data representing the current version of ROM Controller 20663OSl (Paragraph [0185]). Signal Processor Controller Version Data 20663*b*1*m* is the version data representing the current version of Signal Processor Controller 20663OSm (Paragraph [0185]). Signal Processor Controller Version Data 20663*b*1*n* is the version data representing the current version of Signal Processor Controller 20663OSn (Paragraph [0185]). Solar Panel Controller Version Data 20663*b*1*o* is the version data representing the current version of Solar Panel Controller 20663OSo (Paragraph [0185]). Speaker Controller Version Data 20663*b*1*p* is the version data representing the current version of Speaker Controller 20663OSp (Paragraph [0185]). Vibrator Controller Version Data 20663*b*1*q* is the version data representing the current version of Vibrator Controller 20663OSq (Paragraph [0185]). Video Processor Controller Version Data 20663*b*1*r* is the version data representing the current version of Video Processor Controller 20663OSr (Paragraph [0185]). Wireless Receiver Controller Version Data 20663*b*1*s* is the version data representing the current version of Wireless Receiver Controller 20663OSs (Paragraph [0185]). Wireless Receiver Controller Version Data 20663*b*1*t* is the version data representing the current version of Wireless Receiver Controller 20663OSt (Paragraph [0185]). Wireless Receiver Controller Version Data 20663*b*1*u* is the version data representing the current version of Wireless Receiver Controller 20663OSu (Paragraph [0185]). Wireless Transmitter Controller Version Data 20663*b*1*v* is the version data representing the current version of Wireless Transmitter Controller 20663OSv (Paragraph [0185]). Wireless Transmitter Controller Version Data 20663*b*1*w* is the version data representing the current version of Wireless Transmitter Controller 20663OSw (Paragraph [0185]). Wireless Transmitter Controller Version Data 20663*b*1*x* is the version data representing the current version of Wireless Transmitter Controller 20663OSx (Paragraph [0185]). Here, the version data is composed of numeric data, such as '1', '2', and '3', wherein '1' represents version '1.0', '2' represents version '2.0', and '3' represents version '3.0'.

Paragraph [0190]—This Paragraph [0190] illustrates the software programs stored in OS Updating Software Storage Area 20663*c* (Paragraph [0186]). In the present embodiment, OS Updating Software Storage Area 20663*c* stores Battery Controller Updating Software 20663*c*1*a*, CCD Unit Controller Updating Software 20663*c*1*b*, Flash Light Unit Controller Updating Software 20663*c*1*c*, Indicator Controller Updating Software 20663*c*1*d*, Input Device Controller Updating Software 20663*c*1*e*, LCD Controller Updating Software 20663*c*1*f*, LED Controller Updating Software 20663*c*1*g*, Memory Card Interface Controller Updating Software 20663*c*1*h*, Microphone Controller Updating Software 20663*c*1*i*, Photometer Controller Updating Software 20663*c*1*j*, RAM Controller Updating Software 20663*c*1*k*, ROM Controller Updating Software 20663*c*1*l*, Signal Processor Controller Updating Software 20663*c*1*m*, Signal Processor Controller Updating Software 20663*c*1*n*, Solar Panel Controller Updating Software 20663*c*1*o*, Speaker Controller Updating Software 20663*c*1*p*, Vibrator Controller Updating Software 20663*c*1*q*, Video Processor Controller Updating Software 20663*c*1*r*, Wireless Receiver Controller Updating Software 20663*c*1*s*, Wireless Receiver Controller Updating Software 20663*c*1*t*, Wireless Receiver Controller Updating Software 20663*c*1*u*, Wireless Transmitter Controller Updating Software 20663*c*1*v*, Wireless Transmitter Controller Updating Software 20663*c*1*w*, and Wireless Transmitter Controller Updating Software 20663*c*1*x*. Battery Controller Updating Software 20663*c*1*a* is the software program described in Paragraph [0197] and Paragraph [0198]. CCD Unit Controller Updating Software 20663*c*1*b* is the software program described in Paragraph [0199] and Paragraph [0200]. Flash Light Unit Controller Updating Software 20663*c*1*c* is the software program described in Paragraph [0201] and Paragraph [0202]. Indicator Controller Updating Software 20663*c*1*d* is the software program described in Paragraph [0203] and Paragraph [0204]. Input Device Controller Updating Software 20663*c*1*e* is the software program described in Paragraph [0205] and Paragraph [0206]. LCD Controller Updating Software 20663*c*1*f* is the software program described in Paragraph [0207] and Paragraph [0208]. LED Controller Updating Software 20663*c*1*g* is the software program described in Paragraph [0209] and Paragraph [0210]. Memory Card Interface Controller Updating Software 20663*c*1*h* is the software program described in Paragraph [0211] and Paragraph [0212]. Microphone Controller Updating Software 20663*c*1*i* is the software program described in Paragraph [0213] and Paragraph [0214]. Photometer Controller Updating Software 20663*c*1*j* is the software program described in Paragraph [0215] and Paragraph [0216]. RAM Controller Updating Software 20663*c*1*k* is the software program described in Paragraph [0217] and Paragraph [0218]. ROM Controller Updating Software 20663*c*1*l* is the software program described in Paragraph [0219] and Paragraph [0220]. Signal Processor Controller Updating Software 20663*c*1*m* is the software program described in Paragraph [0221] and Paragraph [0222]. Signal Processor Controller Updating Software 20663*c*1*n* is the software program described in Paragraph [0223] and Paragraph [0224]. Solar Panel Controller Updating Software 20663*c*1*o* is the software program described in Paragraph [0225] and Paragraph [0226]. Speaker Controller Updating Software 20663*c*1*p* is the software program described in Paragraph [0227] and Paragraph [0228]. Vibrator Controller Updating Software 20663*c*1*q* is the software program described in Paragraph [0229] and Paragraph [0230]. Video Processor Controller Updating Software 20663*c*1*r* is the software program described in Paragraph [0231] and Paragraph [0232]. Wireless Receiver Controller Updating Software 20663*c*1*s* is the software program described in Paragraph [0233] and Paragraph [0234]. Wireless Receiver Controller Updating Software 20663*c*1*t* is the software program described in Paragraph [0235] and Paragraph [0236]. Wireless Receiver Controller Updating Software 20663*c*1*u* is the software program described in Paragraph [0237] and Paragraph [0238]. Wireless Transmitter Controller Updating Software 20663*c*1*v* is the software program described in Paragraph [0239] and Paragraph [0240]. Wireless Transmitter Controller Updating Software 20663*c*1*w* is the software program described in Paragraph [0241] and Paragraph [0242]. Wireless Transmitter Controller Updating Software 20663*c*1*x* is the software program described in Paragraph [0243] and Paragraph [0244].

Paragraph [0191]—This Paragraph [0191] illustrates the storage areas included in Host H (Paragraph [0025]). In the present embodiment, Host H includes Operating System H63OS of which the data stored therein are described in Paragraph [0192], and OS Updating Information Storage Area H63a of which the data and the software programs stored therein are described in Paragraph [0193].

Paragraph [0192]—This Paragraph [0192] illustrates the data stored in Operating System H63OS (Paragraph [0191]). In the present embodiment, Operating System H63OS includes Battery Controller H63OSa, CCD Unit Controller H63OSb, Flash Light Unit Controller H63OSc, Indicator Controller H63OSd, Input Device Controller H63OSe, LCD Controller H63OSf, LED Controller H63OSg, Memory Card Interface Controller H63OSh, Microphone Controller H63OSi, Photometer Controller H63OSj, RAM Controller H63OSk, ROM Controller H63OSl, Signal Processor Controller H63OSm, Signal Processor Controller H63OSn, Solar Panel Controller H63OSo, Speaker Controller H63OSp, Vibrator Controller H63OSq, Video Processor Controller H63OSr, Wireless Receiver Controller H63OSs, Wireless Receiver Controller H63OSt, Wireless Receiver Controller H63OSu, Wireless Transmitter Controller H63OSv, Wireless Transmitter Controller H63OSw, and Wireless Transmitter Controller H63OSx. Battery Controller H63OSa is the controller of the latest version which controls Battery 230 (not shown). CCD Unit Controller H63OSb is the controller of the latest version which controls CCD Unit 214 (not shown). Flash Light Unit Controller H63OSc is the controller of the latest version which controls Flash Light Unit 220 (not shown). Indicator Controller H63OSd is the controller of the latest version which controls Indicator 212 (not shown). Input Device Controller H63OSe is the controller of the latest version which controls Input Device 210 (not shown). LCD Controller H63OSf is the controller of the latest version which controls LCD 201 (not shown). LED Controller H63OSg is the controller of the latest version which controls LED 219 (not shown). Memory Card Interface Controller H63OSh is the controller of the latest version which controls Memory Card Interface 221 (not shown). Microphone Controller H63OSi is the controller of the latest version which controls Microphone 215 (not shown). Photometer Controller H63OSj is the controller of the latest version which controls Photometer 232 (not shown). RAM Controller H63OSk is the controller of the latest version which controls Host H (not shown). ROM Controller H63OSl is the controller of the latest version which controls ROM 207 (not shown). Signal Processor Controller H63OSm is the controller of the latest version which controls Signal Processor 205 (not shown). Signal Processor Controller H63OSn is the controller of the latest version which controls Signal Processor 208 (not shown). Solar Panel Controller H63OSo is the controller of the latest version which controls Solar Panel 229 (not shown). Speaker Controller H63OSp is the controller of the latest version which controls Speaker 216L (not shown). Vibrator Controller H63OSq is the controller of the latest version which controls Vibrator 217 (not shown). Video Processor Controller H63OSr is the controller of the latest version which controls Video Processor 202 (not shown). Wireless Receiver Controller H63OSs is the controller of the latest version which controls Wireless Receiver 224 (not shown). Wireless Receiver Controller H63OSt is the controller of the latest version which controls Wireless Receiver 225 (not shown). Wireless Receiver Controller H63OSu is the controller of the latest version which controls Wireless Receiver 226 (not shown). Wireless Transmitter Controller H63OSv is the controller of the latest version which controls Wireless Transmitter 222 (not shown). Wireless Transmitter Controller H63OSw is the controller of the latest version which controls Wireless Transmitter 223 (not shown). Wireless Transmitter Controller H63OSx is the controller of the latest version which controls Wireless Transmitter 227 (not shown). The data stored in Operating System Storage Area H63OS are updated periodically. For the avoidance of doubt, the data stored in Operating System H63OS are illustrative, and other types of data, which are utilized to update Operating System H63OS of Communication Device 200 by implementing the present function, are also stored therein, such as DLLs, drivers, security implementing program. The data stored in Operating System H63OS are updated periodically thereby the data are always of the latest version.

Paragraph [0193]—This Paragraph [0193] illustrates the storage areas included in OS Updating Information Storage Area H63a (Paragraph [0191]). In the present embodiment, OS Updating Information Storage Area H63a includes OS Updating Data Storage Area H63b and OS Updating Software Storage Area H63c. OS Updating Data Storage Area H63b stores the data necessary to implement the present function on the side of Host H (Paragraph [0025]), such as the ones described in Paragraph [0194]. OS Updating Software Storage Area H63c stores the software programs necessary to implement the present function on the side of Host H, such as the ones described in Paragraph [0196].

Paragraph [0194]—This Paragraph [0194] illustrates the storage area included in OS Updating Data Storage Area H63b (Paragraph [0193]). In the present embodiment, OS Updating Data Storage Area H63b includes OS Version Data Storage Area H63b1. OS Version Data Storage Area H63b1 stores the data described in Paragraph [0195].

Paragraph [0195]—This Paragraph [0195] illustrates the data stored in OS Version Data Storage Area H63b1 (Paragraph [0194]). In the present embodiment, OS Version Data Storage Area H63b1 includes Battery Controller Version Data H63b1a, CCD Unit Controller Version Data H63b1b, Flash Light Unit Controller Version Data H63b1c, Indicator Controller Version Data H63b1d, Input Device Controller Version Data H63b1e, LCD Controller Version Data H63b1f, LED Controller Version Data H63b1g, Memory Card Interface Controller Version Data H63b1h, Microphone Controller Version Data H63b1i, Photometer Controller Version Data H63b1j, RAM Controller Version Data H63b1k, ROM Controller Version Data H63b1l, Signal Processor Controller Version Data H63b1m, Signal Processor Controller Version Data H63b1n, Solar Panel Controller Version Data H63b1o, Speaker Controller Version Data H63b1p, Vibrator Controller Version Data H63b1q, Video Processor Controller Version Data H63b1r, Wireless Receiver Controller Version Data H63b1s, Wireless Receiver Controller Version Data H63b1t, Wireless Receiver Controller Version Data H63b1u, Wireless Transmitter Controller Version Data H63b1v, Wireless Transmitter Controller Version Data H63b1w, and Wireless Transmitter Controller Version Data H63b1x. Battery Controller Version Data H63b1a is the version data representing the latest version of Battery Controller H63OSa (Paragraph [0192]). CCD Unit Controller Version Data H63b1b is the version data representing the latest version of CCD Unit Controller H63OSb (Paragraph [0192]). Flash Light Unit Controller Version Data H63b1c is the version data representing the latest version of Flash Light Unit Controller H63OSc (Paragraph [0192]). Indicator Controller Version Data H63b1d is the version data representing the latest version of Indicator Controller H63OSd (Paragraph [0192]). Input Device Controller Version Data H63b1e is the version data representing the latest version of Input Device Controller H63OSe (Paragraph [0192]). LCD Controller Version Data H63b1f is the version data representing the latest version of LCD Controller H63OSf (Paragraph [0192]). LED Controller Version Data H63b1g is the version data representing the latest version of LED Controller H63OSg (Paragraph [0192]). Memory Card Interface Controller Version Data H63b1h is the version data representing the latest version of Memory Card Interface Controller H63OSh (Paragraph [0192]). Microphone Controller Version Data H63b1i is the version data representing the latest version of Microphone Controller H63OSi (Paragraph [0192]). Photometer Controller Version Data H63b1j is the version data representing the latest version of Photometer Controller H63OSj (Paragraph [0192]). RAM Controller Version Data H63b1k is the version data representing the latest version of RAM Controller H63OSk (Paragraph [0192]). ROM Controller Version Data H63b1l is the version data representing the latest version of ROM Controller H63OSl (Paragraph [0192]). Signal Processor Controller Version Data H63b1m is the version data representing the latest version of Signal Processor Controller H63OSm (Paragraph [0192]). Signal Processor Controller Version Data H63b1n is the version data representing the latest version of Signal Processor Controller H63OSn (Paragraph [0192]). Solar Panel Controller Version Data H63b1o is the version data representing the latest version of Solar Panel Controller H63OSo (Paragraph [0192]). Speaker Controller Version Data H63b1p is the version data representing the latest version of Speaker Controller H63OSp (Paragraph [0192]). Vibrator Controller Version Data H63b1q is the version data representing the latest version of Vibrator Controller H63OSq (Paragraph [0192]). Video Processor Controller Version Data H63b1r is the version data representing the latest version of Video Processor Controller H63OSr (Paragraph [0192]). Wireless Receiver Controller Version Data H63b1s is the version data representing the latest version of Wireless Receiver Controller H63OSs (Paragraph [0192]). Wireless Receiver Controller Version Data H63b1t is the version data representing the latest version of Wireless Receiver Controller H63OSt (Paragraph [0192]). Wireless Receiver Controller Version Data H63b1u is the version data representing the latest version of Wireless Receiver Controller H63OSu (Paragraph [0192]). Wireless Transmitter Controller Version Data H63b1v is the version data representing the latest version of Wireless Transmitter Controller H63OSv (Paragraph [0192]). Wireless Transmitter Controller Version Data H63b1w is the version data representing the latest version of Wireless Transmitter Controller H63OSw (Paragraph [0192]). Wireless Transmitter Controller Version Data H63b1x is the version data representing the latest version of Wireless Transmitter Controller H63OSx (Paragraph [0192]). Here, the version data is composed of numeric data, such as '1', '2', and '3', wherein '1' represents version '1.0', '2' represents version '2.0', and '3' represents version '3.0'. The data stored in OS Version Data Storage Area H63b1 are updated periodically.

Paragraph [0196]—This Paragraph [0196] illustrates the software programs stored in OS Updating Software Storage Area H63c (Paragraph [0193]). In the present embodiment, OS Updating Software Storage Area H63c stores Battery Controller Updating Software H63c1a, CCD Unit Controller Updating Software H63c1b, Flash Light Unit Controller Updating Software H63c1c, Indicator Controller Updating Software H63c1d, Input Device Controller Updating Software H63c1e, LCD Controller Updating Software H63c1f, LED Controller Updating Software H63c1g, Memory Card Interface Controller Updating Software H63c1h, Microphone Controller Updating Software H63c1i, Photometer Controller Updating Software H63c1j, RAM Controller Updating Software H63c1k, ROM Controller Updating Software H63c1l, Signal Processor Controller Updating Software H63c1m, Signal Processor Controller Updating Software H63c1n, Solar Panel Controller Updating Software H63c1o, Speaker Controller Updating Software H63c1p, Vibrator Controller Updating Software H63c1q, Video Processor Controller Updating Software H63c1r, Wireless Receiver Controller Updating Software H63c1s, Wireless Receiver Controller Updating Software H63c1t, Wireless Receiver Controller Updating Software H63c1u, Wireless Transmitter Controller Updating Software H63c1v, Wireless Transmitter Controller Updating Software H63c1w, and Wireless Transmitter Controller Updating Software H63c1x. Battery Controller Updating Software H63c1a is the software program described in Paragraph [0197] and Paragraph [0198]. CCD Unit Controller Updating Software H63c1b is the software program described in Paragraph [0199] and Paragraph [0200]. Flash Light Unit Controller Updating Software H63c1c is the software program described in Paragraph [0201] and Paragraph [0202]. Indicator Controller Updating Software H63c1d is the software program described in Paragraph and Paragraph [0204]. Input Device Controller Updating Software H63c1e is the software program described in Paragraph [0205] and Paragraph [0206]. LCD Controller Updating Software H63c1f is the software program described in Paragraph [0207] and Paragraph [0208]. LED Controller Updating Software H63c1g is the software program described in Paragraph [0209] and Paragraph [0210]. Memory Card Interface Controller Updating Software H63c1h is the software program described in Paragraph [0211] and Paragraph [0212]. Microphone Controller Updating Software H63c1i is the software program described in Paragraph [0213] and Paragraph [0214]. Photometer Controller Updating Software H63c1j is the software program described in Paragraph [0215] and Paragraph [0216]. RAM Controller Updating Software H63c1k is the software program described in Paragraph [0217] and Paragraph [0218]. ROM Controller Updating Software H63c1l is the software program described in Paragraph [0219] and Paragraph [0220]. Signal Processor Controller Updating Software H63c1m is the software program described in Paragraph [0221] and Paragraph [0222]. Signal Processor Controller Updating Software H63c1n is the software program described in Paragraph [0223] and Paragraph [0224]. Solar Panel Controller Updating Software H63c1o is the software program described in Paragraph [0225] and Paragraph [0226]. Speaker Controller Updating Software H63c1p is the software program described in Paragraph [0227] and Paragraph [0228]. Vibrator Controller Updating Software H63c1q is the software program described in Paragraph [0229] and Paragraph [0230]. Video Processor Controller Updating Software H63c1r is the software program described in Paragraph [0231] and Paragraph [0232]. Wireless Receiver Controller Updating Software H63c1s is the software program described in Paragraph [0233] and Paragraph [0234]. Wireless Receiver Controller Updating Software H63c1t is the software program described in Paragraph [0235] and Paragraph [0236]. Wireless Receiver Controller Updating Software H63c1u is the software program described in Paragraph [0237] and Paragraph [0238]. Wireless Transmitter Controller Updating Software H63c1v is the software program described in Paragraph [0239] and Paragraph [0240]. Wireless Transmitter Controller Updating Software H63c1w is the software program described in Paragraph [0241] and Paragraph [0242]. Wireless Transmitter Controller Updating Software H63c1x is the software program described in Paragraph [0243] and Paragraph [0244]. The foregoing software programs are automatically implemented periodically or implemented manually by utilizing Input Device 210 (FIG. 1) or via voice recognition system.

Paragraph [0197]—This Paragraph [0197] illustrates Battery Controller Updating Software H63c1a (Paragraph [0196]) of Host H (Paragraph [0025]) and Battery Controller Updating Software 20663c1a (Paragraph [0190]) of Communication Device 200, which update Battery Controller 20663OSa stored in Operating System 20663OS (Paragraph [0185]) of Communication Device 200. In the present embodiment, CPU 211 (FIG. 1) of Communication Device 200 retrieves Battery Controller Version Data 20663b1a from OS Version Data Storage Area 20663b1 (Paragraph [0189]) and sends the data to Host H (S1). Upon receiving Battery Controller Version Data 20663b1a (Paragraph [0189]) from Communication Device 200 (S2), Host H compares Battery Controller Version Data 20663b1a (Paragraph [0189]) with Battery Controller Version Data H63b1a stored in OS Version Data Storage Area H63b1 (Paragraph [0195]) of Host H (S3). Assuming that Host H detects in S3 that Battery Controller Version Data 20663b1a of Communication Device 200 is of an old version. Host H retrieves Battery Controller H63OSa, which is of the latest version, from Operating System Storage Area H63OS (Paragraph [0192]), and sends the controller to Communication Device 200 (S4). Upon receiving Battery Controller H63OSa from Host H (S5), CPU 211 stores Battery Controller H63OSa as Battery Controller 20663OSa in Operating System 20663OS (Paragraph [0185]) (S6). The old version of Battery Controller 20663OSa (Paragraph [0185]) is deleted.

Paragraph [0198]—This Paragraph [0198] illustrates another embodiment of Battery Controller Updating Software H63c1a (Paragraph [0196]) of Host H (Paragraph [0025]) and Battery Controller Updating Software 20663c1a (Paragraph [0190]) of Communication Device 200, which update Battery Controller 20663OSa stored in Operating System 20663OS (Paragraph [0185]) of Communication Device 200. In the present embodiment, CPU 211 (FIG. 1) of Communication Device 200 sends a Battery Controller Update Request, which is received by Host H (S1). Here, the Battery Controller Update Request is a request to send Battery Controller Version Data H63b1a (Paragraph [0195]) stored in Host H to Communication Device 200. In response to the request, Host H retrieves Battery Controller Version Data H63b1a from OS Version Data Storage Area H63b1 (Paragraph [0195]), and sends the data to Communication Device 200 (S2). Upon receiving Battery Controller Version Data H63b1a from Host H (S3), CPU 211 compares Battery Controller Version Data H63b1a with Battery Controller Version Data 20663b1a stored in OS Version Data Storage Area 20663b1 (Paragraph [0189]) of Communication Device 200 (S4). Assuming that CPU 211 detects in S4 that Battery Controller Version Data 20663b1a of Communication Device 200 is of an old version. CPU 211 sends a New Battery Controller Sending Request, which is received by Host H (S5). Here, the New Battery Controller Sending Request is a request to send Battery Controller H63OSa (Paragraph [0192]) stored in Host H to Communication Device 200. Host H retrieves Battery Controller H63OSa (Paragraph [0192]), which is of the latest version, from Operating System Storage Area H63OS (Paragraph [0192]), and sends the controller to Communication Device 200 (S6). Upon receiving Battery Controller H63OSa from Host H (S7), CPU 211 stores Battery Controller H63OSa as Battery Controller 20663OSa in Operating System 20663OS (Paragraph [0185]) (S8). The old version of Battery Controller 20663OSa (Paragraph [0185]) is deleted.

Paragraph [0199]—This Paragraph [0199] illustrates CCD Unit Controller Updating Software H63c1b (Paragraph [0196]) of Host H (Paragraph [0025]) and CCD Unit Controller Updating Software 20663c1b (Paragraph [0190]) of Communication Device 200, which update CCD Unit Controller 20663OSb stored in Operating System 20663OS (Paragraph [0185]) of Communication Device 200. In the present embodiment, CPU 211 (FIG. 1) of Communication Device 200 retrieves CCD Unit Controller Version Data 20663b1b from OS Version Data Storage Area 20663b1 (Paragraph [0189]) and sends the data to Host H (S1). Upon receiving CCD Unit Controller Version Data 20663b1b (Paragraph [0189]) from Communication Device 200 (S2), Host H compares CCD Unit Controller Version Data 20663b1b (Paragraph [0189]) with CCD Unit Controller Version Data H63b1b stored in OS Version Data Storage Area H63b1 (Paragraph [0195]) of Host H (S3). Assuming that Host H detects in S3 that CCD Unit Controller Version Data 20663b1b of Communication Device 200 is of an old version. Host H retrieves CCD Unit Controller H63OSb, which is of the latest version, from Operating System Storage Area H63OS (Paragraph [0192]), and sends the controller to Communication Device 200 (S4). Upon receiving CCD Unit Controller H63OSb from Host H (S5), CPU 211 stores CCD Unit Controller H63OSb as CCD Unit Controller 20663OSb in Operating System 20663OS (Paragraph [0185]) (S6). The old version of CCD Unit Controller 20663OSb (Paragraph [0185]) is deleted.

Paragraph [0200]—This Paragraph [0200] illustrates another embodiment of CCD Unit Controller Updating Software H63c1b (Paragraph [0196]) of Host H (Paragraph [0025]) and CCD Unit Controller Updating Software 20663c1b (Paragraph [0190]) of Communication Device 200, which update CCD Unit Controller 20663OSb stored in Operating System 20663OS (Paragraph [0185]) of Communication Device 200. In the present embodiment, CPU 211 (FIG. 1) of Communication Device 200 sends a CCD Unit Controller Update Request, which is received by Host H (S1). Here, the CCD Unit Controller Update Request is a request to send CCD Unit Controller Version Data H63b1b (Paragraph [0195]) stored in Host H to Communication Device 200. In response to the request, Host H retrieves CCD Unit Controller Version Data H63b1b from OS Version Data Storage Area H63b1 (Paragraph [0195]), and sends the data to Communication Device 200 (S2). Upon receiving CCD Unit Controller Version Data H63b1b from Host H (S3), CPU 211 compares CCD Unit Controller Version Data H63b1b with CCD Unit Controller Version Data 20663b1b stored in OS Version Data Storage Area 20663b1 (Paragraph [0189]) of Communication Device 200 (S4). Assuming that CPU 211 detects in S4 that CCD Unit Controller Version Data 20663b1b of Communication Device 200 is of an old version. CPU 211 sends a New CCD Unit Controller Sending Request, which is received by Host H (S5). Here, the New CCD Unit Controller Sending Request is a request to send CCD Unit Controller H63OSb (Paragraph [0192]) stored in Host H to Communication Device 200. Host H retrieves CCD Unit Controller H63OSb (Paragraph [0192]), which is of the latest version, from Operating System Storage Area H63OS (Paragraph [0192]), and sends the controller to Communication Device 200 (S6). Upon receiving CCD Unit Controller H63OSb from Host H (S7), CPU 211 stores CCD Unit Controller H63OSb as CCD Unit Controller 20663OSb in Operating System 20663OS (Paragraph [0185]) (S8). The old version of CCD Unit Controller 20663OSb (Paragraph [0185]) is deleted.

Paragraph [0201]—This Paragraph [0201] illustrates Flash Light Unit Controller Updating Software H63c1c (Paragraph [0196]) of Host H (Paragraph [0025]) and Flash Light Unit Controller Updating Software 20663c1c (Paragraph [0190]) of Communication Device 200, which update Flash Light Unit Controller 20663OSc stored in Operating System 20663OS (Paragraph [0185]) of Communication Device 200. In the present embodiment, CPU 211 (FIG. 1) of Communication Device 200 retrieves Flash Light Unit Controller Version Data 20663b1c from OS Version Data Storage Area 20663b1 (Paragraph [0189]) and sends the data to Host H (S1). Upon receiving Flash Light Unit Controller Version Data 20663b1c (Paragraph [0189]) from Communication Device 200 (S2), Host H compares Flash Light Unit Controller Version Data 20663b1c (Paragraph [0189]) with Flash Light Unit Controller Version Data H63b1c stored in OS Version Data Storage Area H63b1 (Paragraph [0195]) of Host H (S3). Assuming that Host H detects in S3 that Flash Light Unit Controller Version Data 20663b1c of Communication Device 200 is of an old version. Host H retrieves Flash Light Unit Controller H63OSc, which is of the latest version, from Operating System Storage Area H63OS (Paragraph [0192]), and sends the controller to Communication Device 200 (S4). Upon receiving Flash Light Unit Controller H63OSc from Host H (S5), CPU 211 stores Flash Light Unit Controller H63OSc as Flash Light Unit Controller 20663OSc in Operating System 20663OS (Paragraph [0185]) (S6). The old version of Flash Light Unit Controller 20663OSc (Paragraph [0185]) is deleted.

Paragraph [0202]—This Paragraph [0202] illustrates another embodiment of Flash Light Unit Controller Updating Software H63c1c (Paragraph [0196]) of Host H (Paragraph [0025]) and Flash Light Unit Controller Updating Software 20663c1c (Paragraph [0190]) of Communication Device 200, which update Flash Light Unit Controller 20663OSc stored in Operating System 20663OS (Paragraph [0185]) of Communication Device 200. In the present embodiment, CPU 211 (FIG. 1) of Communication Device 200 sends a Flash Light Unit Controller Update Request, which is received by Host H (S1). Here, the Flash Light Unit Controller Update Request is a request to send Flash Light Unit Controller Version Data H63b1c (Paragraph [0195]) stored in Host H to Communication Device 200. In response to the request, Host H retrieves Flash Light Unit Controller Version Data H63b1c from OS Version Data Storage Area H63b1 (Paragraph [0195]), and sends the data to Communication Device 200 (S2). Upon receiving Flash Light Unit Controller Version Data H63b1c from Host H (S3), CPU 211 compares Flash Light Unit Controller Version Data H63b1c with Flash Light Unit Controller Version Data 20663b1c stored in OS Version Data Storage Area 20663b1 (Paragraph [0189]) of Communication Device 200 (S4). Assuming that CPU 211 detects in S4 that Flash Light Unit Controller Version Data 20663b1c of Communication Device 200 is of an old version. CPU 211 sends a New Flash Light Unit Controller Sending Request, which is received by Host H (S5). Here, the New Flash Light Unit Controller Sending Request is a request to send Flash Light Unit Controller H63OSc (Paragraph [0192]) stored in Host H to Communication Device 200. Host H retrieves Flash Light Unit Controller H63OSc (Paragraph [0192]), which is of the latest version, from Operating System Storage Area H63OS (Paragraph [0192]), and sends the controller to Communication Device 200 (S6). Upon receiving Flash Light Unit Controller H63OSc from Host H (S7), CPU 211 stores Flash Light Unit Controller H63OSc as Flash Light Unit Controller 20663OSc in Operating System 20663OS (Paragraph [0185]) (S8). The old version of Flash Light Unit Controller 20663OSc (Paragraph [0185]) is deleted.

Paragraph [0203]—This Paragraph [0203] illustrates Indicator Controller Updating Software H63c1d (Paragraph [0196]) of Host H (Paragraph [0025]) and Indicator Controller Updating Software 20663c1d (Paragraph [0190]) of Communication Device 200, which update Indicator Controller 20663OSd stored in Operating System 20663OS (Paragraph [0185]) of Communication Device 200. In the present embodiment, CPU 211 (FIG. 1) of Communication Device 200 retrieves Indicator Controller Version Data 20663b1d from OS Version Data Storage Area 20663b1 (Paragraph [0189]) and sends the data to Host H (S1). Upon receiving Indicator Controller Version Data 20663b1d (Paragraph [0189]) from Communication Device 200 (S2), Host H compares Indicator Controller Version Data 20663b1d (Paragraph [0189]) with Indicator Controller Version Data H63b1d stored in OS Version Data Storage Area H63b1 (Paragraph [0195]) of Host H (S3). Assuming that Host H detects in S3 that Indicator Controller Version Data 20663b1d of Communication Device 200 is of an old version. Host H retrieves Indicator Controller H63OSd, which is of the latest version, from Operating System Storage Area H63OS (Paragraph [0192]), and sends the controller to Communication Device 200 (S4). Upon receiving Indicator Controller H63OSd from Host H (S5), CPU 211 stores Indicator Controller H63OSd as Indicator Controller 20663OSd in Operating System 20663OS (Paragraph [0185]) (S6). The old version of Indicator Controller 20663OSd (Paragraph [0185]) is deleted.

Paragraph [0204]—This Paragraph [0204] illustrates another embodiment of Indicator Controller Updating Software H63c1d (Paragraph [0196]) of Host H (Paragraph [0025]) and Indicator Controller Updating Software 20663c1d (Paragraph [0190]) of Communication Device 200, which update Indicator Controller 20663OSd stored in Operating System 20663OS (Paragraph [0185]) of Communication Device 200. In the present embodiment, CPU 211 (FIG. 1) of Communication Device 200 sends a Indicator Controller Update Request, which is received by Host H (S1). Here, the Indicator Controller Update Request is a request to send Indicator Controller Version Data H63b1d (Paragraph [0195]) stored in Host H to Communication Device 200. In response to the request, Host H retrieves Indicator Controller Version Data H63b1d from OS Version Data Storage Area H63b1 (Paragraph [0195]), and sends the data to Communication Device 200 (S2). Upon receiving Indicator Controller Version Data H63b1d from Host H (S3), CPU 211 compares Indicator Controller Version Data H63b1d with Indicator Controller Version Data 20663b1d stored in OS Version Data Storage Area 20663b1 (Paragraph [0189]) of Communication Device 200 (S4). Assuming that CPU 211 detects in S4 that Indicator Controller Version Data 20663b1d of Communication Device 200 is of an old version. CPU 211 sends a New Indicator Controller Sending Request, which is received by Host H (S5). Here, the New Indicator Controller Sending Request is a request to send Indicator Controller H63OSd (Paragraph [0192]) stored in Host H to Communication Device 200. Host H retrieves Indicator Controller H63OSd (Paragraph [0192]), which is of the latest version, from Operating System Storage Area H63OS (Paragraph [0192]), and sends the controller to Communication Device 200 (S6). Upon receiving Indicator Controller H63OSd from Host H (S7), CPU 211 stores Indicator Controller H63OSd as Indicator Controller 20663OSd in Operating System 20663OS (Paragraph [0185]) (S8). The old version of Indicator Controller 20663OSd (Paragraph [0185]) is deleted.

Paragraph [0205]—This Paragraph [0205] illustrates Input Device Controller Updating Software H63c1e (Paragraph [0196]) of Host H (Paragraph [0025]) and Input Device Controller Updating Software 20663c1e (Paragraph [0190]) of Communication Device 200, which update Input Device Controller 20663OSe stored in Operating System 20663OS (Paragraph [0185]) of Communication Device 200. In the present embodiment, CPU 211 (FIG. 1) of Communication Device 200 retrieves Input Device Controller Version Data 20663b1e from OS Version Data Storage Area 20663b1 (Paragraph [0189]) and sends the data to Host H (S1). Upon receiving Input Device Controller Version Data 20663b1e (Paragraph [0189]) from Communication Device 200 (S2), Host H compares Input Device Controller Version Data 20663b1e (Paragraph [0189]) with Input Device Controller Version Data H63b1e stored in OS Version Data Storage Area H63b1 (Paragraph [0195]) of Host H (S3). Assuming that Host H detects in S3 that Input Device Controller Version Data 20663b1e of Communication Device 200 is of an old version. Host H retrieves Input Device Controller H63OSe, which is of the latest version, from Operating System Storage Area H63OS (Paragraph [0192]), and sends the controller to Communication Device 200 (S4). Upon receiving Input Device Controller H63OSe from Host H (S5), CPU 211 stores Input Device Controller H63OSe as Input Device Controller 20663OSe in Operating System 20663OS (Paragraph [0185]) (S6). The old version of Input Device Controller 20663OSe (Paragraph [0185]) is deleted.

Paragraph [0206]—This Paragraph [0206] illustrates another embodiment of Input Device Controller Updating Software H63c1e (Paragraph [0196]) of Host H (Paragraph [0025]) and Input Device Controller Updating Software 20663c1e (Paragraph [0190]) of Communication Device 200, which update Input Device Controller 20663OSe stored in Operating System 20663OS (Paragraph [0185]) of Communication Device 200. In the present embodiment, CPU 211 (FIG. 1) of Communication Device 200 sends a Input Device Controller Update Request, which is received by Host H (S1). Here, the Input Device Controller Update Request is a request to send Input Device Controller Version Data H63b1e (Paragraph [0195]) stored in Host H to Communication Device 200. In response to the request, Host H retrieves Input Device Controller Version Data H63b1e from OS Version Data Storage Area H63b1 (Paragraph [0195]), and sends the data to Communication Device 200 (S2). Upon receiving Input Device Controller Version Data H63b1e from Host H (S3), CPU 211 compares Input Device Controller Version Data H63b1e with Input Device Controller Version Data 20663b1e stored in OS Version Data Storage Area 20663b1 (Paragraph [0189]) of Communication Device 200 (S4). Assuming that CPU 211 detects in S4 that Input Device Controller Version Data 20663b1e of Communication Device 200 is of an old version. CPU 211 sends a New Input Device Controller Sending Request, which is received by Host H (S5). Here, the New Input Device Controller Sending Request is a request to send Input Device Controller H63OSe (Paragraph [0192]) stored in Host H to Communication Device 200. Host H retrieves Input Device Controller H63OSe (Paragraph [0192]), which is of the latest version, from Operating System Storage Area H63OS (Paragraph [0192]), and sends the controller to Communication Device 200 (S6). Upon receiving Input Device Controller H63OSe from Host H (S7), CPU 211 stores Input Device Controller H63OSe as Input Device Controller 20663OSe in Operating System 20663OS (Paragraph [0185]) (S8). The old version of Input Device Controller 20663OSe (Paragraph [0185]) is deleted.

Paragraph [0207]—This Paragraph [0207] illustrates LCD Controller Updating Software H63c1f (Paragraph [0196]) of Host H (Paragraph [0025]) and LCD Controller Updating Software 20663c1f (Paragraph [0190]) of Communication Device 200, which update LCD Controller 20663OSf stored in Operating System 20663OS (Paragraph [0185]) of Communication Device 200. In the present embodiment, CPU 211 (FIG. 1) of Communication Device 200 retrieves LCD Controller Version Data 20663b1f from OS Version Data Storage Area 20663b1 (Paragraph [0189]) and sends the data to Host H (S1). Upon receiving LCD Controller Version Data 20663b1f (Paragraph [0189]) from Communication Device 200 (S2), Host H compares LCD Controller Version Data 20663b1f (Paragraph [0189]) with LCD Controller Version Data H63b1f stored in OS Version Data Storage Area H63b1 (Paragraph [0195]) of Host H (S3). Assuming that Host H detects in S3 that LCD Controller Version Data 20663b1f of Communication Device 200 is of an old version. Host H retrieves LCD Controller H63OSf, which is of the latest version, from Operating System Storage Area H63OS (Paragraph [0192]), and sends the controller to Communication Device 200 (S4). Upon receiving LCD Controller H63OSf from Host H (S5), CPU 211 stores LCD Controller H63OSf as LCD Controller 20663OSf in Operating System 20663OS (Paragraph [0185]) (S6). The old version of LCD Controller 20663OSf (Paragraph [0185]) is deleted.

Paragraph [0208]—This Paragraph [0208] illustrates another embodiment of LCD Controller Updating Software H63c1f (Paragraph [0196]) of Host H (Paragraph [0025]) and LCD Controller Updating Software 20663c1f (Paragraph [0190]) of Communication Device 200, which update LCD Controller 20663OSf stored in Operating System 20663OS (Paragraph [0185]) of Communication Device 200. In the present embodiment, CPU 211 (FIG. 1) of Communication Device 200 sends a LCD Controller Update Request, which is received by Host H (S1). Here, the LCD Controller Update Request is a request to send LCD Controller Version Data H63b1f (Paragraph [0195]) stored in Host H to Communication Device 200. In response to the request, Host H retrieves LCD Controller Version Data H63b1f from OS Version Data Storage Area H63b1 (Paragraph [0195]), and sends the data to Communication Device 200 (S2). Upon receiving LCD Controller Version Data H63b1f from Host H (S3), CPU 211 compares LCD Controller Version Data H63b1f with LCD Controller Version Data 20663b1f stored in OS Version Data Storage Area 20663b1 (Paragraph [0189]) of Communication Device 200 (S4). Assuming that CPU 211 detects in S4 that LCD Controller Version Data 20663b1f of Communication Device 200 is of an old version. CPU 211 sends a New LCD Controller Sending Request, which is received by Host H (S5). Here, the New LCD Controller Sending Request is a request to send LCD Controller H63OSf (Paragraph [0192]) stored in Host H to Communication Device 200. Host H retrieves LCD Controller H63OSf (Paragraph [0192]), which is of the latest version, from Operating System Storage Area H63OS (Paragraph [0192]), and sends the controller to Communication Device 200 (S6). Upon receiving LCD Controller H63OSf from Host H (S7), CPU 211 stores LCD Controller H63OSf as LCD Controller 20663OSf in Operating System 20663OS (Paragraph [0185]) (S8). The old version of LCD Controller 20663OSf (Paragraph [0185]) is deleted.

Paragraph [0209]—This Paragraph [0209] illustrates LED Controller Updating Software H63c1g (Paragraph [0196]) of Host H (Paragraph [0025]) and LED Controller Updating Software 20663c1g (Paragraph [0190]) of Communication Device 200, which update LED Controller 20663OSg stored in Operating System 20663OS (Paragraph [0185]) of Communication Device 200. In the present embodiment, CPU 211 (FIG. 1) of Communication Device 200 retrieves LED Controller Version Data 20663b1g from OS Version Data Storage Area 20663b1 (Paragraph [0189]) and sends the data to Host H (S1). Upon receiving LED Controller Version Data 20663b1g (Paragraph [0189]) from Communication Device 200 (S2), Host H compares LED Controller Version Data 20663b1g (Paragraph [0189]) with LED Controller Version Data H63b1g stored in OS Version Data Storage Area H63b1 (Paragraph [0195]) of Host H (S3). Assuming that Host H detects in S3 that LED Controller Version Data 20663b1g of Communication Device 200 is of an old version. Host H retrieves LED Controller H63OSg, which is of the latest version, from Operating System Storage Area H63OS (Paragraph [0192]), and sends the controller to Communication Device 200 (S4). Upon receiving LED Controller H63OSg from Host H (S5), CPU 211 stores LED Controller H63OSg as LED Controller 20663OSg in Operating System 20663OS (Paragraph [0185]) (S6). The old version of LED Controller 20663OSg (Paragraph [0185]) is deleted.

Paragraph [0210]—This Paragraph [0210] illustrates another embodiment of LED Controller Updating Software H63c1g (Paragraph [0196]) of Host H (Paragraph [0025]) and LED Controller Updating Software 20663c1g (Paragraph [0190]) of Communication Device 200, which update LED Controller 20663OSg stored in Operating System 20663OS (Paragraph [0185]) of Communication Device 200. In the present embodiment, CPU 211 (FIG. 1) of Communication Device 200 sends a LED Controller Update Request, which is received by Host H (S1). Here, the LED Controller Update Request is a request to send LED Controller Version Data H63b1g (Paragraph [0195]) stored in Host H to Communication Device 200. In response to the request, Host H retrieves LED Controller Version Data H63b1g from OS Version Data Storage Area H63b1 (Paragraph [0195]), and sends the data to Communication Device 200 (S2). Upon receiving LED Controller Version Data H63b1g from Host H (S3), CPU 211 compares LED Controller Version Data H63b1g with LED Controller Version Data 20663b1g stored in OS Version Data Storage Area 20663b1 (Paragraph [0189]) of Communication Device 200 (S4). Assuming that CPU 211 detects in S4 that LED Controller Version Data 20663b1g of Communication Device 200 is of an old version. CPU 211 sends a New LED Controller Sending Request, which is received by Host H (S5). Here, the New LED Controller Sending Request is a request to send LED Controller H63OSg (Paragraph [0192]) stored in Host H to Communication Device 200. Host H retrieves LED Controller H63OSg (Paragraph [0192]), which is of the latest version, from Operating System Storage Area H63OS (Paragraph [0192]), and sends the controller to Communication Device 200 (S6). Upon receiving LED Controller H63OSg from Host H (S7), CPU 211 stores LED Controller H63OSg as LED Controller 20663OSg in Operating System 20663OS (Paragraph [0185]) (S8). The old version of LED Controller 20663OSg (Paragraph [0185]) is deleted.

Paragraph [0211]—This Paragraph [0211] illustrates Memory Card Interface Controller Updating Software H63c1h (Paragraph [0196]) of Host H (Paragraph [0025]) and Memory Card Interface Controller Updating Software 20663c1h (Paragraph [0190]) of Communication Device 200, which update Memory Card Interface Controller 20663OSh stored in Operating System 20663OS (Paragraph [0185]) of Communication Device 200. In the present embodiment, CPU 211 (FIG. 1) of Communication Device 200 retrieves Memory Card Interface Controller Version Data 20663b1h from OS Version Data Storage Area 20663b1 (Paragraph [0189]) and sends the data to Host H (S1). Upon receiving Memory Card Interface Controller Version Data 20663b1h (Paragraph [0189]) from Communication Device 200 (S2), Host H compares Memory Card Interface Controller Version Data 20663b1h (Paragraph [0189]) with Memory Card Interface Controller Version Data H63b1h stored in OS Version Data Storage Area H63b1 (Paragraph [0195]) of Host H (S3). Assuming that Host H detects in S3 that Memory Card Interface Controller Version Data 20663b1h of Communication Device 200 is of an old version. Host H retrieves Memory Card Interface Controller H63OSh, which is of the latest version, from Operating System Storage Area H63OS (Paragraph [0192]), and sends the controller to Communication Device 200 (S4). Upon receiving Memory Card Interface Controller H63OSh from Host H (S5), CPU 211 stores Memory Card Interface Controller H63OSh as Memory Card Interface Controller 20663OSh in Operating System 20663OS (Paragraph [0185]) (S6). The old version of Memory Card Interface Controller 20663OSh (Paragraph [0185]) is deleted.

Paragraph [0212]—This Paragraph [0212] illustrates another embodiment of Memory Card Interface Controller Updating Software H63c1h (Paragraph [0196]) of Host H (Paragraph [0025]) and Memory Card Interface Controller Updating Software 20663c1h (Paragraph [0190]) of Communication Device 200, which update Memory Card Interface Controller 20663OSh stored in Operating System 20663OS (Paragraph [0185]) of Communication Device 200. In the present embodiment, CPU 211 (FIG. 1) of Communication Device 200 sends a Memory Card Interface Controller Update Request, which is received by Host H (S1). Here, the Memory Card Interface Controller Update Request is a request to send Memory Card Interface Controller Version Data H63b1h (Paragraph [0195]) stored in Host H to Communication Device 200. In response to the request, Host H retrieves Memory Card Interface Controller Version Data H63b1h from OS Version Data Storage Area H63b1 (Paragraph [0195]), and sends the data to Communication Device 200 (S2). Upon receiving Memory Card Interface Controller Version Data H63b1h from Host H (S3), CPU 211 compares Memory Card Interface Controller Version Data H63b1h with Memory Card Interface Controller Version Data 20663b1h stored in OS Version Data Storage Area 20663b1 (Paragraph [0189]) of Communication Device 200 (S4). Assuming that CPU 211 detects in S4 that Memory Card Interface Controller Version Data 20663b1h of Communication Device 200 is of an old version. CPU 211 sends a New Memory Card Interface Controller Sending Request, which is received by Host H (S5). Here, the New Memory Card Interface Controller Sending Request is a request to send Memory Card Interface Controller H63OSh (Paragraph [0192]) stored in Host H to Communication Device 200. Host H retrieves Memory Card Interface Controller H63OSh (Paragraph [0192]), which is of the latest version, from Operating System Storage Area H63OS (Paragraph [0192]), and sends the controller to Communication Device 200 (S6). Upon receiving Memory Card Interface Controller H63OSh from Host H (S7), CPU 211 stores Memory Card Interface Controller H63OSh as Memory Card Interface Controller 20663OSh in Operating System 20663OS (Paragraph [0185]) (S8). The old version of Memory Card Interface Controller 20663OSh (Paragraph [0185]) is deleted.

Paragraph [0213]—This Paragraph [0213] illustrates Microphone Controller Updating Software H63c1i (Paragraph [0196]) of Host H (Paragraph [0025]) and Microphone Controller Updating Software 20663c1i (Paragraph [0190]) of Communication Device 200, which update Microphone Controller 20663OSi stored in Operating System 20663OS (Paragraph [0185]) of Communication Device 200. In the present embodiment, CPU 211 (FIG. 1) of Communication Device 200 retrieves Microphone Controller Version Data 20663b1i from OS Version Data Storage Area 20663b1 (Paragraph [0189]) and sends the data to Host H (S1). Upon receiving Microphone Controller Version Data 20663b1i (Paragraph [0189]) from Communication Device 200 (S2), Host H compares Microphone Controller Version Data 20663b1i (Paragraph [0189]) with Microphone Controller Version Data H63*b*1*i* stored in OS Version Data Storage Area H63*b*1 (Paragraph [0195]) of Host H (S3). Assuming that Host H detects in S3 that Microphone Controller Version Data 20663*b*1*i* of Communication Device 200 is of an old version. Host H retrieves Microphone Controller H63OSi, which is of the latest version, from Operating System Storage Area H63OS (Paragraph [0192]), and sends the controller to Communication Device 200 (S4). Upon receiving Microphone Controller H63OSi from Host H (S5), CPU 211 stores Microphone Controller H63OSi as Microphone Controller 20663OSi in Operating System 20663OS (Paragraph [0185]) (S6). The old version of Microphone Controller 20663OSi (Paragraph [0185]) is deleted.

Paragraph [0214]—This Paragraph [0214] illustrates another embodiment of Microphone Controller Updating Software H63*c*1*i* (Paragraph [0196]) of Host H (Paragraph [0025]) and Microphone Controller Updating Software 20663*c*1*i* (Paragraph [0190]) of Communication Device 200, which update Microphone Controller 20663OSi stored in Operating System 20663OS (Paragraph [0185]) of Communication Device 200. In the present embodiment, CPU 211 (FIG. 1) of Communication Device 200 sends a Microphone Controller Update Request, which is received by Host H (S1). Here, the Microphone Controller Update Request is a request to send Microphone Controller Version Data H63*b*1*i* (Paragraph [0195]) stored in Host H to Communication Device 200. In response to the request, Host H retrieves Microphone Controller Version Data H63*b*1*i* from OS Version Data Storage Area H63*b*1 (Paragraph [0195]), and sends the data to Communication Device 200 (S2). Upon receiving Microphone Controller Version Data H63*b*1*i* from Host H (S3), CPU 211 compares Microphone Controller Version Data H63*b*1*i* with Microphone Controller Version Data 20663*b*1*i* stored in OS Version Data Storage Area 20663*b*1 (Paragraph [0189]) of Communication Device 200 (S4). Assuming that CPU 211 detects in S4 that Microphone Controller Version Data 20663*b*1*i* of Communication Device 200 is of an old version. CPU 211 sends a New Microphone Controller Sending Request, which is received by Host H (S5). Here, the New Microphone Controller Sending Request is a request to send Microphone Controller H63OSi (Paragraph [0192]) stored in Host H to Communication Device 200. Host H retrieves Microphone Controller H63OSi (Paragraph [0192]), which is of the latest version, from Operating System Storage Area H63OS (Paragraph [0192]), and sends the controller to Communication Device 200 (S6). Upon receiving Microphone Controller H63OSi from Host H (S7), CPU 211 stores Microphone Controller H63OSi as Microphone Controller 20663OSi in Operating System 20663OS (Paragraph [0185]) (S8). The old version of Microphone Controller 20663OSi (Paragraph [0185]) is deleted.

Paragraph [0215]—This Paragraph [0215] illustrates Photometer Controller Updating Software H63*c*1*j* (Paragraph [0196]) of Host H (Paragraph [0025]) and Photometer Controller Updating Software 20663*c*1*j* (Paragraph [0190]) of Communication Device 200, which update Photometer Controller 20663OSj stored in Operating System 20663OS (Paragraph [0185]) of Communication Device 200. In the present embodiment, CPU 211 (FIG. 1) of Communication Device 200 retrieves Photometer Controller Version Data 20663*b*1*j* from OS Version Data Storage Area 20663*b*1 (Paragraph [0189]) and sends the data to Host H (S1). Upon receiving Photometer Controller Version Data 20663*b*1*j* (Paragraph [0189]) from Communication Device 200 (S2), Host H compares Photometer Controller Version Data 20663*b*1*j* (Paragraph [0189]) with Photometer Controller Version Data H63*b*1*j* stored in OS Version Data Storage Area H63*b*1 (Paragraph [0195]) of Host H (S3). Assuming that Host H detects in S3 that Photometer Controller Version Data 20663*b*1*j* of Communication Device 200 is of an old version. Host H retrieves Photometer Controller H63OSj, which is of the latest version, from Operating System Storage Area H63OS (Paragraph [0192]), and sends the controller to Communication Device 200 (S4). Upon receiving Photometer Controller H63OSj from Host H (S5), CPU 211 stores Photometer Controller H63OSj as Photometer Controller 20663OSj in Operating System 20663OS (Paragraph [0185]) (S6). The old version of Photometer Controller 20663OSj (Paragraph [0185]) is deleted.

Paragraph [0216]—This Paragraph [0216] illustrates another embodiment of Photometer Controller Updating Software H63*c*1*j* (Paragraph [0196]) of Host H (Paragraph [0025]) and Photometer Controller Updating Software 20663*c*1*j* (Paragraph [0190]) of Communication Device 200, which update Photometer Controller 20663OSj stored in Operating System 20663OS (Paragraph [0185]) of Communication Device 200. In the present embodiment, CPU 211 (FIG. 1) of Communication Device 200 sends a Photometer Controller Update Request, which is received by Host H (S1). Here, the Photometer Controller Update Request is a request to send Photometer Controller Version Data H63*b*1*j* (Paragraph [0195]) stored in Host H to Communication Device 200. In response to the request, Host H retrieves Photometer Controller Version Data H63*b*1*j* from OS Version Data Storage Area H63*b*1 (Paragraph [0195]), and sends the data to Communication Device 200 (S2). Upon receiving Photometer Controller Version Data H63*b*1*j* from Host H (S3), CPU 211 compares Photometer Controller Version Data H63*b*1*j* with Photometer Controller Version Data 20663*b*1*j* stored in OS Version Data Storage Area 20663*b*1 (Paragraph [0189]) of Communication Device 200 (S4). Assuming that CPU 211 detects in S4 that Photometer Controller Version Data 20663*b*1*j* of Communication Device 200 is of an old version. CPU 211 sends a New Photometer Controller Sending Request, which is received by Host H (S5). Here, the New Photometer Controller Sending Request is a request to send Photometer Controller H63OSj (Paragraph [0192]) stored in Host H to Communication Device 200. Host H retrieves Photometer Controller H63OSj (Paragraph [0192]), which is of the latest version, from Operating System Storage Area H63OS (Paragraph [0192]), and sends the controller to Communication Device 200 (S6). Upon receiving Photometer Controller H63OSj from Host H (S7), CPU 211 stores Photometer Controller H63OSj as Photometer Controller 20663OSj in Operating System 20663OS (Paragraph [0185]) (S8). The old version of Photometer Controller 20663OSj (Paragraph [0185]) is deleted.

Paragraph [0217]—This Paragraph [0217] illustrates RAM Controller Updating Software H63*c*1*k* (Paragraph [0196]) of Host H (Paragraph [0025]) and RAM Controller Updating Software 20663*c*1*k* (Paragraph [0190]) of Communication Device 200, which update RAM Controller 20663OSk stored in Operating System 20663OS (Paragraph [0185]) of Communication Device 200. In the present embodiment, CPU 211 (FIG. 1) of Communication Device 200 retrieves RAM Controller Version Data 20663*b*1*k* from OS Version Data Storage Area 20663*b*1 (Paragraph [0189]) and sends the data to Host H (S1). Upon receiving RAM Controller Version Data 20663*b*1*k* (Paragraph [0189]) from Communication Device 200 (S2), Host H compares RAM Controller Version Data 20663*b*1*k* (Paragraph [0189]) with RAM Controller Version Data H63*b*1*k* stored in OS Version Data Storage Area H63*b*1 (Paragraph [0195]) of Host H (S3).

Assuming that Host H detects in S3 that RAM Controller Version Data 20663*b*1*k* of Communication Device 200 is of an old version. Host H retrieves RAM Controller H63OS*k*, which is of the latest version, from Operating System Storage Area H63OS (Paragraph [0192]), and sends the controller to Communication Device 200 (S4). Upon receiving RAM Controller H63OS*k* from Host H (S5), CPU 211 stores RAM Controller H63OS*k* as RAM Controller 20663OS*k* in Operating System 20663OS (Paragraph [0185]) (S6). The old version of RAM Controller 20663OS*k* (Paragraph [0185]) is deleted.

Paragraph [0218]—This Paragraph [0218] illustrates another embodiment of RAM Controller Updating Software H63*c*1*k* (Paragraph [0196]) of Host H (Paragraph [0025]) and RAM Controller Updating Software 20663*c*1*k* (Paragraph [0190]) of Communication Device 200, which update RAM Controller 20663OS*k* stored in Operating System 20663OS (Paragraph [0185]) of Communication Device 200. In the present embodiment, CPU 211 (FIG. 1) of Communication Device 200 sends a RAM Controller Update Request, which is received by Host H (S1). Here, the RAM Controller Update Request is a request to send RAM Controller Version Data H63*b*1*k* (Paragraph [0195]) stored in Host H to Communication Device 200. In response to the request, Host H retrieves RAM Controller Version Data H63*b*1*k* from OS Version Data Storage Area H63*b*1 (Paragraph [0195]), and sends the data to Communication Device 200 (S2). Upon receiving RAM Controller Version Data H63*b*1*k* from Host H (S3), CPU 211 compares RAM Controller Version Data H63*b*1*k* with RAM Controller Version Data 20663*b*1*k* stored in OS Version Data Storage Area 20663*b*1 (Paragraph [0189]) of Communication Device 200 (S4). Assuming that CPU 211 detects in S4 that RAM Controller Version Data 20663*b*1*k* of Communication Device 200 is of an old version. CPU 211 sends a New RAM Controller Sending Request, which is received by Host H (S5). Here, the New RAM Controller Sending Request is a request to send RAM Controller H63OS*k* (Paragraph [0192]) stored in Host H to Communication Device 200. Host H retrieves RAM Controller H63OS*k* (Paragraph [0192]), which is of the latest version, from Operating System Storage Area H63OS (Paragraph [0192]), and sends the controller to Communication Device 200 (S6). Upon receiving RAM Controller H63OS*k* from Host H (S7), CPU 211 stores RAM Controller H63OS*k* as RAM Controller 20663OS*k* in Operating System 20663OS (Paragraph [0185]) (S8). The old version of RAM Controller 20663OS*k* (Paragraph [0185]) is deleted.

Paragraph [0219]—This Paragraph [0219] illustrates ROM Controller Updating Software H63*c*1*l* (Paragraph [0196]) of Host H (Paragraph [0025]) and ROM Controller Updating Software 20663*c*1*l* (Paragraph [0190]) of Communication Device 200, which update ROM Controller 20663OS*l* stored in Operating System 20663OS (Paragraph [0185]) of Communication Device 200. In the present embodiment, CPU 211 (FIG. 1) of Communication Device 200 retrieves ROM Controller Version Data 20663*b*1*l* from OS Version Data Storage Area 20663*b*1 (Paragraph [0189]) and sends the data to Host H (S1). Upon receiving ROM Controller Version Data 20663*b*1*l* (Paragraph [0189]) from Communication Device 200 (S2), Host H compares ROM Controller Version Data 20663*b*1*l* (Paragraph [0189]) with ROM Controller Version Data H63*b*1*l* stored in OS Version Data Storage Area H63*b*1 (Paragraph [0195]) of Host H (S3). Assuming that Host H detects in S3 that ROM Controller Version Data 20663*b*1*l* of Communication Device 200 is of an old version. Host H retrieves ROM Controller H63OS*l*, which is of the latest version, from Operating System Storage Area H63OS (Paragraph [0192]), and sends the controller to Communication Device 200 (S4). Upon receiving ROM Controller H63OS*l* from Host H (S5), CPU 211 stores ROM Controller H63OS*l* as ROM Controller 20663OS*l* in Operating System 20663OS (Paragraph [0185]) (S6). The old version of ROM Controller 20663OS*l* (Paragraph [0185]) is deleted.

Paragraph [0220]—This Paragraph [0220] illustrates another embodiment of ROM Controller Updating Software H63*c*1*l* (Paragraph [0196]) of Host H (Paragraph [0025]) and ROM Controller Updating Software 20663*c*1*l* (Paragraph [0190]) of Communication Device 200, which update ROM Controller 20663OS*l* stored in Operating System 20663OS (Paragraph [0185]) of Communication Device 200. In the present embodiment, CPU 211 (FIG. 1) of Communication Device 200 sends a ROM Controller Update Request, which is received by Host H (S1). Here, the ROM Controller Update Request is a request to send ROM Controller Version Data H63*b*1*l* (Paragraph [0195]) stored in Host H to Communication Device 200. In response to the request, Host H retrieves ROM Controller Version Data H63*b*1*l* from OS Version Data Storage Area H63*b*1 (Paragraph [0195]), and sends the data to Communication Device 200 (S2). Upon receiving ROM Controller Version Data H63*b*1*l* from Host H (S3), CPU 211 compares ROM Controller Version Data H63*b*1*l* with ROM Controller Version Data 20663*b*1*l* stored in OS Version Data Storage Area 20663*b*1 (Paragraph [0189]) of Communication Device 200 (S4). Assuming that CPU 211 detects in S4 that ROM Controller Version Data 20663*b*1*l* of Communication Device 200 is of an old version. CPU 211 sends a New ROM Controller Sending Request, which is received by Host H (S5). Here, the New ROM Controller Sending Request is a request to send ROM Controller H63OS*l* (Paragraph [0192]) stored in Host H to Communication Device 200. Host H retrieves ROM Controller H63OS*l* (Paragraph [0192]), which is of the latest version, from Operating System Storage Area H63OS (Paragraph [0192]), and sends the controller to Communication Device 200 (S6). Upon receiving ROM Controller H63OS*l* from Host H (S7), CPU 211 stores ROM Controller H63OS*l* as ROM Controller 20663OS*l* in Operating System 20663OS (Paragraph [0185]) (S8). The old version of ROM Controller 20663OS*l* (Paragraph [0185]) is deleted.

Paragraph [0221]—This Paragraph [0221] illustrates Signal Processor Controller Updating Software H63*c*1*m* (Paragraph [0196]) of Host H (Paragraph [0025]) and Signal Processor Controller Updating Software 20663*c*1*m* (Paragraph [0190]) of Communication Device 200, which update Signal Processor Controller 20663OS*m* stored in Operating System 20663OS (Paragraph [0185]) of Communication Device 200. In the present embodiment, CPU 211 (FIG. 1) of Communication Device 200 retrieves Signal Processor Controller Version Data 20663*b*1*m* from OS Version Data Storage Area 20663*b*1 (Paragraph [0189]) and sends the data to Host H (S1). Upon receiving Signal Processor Controller Version Data 20663*b*1*m* (Paragraph [0189]) from Communication Device 200 (S2), Host H compares Signal Processor Controller Version Data 20663*b*1*m* (Paragraph [0189]) with Signal Processor Controller Version Data H63*b*1*m* stored in OS Version Data Storage Area H63*b*1 (Paragraph [0195]) of Host H (S3). Assuming that Host H detects in S3 that Signal Processor Controller Version Data 20663*b*1*m* of Communication Device 200 is of an old version. Host H retrieves Signal Processor Controller H63OS*m*, which is of the latest version, from Operating System Storage Area H63OS (Paragraph [0192]), and sends the controller to Communication Device 200 (S4). Upon receiving Signal Processor Controller H63OS*m* from Host H (S5), CPU 211 stores Signal Processor Controller H63OSm as Signal Processor Controller 20663OSm in Operating System 20663OS (Paragraph [0185]) (S6). The old version of Signal Processor Controller 20663OSm (Paragraph [0185]) is deleted.

Paragraph [0222]—This Paragraph [0222] illustrates another embodiment of Signal Processor Controller Updating Software H63$c1m$ (Paragraph [0196]) of Host H (Paragraph [0025]) and Signal Processor Controller Updating Software 20663$c1m$ (Paragraph [0190]) of Communication Device 200, which update Signal Processor Controller 20663OSm stored in Operating System 20663OS (Paragraph [0185]) of Communication Device 200. In the present embodiment, CPU 211 (FIG. 1) of Communication Device 200 sends a Signal Processor Controller Update Request, which is received by Host H (S1). Here, the Signal Processor Controller Update Request is a request to send Signal Processor Controller Version Data H63$b1m$ (Paragraph [0195]) stored in Host H to Communication Device 200. In response to the request, Host H retrieves Signal Processor Controller Version Data H63$b1m$ from OS Version Data Storage Area H63$b1$ (Paragraph [0195]), and sends the data to Communication Device 200 (S2). Upon receiving Signal Processor Controller Version Data H63$b1m$ from Host H (S3), CPU 211 compares Signal Processor Controller Version Data H63$b1m$ with Signal Processor Controller Version Data 20663$b1m$ stored in OS Version Data Storage Area 20663$b1$ (Paragraph [0189]) of Communication Device 200 (S4). Assuming that CPU 211 detects in S4 that Signal Processor Controller Version Data 20663$b1m$ of Communication Device 200 is of an old version. CPU 211 sends a New Signal Processor Controller Sending Request, which is received by Host H (S5). Here, the New Signal Processor Controller Sending Request is a request to send Signal Processor Controller H63OSm (Paragraph [0192]) stored in Host H to Communication Device 200. Host H retrieves Signal Processor Controller H63OSm (Paragraph [0192]), which is of the latest version, from Operating System Storage Area H63OS (Paragraph [0192]), and sends the controller to Communication Device 200 (S6). Upon receiving Signal Processor Controller H63OSm from Host H (S7), CPU 211 stores Signal Processor Controller H63OSm as Signal Processor Controller 20663OSm in Operating System 20663OS (Paragraph [0185]) (S8). The old version of Signal Processor Controller 20663OSm (Paragraph [0185]) is deleted.

Paragraph [0223]—This Paragraph [0223] illustrates Signal Processor Controller Updating Software H63$c1n$ (Paragraph [0196]) of Host H (Paragraph [0025]) and Signal Processor Controller Updating Software 20663$c1n$(Paragraph [0190]) of Communication Device 200, which update Signal Processor Controller 20663OSn stored in Operating System 20663OS (Paragraph [0185]) of Communication Device 200. In the present embodiment, CPU 211 (FIG. 1) of Communication Device 200 retrieves Signal Processor Controller Version Data 20663$b1n$ from OS Version Data Storage Area 20663$b1$ (Paragraph [0189]) and sends the data to Host H (S1). Upon receiving Signal Processor Controller Version Data 20663$b1n$ (Paragraph [0189]) from Communication Device 200 (S2), Host H compares Signal Processor Controller Version Data 20663$b1n$ (Paragraph [0189]) with Signal Processor Controller Version Data H63$b1n$ stored in OS Version Data Storage Area H63$b1$ (Paragraph [0195]) of Host H (S3). Assuming that Host H detects in S3 that Signal Processor Controller Version Data 20663$b1n$ of Communication Device 200 is of an old version. Host H retrieves Signal Processor Controller H63OSn, which is of the latest version, from Operating System Storage Area H63OS (Paragraph [0192]), and sends the controller to Communication Device 200 (S4). Upon receiving Signal Processor Controller H63OSn from Host H (S5), CPU 211 stores Signal Processor Controller H63OSn as Signal Processor Controller 20663OSn in Operating System 20663OS (Paragraph [0185]) (S6). The old version of Signal Processor Controller 20663OSn (Paragraph [0185]) is deleted.

Paragraph [0224]—This Paragraph [0224] illustrates another embodiment of Signal Processor Controller Updating Software H63$c1n$ (Paragraph [0196]) of Host H (Paragraph [0025]) and Signal Processor Controller Updating Software 20663$c1n$ (Paragraph [0190]) of Communication Device 200, which update Signal Processor Controller 20663OSn stored in Operating System 20663OS (Paragraph [0185]) of Communication Device 200. In the present embodiment, CPU 211 (FIG. 1) of Communication Device 200 sends a Signal Processor Controller Update Request, which is received by Host H (S1). Here, the Signal Processor Controller Update Request is a request to send Signal Processor Controller Version Data H63$b1n$ (Paragraph [0195]) stored in Host H to Communication Device 200. In response to the request, Host H retrieves Signal Processor Controller Version Data H63$b1n$ from OS Version Data Storage Area H63$b1$ (Paragraph [0195]), and sends the data to Communication Device 200 (S2). Upon receiving Signal Processor Controller Version Data H63$b1n$ from Host H (S3), CPU 211 compares Signal Processor Controller Version Data H63$b1n$ with Signal Processor Controller Version Data 20663$b1n$ stored in OS Version Data Storage Area 20663$b1$ (Paragraph [0189]) of Communication Device 200 (S4). Assuming that CPU 211 detects in S4 that Signal Processor Controller Version Data 20663$b1n$ of Communication Device 200 is of an old version. CPU 211 sends a New Signal Processor Controller Sending Request, which is received by Host H (S5). Here, the New Signal Processor Controller Sending Request is a request to send Signal Processor Controller H63OSn (Paragraph [0192]) stored in Host H to Communication Device 200. Host H retrieves Signal Processor Controller H63OSn (Paragraph [0192]), which is of the latest version, from Operating System Storage Area H63OS (Paragraph [0192]), and sends the controller to Communication Device 200 (S6). Upon receiving Signal Processor Controller H63OSn from Host H (S7), CPU 211 stores Signal Processor Controller H63OSn as Signal Processor Controller 20663OSn in Operating System 20663OS (Paragraph [0185]) (S8). The old version of Signal Processor Controller 20663OSn (Paragraph [0185]) is deleted.

Paragraph [0225]—This Paragraph [0225] illustrates Solar Panel Controller Updating Software H63$c1o$ (Paragraph [0196]) of Host H (Paragraph [0025]) and Solar Panel Controller Updating Software 20663$c1o$ (Paragraph [0190]) of Communication Device 200, which update Solar Panel Controller 20663OSo stored in Operating System 20663OS (Paragraph [0185]) of Communication Device 200. In the present embodiment, CPU 211 (FIG. 1) of Communication Device 200 retrieves Solar Panel Controller Version Data 20663$b1o$ from OS Version Data Storage Area 20663$b1$ (Paragraph [0189]) and sends the data to Host H (S1). Upon receiving Solar Panel Controller Version Data 20663$b1o$ (Paragraph [0189]) from Communication Device 200 (S2), Host H compares Solar Panel Controller Version Data 20663$b1o$ (Paragraph [0189]) with Solar Panel Controller Version Data H63$b1o$ stored in OS Version Data Storage Area H63$b1$ (Paragraph [0195]) of Host H (S3). Assuming that Host H detects in S3 that Solar Panel Controller Version Data 20663$b1o$ of Communication Device 200 is of an old version. Host H retrieves Solar Panel Controller H63OSo, which is of the latest version, from Operating System Storage Area H63OS (Paragraph [0192]), and sends the controller to Communication Device 200 (S4). Upon receiving Solar Panel Controller H63OSo from Host H (S5), CPU 211 stores Solar Panel Controller H63OSo as Solar Panel Controller 20663OSo in Operating System 20663OS (Paragraph [0185]) (S6). The old version of Solar Panel Controller 20663OSo (Paragraph [0185]) is deleted.

Paragraph [0226]—This Paragraph [0226] illustrates another embodiment of Solar Panel Controller Updating Software H63$c$1$o$ (Paragraph [0196]) of Host H (Paragraph [0025]) and Solar Panel Controller Updating Software 20663$c$1$o$ (Paragraph [0190]) of Communication Device 200, which update Solar Panel Controller 20663OSo stored in Operating System 20663OS (Paragraph [0185]) of Communication Device 200. In the present embodiment, CPU 211 (FIG. 1) of Communication Device 200 sends a Solar Panel Controller Update Request, which is received by Host H (S1). Here, the Solar Panel Controller Update Request is a request to send Solar Panel Controller Version Data H63$b$1$o$ (Paragraph [0195]) stored in Host H to Communication Device 200. In response to the request, Host H retrieves Solar Panel Controller Version Data H63$b$1$o$ from OS Version Data Storage Area H63$b$1 (Paragraph [0195]), and sends the data to Communication Device 200 (S2). Upon receiving Solar Panel Controller Version Data H63$b$1$o$ from Host H (S3), CPU 211 compares Solar Panel Controller Version Data H63$b$1$o$ with Solar Panel Controller Version Data 20663$b$1$o$ stored in OS Version Data Storage Area 20663$b$1 (Paragraph [0189]) of Communication Device 200 (S4). Assuming that CPU 211 detects in S4 that Solar Panel Controller Version Data 20663$b$1$o$ of Communication Device 200 is of an old version. CPU 211 sends a New Solar Panel Controller Sending Request, which is received by Host H (S5). Here, the New Solar Panel Controller Sending Request is a request to send Solar Panel Controller H63OSo (Paragraph [0192]) stored in Host H to Communication Device 200. Host H retrieves Solar Panel Controller H63OSo (Paragraph [0192]), which is of the latest version, from Operating System Storage Area H63OS (Paragraph [0192]), and sends the controller to Communication Device 200 (S6). Upon receiving Solar Panel Controller H63OSo from Host H (S7), CPU 211 stores Solar Panel Controller H63OSo as Solar Panel Controller 20663OSo in Operating System 20663OS (Paragraph [0185]) (S8). The old version of Solar Panel Controller 20663OSo (Paragraph [0185]) is deleted.

Paragraph [0227]—This Paragraph [0227] illustrates Speaker Controller Updating Software H63$c$1$p$ (Paragraph [0196]) of Host H (Paragraph [0025]) and Speaker Controller Updating Software 20663$c$1$p$ (Paragraph [0190]) of Communication Device 200, which update Speaker Controller 20663OSp stored in Operating System 20663OS (Paragraph [0185]) of Communication Device 200. In the present embodiment, CPU 211 (FIG. 1) of Communication Device 200 retrieves Speaker Controller Version Data 20663$b$1$p$ from OS Version Data Storage Area 20663$b$1 (Paragraph [0189]) and sends the data to Host H (S1). Upon receiving Speaker Controller Version Data 20663$b$1$p$ (Paragraph [0189]) from Communication Device 200 (S2), Host H compares Speaker Controller Version Data 20663$b$1$p$ (Paragraph [0189]) with Speaker Controller Version Data H63$b$1$p$ stored in OS Version Data Storage Area H63$b$1 (Paragraph [0195]) of Host H (S3). Assuming that Host H detects in S3 that Speaker Controller Version Data 20663$b$1$p$ of Communication Device 200 is of an old version. Host H retrieves Speaker Controller H63OSp, which is of the latest version, from Operating System Storage Area H63OS (Paragraph [0192]), and sends the controller to Communication Device 200 (S4). Upon receiving Speaker Controller H63OSp from Host H (S5), CPU 211 stores Speaker Controller H63OSp as Speaker Controller 20663OSp in Operating System 20663OS (Paragraph [0185]) (S6). The old version of Speaker Controller 20663OSp (Paragraph [0185]) is deleted.

Paragraph [0228]—This Paragraph [0228] illustrates another embodiment of Speaker Controller Updating Software H63$c$1$p$ (Paragraph [0196]) of Host H (Paragraph [0025]) and Speaker Controller Updating Software 20663$c$1$p$ (Paragraph [0190]) of Communication Device 200, which update Speaker Controller 20663OSp stored in Operating System 20663OS (Paragraph [0185]) of Communication Device 200. In the present embodiment, CPU 211 (FIG. 1) of Communication Device 200 sends a Speaker Controller Update Request, which is received by Host H (S1). Here, the Speaker Controller Update Request is a request to send Speaker Controller Version Data H63$b$1$p$ (Paragraph [0195]) stored in Host H to Communication Device 200. In response to the request, Host H retrieves Speaker Controller Version Data H63$b$1$p$ from OS Version Data Storage Area H63$b$1 (Paragraph [0195]), and sends the data to Communication Device 200 (S2). Upon receiving Speaker Controller Version Data H63$b$1$p$ from Host H (S3), CPU 211 compares Speaker Controller Version Data H63$b$1$p$ with Speaker Controller Version Data 20663$b$1$p$ stored in OS Version Data Storage Area 20663$b$1 (Paragraph [0189]) of Communication Device 200 (S4). Assuming that CPU 211 detects in S4 that Speaker Controller Version Data 20663$b$1$p$ of Communication Device 200 is of an old version. CPU 211 sends a New Speaker Controller Sending Request, which is received by Host H (S5). Here, the New Speaker Controller Sending Request is a request to send Speaker Controller H63OSp (Paragraph [0192]) stored in Host H to Communication Device 200. Host H retrieves Speaker Controller H63OSp (Paragraph [0192]), which is of the latest version, from Operating System Storage Area H63OS (Paragraph [0192]), and sends the controller to Communication Device 200 (S6). Upon receiving Speaker Controller H63OSp from Host H (S7), CPU 211 stores Speaker Controller H63OSp as Speaker Controller 20663OSp in Operating System 20663OS (Paragraph [0185]) (S8). The old version of Speaker Controller 20663OSp (Paragraph [0185]) is deleted.

Paragraph [0229]—This Paragraph [0229] illustrates Vibrator Controller Updating Software H63$c$1$q$ (Paragraph [0196]) of Host H (Paragraph [0025]) and Vibrator Controller Updating Software 20663$c$1$q$ (Paragraph [0190]) of Communication Device 200, which update Vibrator Controller 20663OSq stored in Operating System 20663OS (Paragraph [0185]) of Communication Device 200. In the present embodiment, CPU 211 (FIG. 1) of Communication Device 200 retrieves Vibrator Controller Version Data 20663$b$1$q$ from OS Version Data Storage Area 20663$b$1 (Paragraph [0189]) and sends the data to Host H (S1). Upon receiving Vibrator Controller Version Data 20663$b$1$q$ (Paragraph [0189]) from Communication Device 200 (S2), Host H compares Vibrator Controller Version Data 20663$b$1$q$ (Paragraph [0189]) with Vibrator Controller Version Data H63$b$1$q$ stored in OS Version Data Storage Area H63$b$1 (Paragraph [0195]) of Host H (S3). Assuming that Host H detects in S3 that Vibrator Controller Version Data 20663$b$1$q$ of Communication Device 200 is of an old version. Host H retrieves Vibrator Controller H63OSq, which is of the latest version, from Operating System Storage Area H63OS (Paragraph [0192]), and sends the controller to Communication Device 200 (S4). Upon receiving Vibrator Controller H63OSq from Host H (S5), CPU 211 stores Vibrator Controller H63OSq as Vibrator Controller 20663OSq in Operating System 20663OS (Paragraph [0185]) (S6). The old version of Vibrator Controller 20663OSq (Paragraph [0185]) is deleted.

Paragraph [0230]—This Paragraph [0230] illustrates another embodiment of Vibrator Controller Updating Software H63c1q (Paragraph [0196]) of Host H (Paragraph [0025]) and Vibrator Controller Updating Software 20663c1q (Paragraph [0190]) of Communication Device 200, which update Vibrator Controller 20663OSq stored in Operating System 20663OS (Paragraph [0185]) of Communication Device 200. In the present embodiment, CPU 211 (FIG. 1) of Communication Device 200 sends a Vibrator Controller Update Request, which is received by Host H (S1). Here, the Vibrator Controller Update Request is a request to send Vibrator Controller Version Data H63b1q (Paragraph [0195]) stored in Host H to Communication Device 200. In response to the request, Host H retrieves Vibrator Controller Version Data H63b1q from OS Version Data Storage Area H63b1 (Paragraph [0195]), and sends the data to Communication Device 200 (S2). Upon receiving Vibrator Controller Version Data H63b1q from Host H (S3), CPU 211 compares Vibrator Controller Version Data H63b1q with Vibrator Controller Version Data 20663b1q stored in OS Version Data Storage Area 20663b1 (Paragraph [0189]) of Communication Device 200 (S4). Assuming that CPU 211 detects in S4 that Vibrator Controller Version Data 20663b1q of Communication Device 200 is of an old version. CPU 211 sends a New Vibrator Controller Sending Request, which is received by Host H (S5). Here, the New Vibrator Controller Sending Request is a request to send Vibrator Controller H63OSq (Paragraph [0192]) stored in Host H to Communication Device 200. Host H retrieves Vibrator Controller H63OSq (Paragraph [0192]), which is of the latest version, from Operating System Storage Area H63OS (Paragraph [0192]), and sends the controller to Communication Device 200 (S6). Upon receiving Vibrator Controller H63OSq from Host H (S7), CPU 211 stores Vibrator Controller H63OSq as Vibrator Controller 20663OSq in Operating System 20663OS (Paragraph [0185]) (S8). The old version of Vibrator Controller 20663OSq (Paragraph [0185]) is deleted.

Paragraph [0231]—This Paragraph [0231] illustrates Video Processor Controller Updating Software H63c1r (Paragraph [0196]) of Host H (Paragraph [0025]) and Video Processor Controller Updating Software 20663c1r (Paragraph [0190]) of Communication Device 200, which update Video Processor Controller 20663OSr stored in Operating System 20663OS (Paragraph [0185]) of Communication Device 200. In the present embodiment, CPU 211 (FIG. 1) of Communication Device 200 retrieves Video Processor Controller Version Data 20663b1r from OS Version Data Storage Area 20663b1 (Paragraph [0189]) and sends the data to Host H (S1). Upon receiving Video Processor Controller Version Data 20663b1r (Paragraph [0189]) from Communication Device 200 (S2), Host H compares Video Processor Controller Version Data 20663b1r (Paragraph [0189]) with Video Processor Controller Version Data H63b1r stored in OS Version Data Storage Area H63b1 (Paragraph [0195]) of Host H (S3). Assuming that Host H detects in S3 that Video Processor Controller Version Data 20663b1r of Communication Device 200 is of an old version. Host H retrieves Video Processor Controller H63OSr, which is of the latest version, from Operating System Storage Area H63OS (Paragraph [0192]), and sends the controller to Communication Device 200 (S4). Upon receiving Video Processor Controller H63OSr from Host H (S5), CPU 211 stores Video Processor Controller H63OSr as Video Processor Controller 20663OSr in Operating System 20663OS (Paragraph [0185]) (S6). The old version of Video Processor Controller 20663OSr (Paragraph [0185]) is deleted.

Paragraph [0232]—This Paragraph [0232] illustrates another embodiment of Video Processor Controller Updating Software H63c1r (Paragraph [0196]) of Host H (Paragraph [0025]) and Video Processor Controller Updating Software 20663c1r (Paragraph [0190]) of Communication Device 200, which update Video Processor Controller 20663OSr stored in Operating System 20663OS (Paragraph [0185]) of Communication Device 200. In the present embodiment, CPU 211 (FIG. 1) of Communication Device 200 sends a Video Processor Controller Update Request, which is received by Host H (S1). Here, the Video Processor Controller Update Request is a request to send Video Processor Controller Version Data H63b1r (Paragraph [0195]) stored in Host H to Communication Device 200. In response to the request, Host H retrieves Video Processor Controller Version Data H63b1r from OS Version Data Storage Area H63b1 (Paragraph [0195]), and sends the data to Communication Device 200 (S2). Upon receiving Video Processor Controller Version Data H63b1r from Host H (S3), CPU 211 compares Video Processor Controller Version Data H63b1r with Video Processor Controller Version Data 20663b1r stored in OS Version Data Storage Area 20663b1 (Paragraph [0189]) of Communication Device 200 (S4). Assuming that CPU 211 detects in S4 that Video Processor Controller Version Data 20663b1r of Communication Device 200 is of an old version. CPU 211 sends a New Video Processor Controller Sending Request, which is received by Host H (S5). Here, the New Video Processor Controller Sending Request is a request to send Video Processor Controller H63OSr (Paragraph [0192]) stored in Host H to Communication Device 200. Host H retrieves Video Processor Controller H63OSr (Paragraph [0192]), which is of the latest version, from Operating System Storage Area H63OS (Paragraph [0192]), and sends the controller to Communication Device 200 (S6). Upon receiving Video Processor Controller H63OSr from Host H (S7), CPU 211 stores Video Processor Controller H63OSr as Video Processor Controller 20663OSr in Operating System 20663OS (Paragraph [0185]) (S8). The old version of Video Processor Controller 20663OSr (Paragraph [0185]) is deleted.

Paragraph [0233]—This Paragraph [0233] illustrates Wireless Receiver Controller Updating Software H63c1s (Paragraph [0196]) of Host H (Paragraph [0025]) and Wireless Receiver Controller Updating Software 20663c1s (Paragraph [0190]) of Communication Device 200, which update Wireless Receiver Controller 20663OSs stored in Operating System 20663OS (Paragraph [0185]) of Communication Device 200. In the present embodiment, CPU 211 (FIG. 1) of Communication Device 200 retrieves Wireless Receiver Controller Version Data 20663b1s from OS Version Data Storage Area 20663b1 (Paragraph [0189]) and sends the data to Host H (S1). Upon receiving Wireless Receiver Controller Version Data 20663b1s (Paragraph [0189]) from Communication Device 200 (S2), Host H compares Wireless Receiver Controller Version Data 20663b1s (Paragraph [0189]) with Wireless Receiver Controller Version Data H63b1s stored in OS Version Data Storage Area H63b1 (Paragraph [0195]) of Host H (S3). Assuming that Host H detects in S3 that Wireless Receiver Controller Version Data 20663b1s of Communication Device 200 is of an old version. Host H retrieves Wireless Receiver Controller H63OSs, which is of the latest version, from Operating System Storage Area H63OS (Paragraph [0192]), and sends the controller to Communication Device 200 (S4). Upon receiving Wireless Receiver Controller H63OSs from Host H (S5), CPU 211 stores Wireless Receiver Controller H63OSs as Wireless Receiver Controller 20663OSs in Operating System 20663OS (Paragraph [0185]) (S6). The old version of Wireless Receiver Controller 20663OSs (Paragraph [0185]) is deleted.

Paragraph [0234]—This Paragraph [0234] illustrates another embodiment of Wireless Receiver Controller Updating Software H63c1s (Paragraph [0196]) of Host H (Paragraph [0025]) and Wireless Receiver Controller Updating Software 20663c1s (Paragraph [0190]) of Communication Device 200, which update Wireless Receiver Controller 20663OSs stored in Operating System 20663OS (Paragraph [0185]) of Communication Device 200. In the present embodiment, CPU 211 (FIG. 1) of Communication Device 200 sends a Wireless Receiver Controller Update Request#1, which is received by Host H (S1). Here, the Wireless Receiver Controller Update Request#1 is a request to send Wireless Receiver Controller Version Data H63b1s (Paragraph [0195]) stored in Host H to Communication Device 200. In response to the request, Host H retrieves Wireless Receiver Controller Version Data H63b1s from OS Version Data Storage Area H63b1 (Paragraph [0195]), and sends the data to Communication Device 200 (S2). Upon receiving Wireless Receiver Controller Version Data H63b1s from Host H (S3), CPU 211 compares Wireless Receiver Controller Version Data H63b1s with Wireless Receiver Controller Version Data 20663b1s stored in OS Version Data Storage Area 20663b1 (Paragraph [0189]) of Communication Device 200 (S4). Assuming that CPU 211 detects in S4 that Wireless Receiver Controller Version Data 20663b1s of Communication Device 200 is of an old version. CPU 211 sends a New Wireless Receiver Controller Sending Request#1, which is received by Host H (S5). Here, the New Wireless Receiver Controller Sending Request#1 is a request to send Wireless Receiver Controller H63OSs (Paragraph [0192]) stored in Host H to Communication Device 200. Host H retrieves Wireless Receiver Controller H63OSs (Paragraph [0192]), which is of the latest version, from Operating System Storage Area H63OS (Paragraph [0192]), and sends the controller to Communication Device 200 (S6). Upon receiving Wireless Receiver Controller H63OSs from Host H (S7), CPU 211 stores Wireless Receiver Controller H63OSs as Wireless Receiver Controller 20663OSs in Operating System 20663OS (Paragraph [0185]) (S8). The old version of Wireless Receiver Controller 20663OSs (Paragraph [0185]) is deleted.

Paragraph [0235]—This Paragraph [0235] illustrates Wireless Receiver Controller Updating Software H63c1t (Paragraph [0196]) of Host H (Paragraph [0025]) and Wireless Receiver Controller Updating Software 20663c1t (Paragraph [0190]) of Communication Device 200, which update Wireless Receiver Controller 20663OSt stored in Operating System 20663OS (Paragraph [0185]) of Communication Device 200. In the present embodiment, CPU 211 (FIG. 1) of Communication Device 200 retrieves Wireless Receiver Controller Version Data 20663b1t from OS Version Data Storage Area 20663b1 (Paragraph [0189]) and sends the data to Host H (S1). Upon receiving Wireless Receiver Controller Version Data 20663b1t (Paragraph [0189]) from Communication Device 200 (S2), Host H compares Wireless Receiver Controller Version Data 20663b1t (Paragraph [0189]) with Wireless Receiver Controller Version Data H63b1t stored in OS Version Data Storage Area H63b1 (Paragraph [0195]) of Host H (S3). Assuming that Host H detects in S3 that Wireless Receiver Controller Version Data 20663b1t of Communication Device 200 is of an old version. Host H retrieves Wireless Receiver Controller H63OSt, which is of the latest version, from Operating System Storage Area H63OS (Paragraph [0192]), and sends the controller to Communication Device 200 (S4). Upon receiving Wireless Receiver Controller H63OSt from Host H (S5), CPU 211 stores Wireless Receiver Controller H63OSt as Wireless Receiver Controller 20663OSt in Operating System 20663OS (Paragraph [0185]) (S6). The old version of Wireless Receiver Controller 20663OSt (Paragraph [0185]) is deleted.

Paragraph [0236]—This Paragraph [0236] illustrates another embodiment of Wireless Receiver Controller Updating Software H63c1t (Paragraph [0196]) of Host H (Paragraph [0025]) and Wireless Receiver Controller Updating Software 20663c it (Paragraph [0190]) of Communication Device 200, which update Wireless Receiver Controller 20663OSt stored in Operating System 20663OS (Paragraph [0185]) of Communication Device 200. In the present embodiment, CPU 211 (FIG. 1) of Communication Device 200 sends a Wireless Receiver Controller Update Request#2, which is received by Host H (S1). Here, the Wireless Receiver Controller Update Request#2 is a request to send Wireless Receiver Controller Version Data H63b1t (Paragraph [0195]) stored in Host H to Communication Device 200. In response to the request, Host H retrieves Wireless Receiver Controller Version Data H63b1t from OS Version Data Storage Area H63b1 (Paragraph [0195]), and sends the data to Communication Device 200 (S2). Upon receiving Wireless Receiver Controller Version Data H63b1t from Host H (S3), CPU 211 compares Wireless Receiver Controller Version Data H63b1t with Wireless Receiver Controller Version Data 20663b1t stored in OS Version Data Storage Area 20663b1 (Paragraph [0189]) of Communication Device 200 (S4). Assuming that CPU 211 detects in S4 that Wireless Receiver Controller Version Data 20663b1t of Communication Device 200 is of an old version. CPU 211 sends a New Wireless Receiver Controller Sending Request#2, which is received by Host H (S5). Here, the New Wireless Receiver Controller Sending Request#2 is a request to send Wireless Receiver Controller H63OSt (Paragraph [0192]) stored in Host H to Communication Device 200. Host H retrieves Wireless Receiver Controller H63OSt (Paragraph [0192]), which is of the latest version, from Operating System Storage Area H63OS (Paragraph [0192]), and sends the controller to Communication Device 200 (S6). Upon receiving Wireless Receiver Controller H63OSt from Host H (S7), CPU 211 stores Wireless Receiver Controller H63OSt as Wireless Receiver Controller 20663OSt in Operating System 20663OS (Paragraph [0185]) (S8). The old version of Wireless Receiver Controller 20663OSt (Paragraph [0185]) is deleted.

Paragraph [0237]—This Paragraph [0237] illustrates Wireless Receiver Controller Updating Software H63c1u (Paragraph [0196]) of Host H (Paragraph [0025]) and Wireless Receiver Controller Updating Software 20663c1u (Paragraph [0190]) of Communication Device 200, which update Wireless Receiver Controller 20663OSu stored in Operating System 20663OS (Paragraph [0185]) of Communication Device 200. In the present embodiment, CPU 211 (FIG. 1) of Communication Device 200 retrieves Wireless Receiver Controller Version Data 20663b1u from OS Version Data Storage Area 20663b1 (Paragraph [0189]) and sends the data to Host H (S1). Upon receiving Wireless Receiver Controller Version Data 20663b1u (Paragraph [0189]) from Communication Device 200 (S2), Host H compares Wireless Receiver Controller Version Data 20663b1u (Paragraph [0189]) with Wireless Receiver Controller Version Data H63b1u stored in OS Version Data Storage Area H63b1 (Paragraph [0195]) of Host H (S3). Assuming that Host H detects in S3 that Wireless Receiver Controller Version Data 20663b1u of Communication Device 200 is of an old version. Host H retrieves Wireless Receiver Controller H63OSu, which is of the latest version, from Operating System Storage Area H63OS (Paragraph [0192]), and sends the controller to Communication Device 200 (S4). Upon receiving Wireless Receiver Controller H63OSu from Host H (S5), CPU 211 stores Wireless Receiver Controller H63OSu as Wireless Receiver Controller 20663OSu in Operating System 20663OS (Paragraph [0185]) (S6). The old version of Wireless Receiver Controller 20663OSu (Paragraph [0185]) is deleted.

Paragraph [0238]—This Paragraph [0238] illustrates another embodiment of Wireless Receiver Controller Updating Software H63c1u (Paragraph [0196]) of Host H (Paragraph [0025]) and Wireless Receiver Controller Updating Software 20663c1u (Paragraph [0190]) of Communication Device 200, which update Wireless Receiver Controller 20663OSu stored in Operating System 20663OS (Paragraph [0185]) of Communication Device 200. In the present embodiment, CPU 211 (FIG. 1) of Communication Device 200 sends a Wireless Receiver Controller Update Request#3, which is received by Host H (S1). Here, the Wireless Receiver Controller Update Request#3 is a request to send Wireless Receiver Controller Version Data H63b1u (Paragraph [0195]) stored in Host H to Communication Device 200. In response to the request, Host H retrieves Wireless Receiver Controller Version Data H63b1u from OS Version Data Storage Area H63b1 (Paragraph [0195]), and sends the data to Communication Device 200 (S2). Upon receiving Wireless Receiver Controller Version Data H63b1u from Host H (S3), CPU 211 compares Wireless Receiver Controller Version Data H63b1u with Wireless Receiver Controller Version Data 20663b1u stored in OS Version Data Storage Area 20663b1 (Paragraph [0189]) of Communication Device 200 (S4). Assuming that CPU 211 detects in S4 that Wireless Receiver Controller Version Data 20663b1u of Communication Device 200 is of an old version. CPU 211 sends a New Wireless Receiver Controller Sending Request#3, which is received by Host H (S5). Here, the New Wireless Receiver Controller Sending Request#3 is a request to send Wireless Receiver Controller H63OSu (Paragraph [0192]) stored in Host H to Communication Device 200. Host H retrieves Wireless Receiver Controller H63OSu (Paragraph [0192]), which is of the latest version, from Operating System Storage Area H63OS (Paragraph [0192]), and sends the controller to Communication Device 200 (S6). Upon receiving Wireless Receiver Controller H63OSu from Host H (S7), CPU 211 stores Wireless Receiver Controller H63OSu as Wireless Receiver Controller 20663OSu in Operating System 20663OS (Paragraph [0185]) (S8). The old version of Wireless Receiver Controller 20663OSu (Paragraph [0185]) is deleted.

Paragraph [0239]—This Paragraph [0239] illustrates Wireless Transmitter Controller Updating Software H63c1v (Paragraph [0196]) of Host H (Paragraph [0025]) and Wireless Transmitter Controller Updating Software 20663c1v (Paragraph [0190]) of Communication Device 200, which update Wireless Transmitter Controller 20663OSv stored in Operating System 20663OS (Paragraph [0185]) of Communication Device 200. In the present embodiment, CPU 211 (FIG. 1) of Communication Device 200 retrieves Wireless Transmitter Controller Version Data 20663b1v from OS Version Data Storage Area 20663b1 (Paragraph [0189]) and sends the data to Host H (S1). Upon receiving Wireless Transmitter Controller Version Data 20663b1v (Paragraph [0189]) from Communication Device 200 (S2), Host H compares Wireless Transmitter Controller Version Data 20663b1v (Paragraph [0189]) with Wireless Transmitter Controller Version Data H63b1v stored in OS Version Data Storage Area H63b1 (Paragraph [0195]) of Host H (S3). Assuming that Host H detects in S3 that Wireless Transmitter Controller Version Data 20663b1v of Communication Device 200 is of an old version. Host H retrieves Wireless Transmitter Controller H63OSv, which is of the latest version, from Operating System Storage Area H63OS (Paragraph [0192]), and sends the controller to Communication Device 200 (S4). Upon receiving Wireless Transmitter Controller H63OSv from Host H (S5), CPU 211 stores Wireless Transmitter Controller H63OSv as Wireless Transmitter Controller 20663OSv in Operating System 20663OS (Paragraph [0185]) (S6). The old version of Wireless Transmitter Controller 20663OSv (Paragraph [0185]) is deleted.

Paragraph [0240]—This Paragraph [0240] illustrates another embodiment of Wireless Transmitter Controller Updating Software H63c1v (Paragraph [0196]) of Host H (Paragraph [0025]) and Wireless Transmitter Controller Updating Software 20663c1v (Paragraph [0190]) of Communication Device 200, which update Wireless Transmitter Controller 20663OSv stored in Operating System 20663OS (Paragraph [0185]) of Communication Device 200. In the present embodiment, CPU 211 (FIG. 1) of Communication Device 200 sends a Wireless Transmitter Controller Update Request#1, which is received by Host H (S1). Here, the Wireless Transmitter Controller Update Request#1 is a request to send Wireless Transmitter Controller Version Data H63b1v (Paragraph [0195]) stored in Host H to Communication Device 200. In response to the request, Host H retrieves Wireless Transmitter Controller Version Data H63b1v from OS Version Data Storage Area H63b1 (Paragraph [0195]), and sends the data to Communication Device 200 (S2). Upon receiving Wireless Transmitter Controller Version Data H63b1v from Host H (S3), CPU 211 compares Wireless Transmitter Controller Version Data H63b1v with Wireless Transmitter Controller Version Data 20663b1v stored in OS Version Data Storage Area 20663b1 (Paragraph [0189]) of Communication Device 200 (S4). Assuming that CPU 211 detects in S4 that Wireless Transmitter Controller Version Data 20663b1v of Communication Device 200 is of an old version. CPU 211 sends a New Wireless Transmitter Controller Sending Request#1, which is received by Host H (S5). Here, the New Wireless Transmitter Controller Sending Request#1 is a request to send Wireless Transmitter Controller H63OSv (Paragraph [0192]) stored in Host H to Communication Device 200. Host H retrieves Wireless Transmitter Controller H63OSv (Paragraph [0192]), which is of the latest version, from Operating System Storage Area H63OS (Paragraph [0192]), and sends the controller to Communication Device 200 (S6). Upon receiving Wireless Transmitter Controller H63OSv from Host H (S7), CPU 211 stores Wireless Transmitter Controller H63OSv as Wireless Transmitter Controller 20663OSv in Operating System 20663OS (Paragraph [0185]) (S8). The old version of Wireless Transmitter Controller 20663OSv (Paragraph [0185]) is deleted.

Paragraph [0241]—This Paragraph [0241] illustrates Wireless Transmitter Controller Updating Software H63c1w (Paragraph [0196]) of Host H (Paragraph [0025]) and Wireless Transmitter Controller Updating Software 20663c1w (Paragraph [0190]) of Communication Device 200, which update Wireless Transmitter Controller 20663OSw stored in Operating System 20663OS (Paragraph [0185]) of Communication Device 200. In the present embodiment, CPU 211 (FIG. 1) of Communication Device 200 retrieves Wireless Transmitter Controller Version Data 20663b1w from OS Version Data Storage Area 20663b1 (Paragraph [0189]) and sends the data to Host H (S1). Upon receiving Wireless Transmitter Controller Version Data 20663b1w (Paragraph [0189]) from Communication Device 200 (S2), Host H compares Wireless Transmitter Controller Version Data 20663b1w (Paragraph [0189]) with Wireless Transmitter Controller Version Data H63b1w stored in OS Version Data Storage Area H63b1 (Paragraph [0195]) of Host H (S3). Assuming that Host H detects in S3 that Wireless Transmitter Controller Version Data 20663b1w of Communication Device 200 is of an old version. Host H retrieves Wireless Transmitter Controller H63OSw, which is of the latest version, from Operating System Storage Area H63OS (Paragraph [0192]), and sends the controller to Communication Device 200 (S4). Upon receiving Wireless Transmitter Controller H63OSw from Host H (S5), CPU 211 stores Wireless Transmitter Controller H63OSw as Wireless Transmitter Controller 20663OSw in Operating System 20663OS (Paragraph [0185]) (S6). The old version of Wireless Transmitter Controller 20663OSw (Paragraph [0185]) is deleted.

Paragraph [0242]—This Paragraph [0242] illustrates another embodiment of Wireless Transmitter Controller Updating Software H63c1w (Paragraph [0196]) of Host H (Paragraph [0025]) and Wireless Transmitter Controller Updating Software 20663c1w (Paragraph [0190]) of Communication Device 200, which update Wireless Transmitter Controller 20663OSw stored in Operating System 20663OS (Paragraph [0185]) of Communication Device 200. In the present embodiment, CPU 211 (FIG. 1) of Communication Device 200 sends a Wireless Transmitter Controller Update Request#2, which is received by Host H (S1). Here, the Wireless Transmitter Controller Update Request#2 is a request to send Wireless Transmitter Controller Version Data H63b1w (Paragraph [0195]) stored in Host H to Communication Device 200. In response to the request, Host H retrieves Wireless Transmitter Controller Version Data H63b1w from OS Version Data Storage Area H63b1 (Paragraph [0195]), and sends the data to Communication Device 200 (S2). Upon receiving Wireless Transmitter Controller Version Data H63b1w from Host H (S3), CPU 211 compares Wireless Transmitter Controller Version Data H63b1w with Wireless Transmitter Controller Version Data 20663b1w stored in OS Version Data Storage Area 20663b1 (Paragraph [0189]) of Communication Device 200 (S4). Assuming that CPU 211 detects in S4 that Wireless Transmitter Controller Version Data 20663b1w of Communication Device 200 is of an old version. CPU 211 sends a New Wireless Transmitter Controller Sending Request#2, which is received by Host H (S5). Here, the New Wireless Transmitter Controller Sending Request#2 is a request to send Wireless Transmitter Controller H63OSw (Paragraph [0192]) stored in Host H to Communication Device 200. Host H retrieves Wireless Transmitter Controller H63OSw (Paragraph [0192]), which is of the latest version, from Operating System Storage Area H63OS (Paragraph [0192]), and sends the controller to Communication Device 200 (S6). Upon receiving Wireless Transmitter Controller H63OSw from Host H (S7), CPU 211 stores Wireless Transmitter Controller H63OSw as Wireless Transmitter Controller 20663OSw in Operating System 20663OS (Paragraph [0185]) (S8). The old version of Wireless Transmitter Controller 20663OSw (Paragraph [0185]) is deleted.

Paragraph [0243]—This Paragraph [0243] illustrates Wireless Transmitter Controller Updating Software H63c1x (Paragraph [0196]) of Host H (Paragraph [0025]) and Wireless Transmitter Controller Updating Software 20663c1x (Paragraph [0190]) of Communication Device 200, which update Wireless Transmitter Controller 20663OSx stored in Operating System 20663OS (Paragraph [0185]) of Communication Device 200. In the present embodiment, CPU 211 (FIG. 1) of Communication Device 200 retrieves Wireless Transmitter Controller Version Data 20663b1x from OS Version Data Storage Area 20663b1 (Paragraph [0189]) and sends the data to Host H (S1). Upon receiving Wireless Transmitter Controller Version Data 20663b1x (Paragraph [0189]) from Communication Device 200 (S2), Host H compares Wireless Transmitter Controller Version Data 20663b1x (Paragraph [0189]) with Wireless Transmitter Controller Version Data H63b1x stored in OS Version Data Storage Area H63b1 (Paragraph [0195]) of Host H (S3). Assuming that Host H detects in S3 that Wireless Transmitter Controller Version Data 20663b1x of Communication Device 200 is of an old version. Host H retrieves Wireless Transmitter Controller H63OSx, which is of the latest version, from Operating System Storage Area H63OS (Paragraph [0192]), and sends the controller to Communication Device 200 (S4). Upon receiving Wireless Transmitter Controller H63OSx from Host H (S5), CPU 211 stores Wireless Transmitter Controller H63OSx as Wireless Transmitter Controller 20663OSx in Operating System 20663OS (Paragraph [0185]) (S6). The old version of Wireless Transmitter Controller 20663OSx (Paragraph [0185]) is deleted.

Paragraph [0244]—This Paragraph [0244] illustrates another embodiment of Wireless Transmitter Controller Updating Software H63c1x (Paragraph [0196]) of Host H (Paragraph [0025]) and Wireless Transmitter Controller Updating Software 20663c1x (Paragraph [0190]) of Communication Device 200, which update Wireless Transmitter Controller 20663OSx stored in Operating System 20663OS (Paragraph [0185]) of Communication Device 200. In the present embodiment, CPU 211 (FIG. 1) of Communication Device 200 sends a Wireless Transmitter Controller Update Request#3, which is received by Host H (S1). Here, the Wireless Transmitter Controller Update Request#3 is a request to send Wireless Transmitter Controller Version Data H63b1x (Paragraph [0195]) stored in Host H to Communication Device 200. In response to the request, Host H retrieves Wireless Transmitter Controller Version Data H63b1x from OS Version Data Storage Area H63b1 (Paragraph [0195]), and sends the data to Communication Device 200 (S2). Upon receiving Wireless Transmitter Controller Version Data H63b1x from Host H (S3), CPU 211 compares Wireless Transmitter Controller Version Data H63b1x with Wireless Transmitter Controller Version Data 20663b1x stored in OS Version Data Storage Area 20663b1 (Paragraph [0189]) of Communication Device 200 (S4). Assuming that CPU 211 detects in S4 that Wireless Transmitter Controller Version Data 20663b1x of Communication Device 200 is of an old version. CPU 211 sends a New Wireless Transmitter Controller Sending Request#3, which is received by Host H (S5). Here, the New Wireless Transmitter Controller Sending Request#3 is a request to send Wireless Transmitter Controller H63OSx (Paragraph [0192]) stored in Host H to Communication Device 200. Host H retrieves Wireless Transmitter Controller H63OSx (Paragraph [0192]), which is of the latest version, from Operating System Storage Area H63OS (Paragraph [0192]), and sends the controller to Communication Device 200 (S6). Upon receiving Wireless Transmitter Controller H63OSx from Host H (S7), CPU 211 stores Wireless Transmitter Controller H63OSx as Wireless Transmitter Controller 20663OSx in Operating System 20663OS (Paragraph [0185]) (S8). The old version of Wireless Transmitter Controller 20663OSx (Paragraph [0185]) is deleted.

Paragraph [0245]—As another embodiment, each and all data and software programs described in this specification stored in Communication Device 200 may be updated in the manner described hereinbefore.

Paragraph [0246]—For the avoidance of doubt, the present function may be utilized to repair the operating system of Communication Device 200, i.e., Operating System 20663OS (Paragraph [0185]) in the form of downloading updates.

Paragraph [0247]—<<Automobile Controlling Function>>

Paragraph [0248]—Paragraph [0249] through Paragraph [0290] illustrate the automobile controlling function which enables Communication Device 200 to remotely control an automobile in a wireless fashion via Antenna 218 (FIG. 1).

Paragraph [0249]—This Paragraph [0249] illustrates the storage area included in Automobile 835, i.e., an automobile or a car. In the present embodiment, Automobile 835 includes Automobile Controlling Information Storage Area 83565*a* of which the data and the software programs stored therein are described in Paragraph [0251].

Paragraph [0250]—The data and/or the software programs stored in Automobile Controlling Information Storage Area 83565*a* (Paragraph [0249]) may be downloaded from Host H (Paragraph [0025]).

Paragraph [0251]—This Paragraph [0251] illustrates the storage areas included in Automobile Controlling Information Storage Area 83565*a* (Paragraph [0249]). In the present embodiment, Automobile Controlling Information Storage Area 83565*a* includes Automobile Controlling Data Storage Area 83565*b* and Automobile Controlling Software Storage Area 83565*c*. Automobile Controlling Data Storage Area 83565*b* stores the data necessary to implement the present function on the side of Automobile 835 (Paragraph [0249]), such as the ones described in Paragraph through Paragraph [0258]. Automobile Controlling Software Storage Area 83565*c* stores the software programs necessary to implement the present function on the side of Automobile 835, such as the ones described in Paragraph [0259].

Paragraph [0252]—This Paragraph [0252] illustrates the storage areas included in Automobile Controlling Data Storage Area 83565*b* (Paragraph [0251]). In the present embodiment, Automobile Controlling Data Storage Area 83565*b* includes User Access Data Storage Area 83565*b*1, Window Data Storage Area 83565*b*2, Door Data Storage Area 83565*b*3, Radio Channel Data Storage Area 83565*b*4, TV Channel Data Storage Area 83565*b*5, Blinker Data Storage Area 83565*b*6, and Work Area 83565*b*7. User Access Data Storage Area 83565*b*1 stores the data described in Paragraph [0253]. Window Data Storage Area 83565*b*2 stores the data described in Paragraph [0254]. Door Data Storage Area 83565*b*3 stores the data described in Paragraph [0255]. Radio Channel Data Storage Area 83565*b*4 stores the data described in Paragraph [0256]. TV Channel Data Storage Area 83565*b*5 stores the data described in Paragraph [0257]. Blinker Data Storage Area 83565*b*6 stores the data described in Paragraph [0258]. Work Area 83565*b*7 is utilized as a work area to perform calculation and temporarily store data. The data stored in Automobile Controlling Data Storage Area 83565*b* excluding the ones stored in User Access Data Storage Area 83565*b*1 and Work Area 83565*b*7 are primarily utilized for reinstallation, i.e., to reinstall the data to Communication Device 200 as described hereinafter in case the data stored in Communication Device 200 are corrupted or lost.

Paragraph [0253]—This Paragraph [0253] illustrates the data stored in User Access Data Storage Area 83565*b*1 (Paragraph [0252]). In the present embodiment, User Access Data Storage Area 83565*b*1 comprises two columns, i.e., 'User ID' and 'Password Data'. Column 'User ID' stores the user IDs, and each user ID is an identification of the user of Communication Device 200 authorized to implement the present function. Column 'Password Data' stores the password data, and each password data represents the password set by the user of the corresponding user ID. The password data is composed of alphanumeric data. In the present embodiment, User Access Data Storage Area 83565*b*1 stores the following data: the user ID 'User#1' and the corresponding password data 'Password Data#1'; the user ID 'User#2' and the corresponding password data 'Password Data#2'; the user ID 'User#3' and the corresponding password data 'Password Data#3'; and the user ID 'User#4' and the corresponding password data 'Password Data#4'. According to the present example, the users represented by User#1 through #4 are authorized to implement the present function.

Paragraph [0254]—This Paragraph [0254] illustrates the data stored in Window Data Storage Area 83565*b*2 (Paragraph [0252]). In the present embodiment, Window Data Storage Area 83565*b*2 comprises two columns, i.e., 'Window ID' and 'Window Data'. Column 'Window ID' stores the window IDs, and each window ID is an identification of the window (not shown) of Automobile 835 (Paragraph [0249]). Column 'Window Data' stores the window data, and each window data is the image data designed to be displayed on LCD 201 (FIG. 1) which represents the position of the window (not shown) of the corresponding window ID. In the present embodiment, Window Data Storage Area 83565*b*2 stores the following data: the window ID 'Window#1' and the corresponding window data 'Window Data#1'; the window ID 'Window#2' and the corresponding window data 'Window Data#2'; the window ID 'Window#3' and the corresponding window data 'Window Data#3'; and the window ID 'Window#4' and the corresponding window data 'Window Data#4'. Four windows of Automobile 835 which are represented by the window IDs, 'Window#1' through 'Window#4', are remotely controllable by implementing the present function.

Paragraph [0255]—This Paragraph [0255] illustrates the data stored in Door Data Storage Area 83565*b*3 (Paragraph [0252]). In the present embodiment, Door Data Storage Area 83565*b*3 comprises two columns, i.e., 'Door ID' and 'Door Data'. Column 'Door ID' stores the door IDs, and each door ID is an identification of the door (not shown) of Automobile 835 (Paragraph [0249]). Column 'Door Data' stores the door data, and each door data is the image data designed to be displayed on LCD 201 (FIG. 1) which represents the position of the door (not shown) of the corresponding door ID. In the present embodiment, Door Data Storage Area 83565*b*3 stores the following data: the door ID 'Door#1' and the corresponding door data 'Door Data#1'; the door ID 'Door#2' and the corresponding door data 'Door Data#2'; the door ID 'Door#3' and the corresponding door data 'Door Data#3'; and the door ID 'Door#4' and the corresponding door data 'Door Data#4'. Four doors of Automobile 835 which are represented by the door IDs, 'Door#1' through 'Door#4', are remotely controllable by implementing the present function.

Paragraph [0256]—This Paragraph [0256] illustrates the data stored in Radio Channel Data Storage Area 83565*b*4 (Paragraph [0252]). In the present embodiment, Radio Channel Data Storage Area 83565*b*4 comprises two columns, i.e., 'Radio Channel ID' and 'Radio Channel Data'. Column 'Radio Channel ID' stores the radio channel IDs, and each radio channel ID is an identification of the radio channel (not shown) playable by the radio (not shown) installed in Automobile 835 (Paragraph [0249]). Column 'Radio Channel Data' stores the radio channel data, and each radio channel data is the image data designed to be displayed on LCD 201 (FIG. 1) which represents the radio channel (not shown) of the corresponding radio channel ID. In the present embodiment, Radio Channel Data Storage Area 83565*b*4 stores the following data: the radio channel ID 'Radio Channel#1' and the corresponding radio channel data 'Radio Channel Data#1'; the radio channel ID 'Radio Channel#2' and the corresponding radio channel data 'Radio Channel Data#2'; the radio channel ID 'Radio Channel#3' and the corresponding radio channel data 'Radio Channel Data#3'; and the radio channel ID 'Radio Channel#4' and the corresponding radio channel data 'Radio Channel Data#4'. Four radio channels which are represented by the radio channel IDs, 'Radio Channel#1' through 'Radio Channel#4', are remotely controllable by implementing the present invention.

Paragraph [0257]—This Paragraph [0257] illustrates the data stored in TV Channel Data Storage Area 83565b5 (Paragraph [0252]). In the present embodiment, TV Channel Data Storage Area 83565b5 comprises two columns, i.e., 'TV Channel ID' and 'TV Channel Data'. Column 'TV Channel ID' stores the TV channel IDs, and each TV channel ID is an identification of the TV channel (not shown) playable by the TV (not shown) installed in Automobile 835 (Paragraph [0249]). Column 'TV Channel Data' stores the TV channel data, and each TV channel data is the image data designed to be displayed on LCD 201 (FIG. 1) which represents the TV channel (not shown) of the corresponding TV channel ID. In the present embodiment, TV Channel Data Storage Area 83565b5 stores the following data: the TV channel ID 'TV Channel#1' and the corresponding TV channel data 'TV Channel Data#1'; the TV channel ID 'TV Channel#2' and the corresponding TV channel data 'TV Channel Data#2'; the TV channel ID 'TV Channel#3' and the corresponding TV channel data 'TV Channel Data#3'; and the TV channel ID 'TV Channel#4' and the corresponding TV channel data 'TV Channel Data#4'. Four TV channels which are represented by the TV channel IDs, 'TV Channel#1' through 'TV Channel#4', are remotely controllable by implementing the present invention.

Paragraph [0258]—This Paragraph [0258] illustrates the data stored in Blinker Data Storage Area 83565b6 (Paragraph [0252]). In the present embodiment, Blinker Data Storage Area 83565b6 comprises two columns, i.e., 'Blinker ID' and 'Blinker Data'. Column 'Blinker ID' stores the blinker IDs, and each blinker ID is an identification of the blinker (not shown) of Automobile 835 (Paragraph [0249]). Column 'Blinker Data' stores the blinker data, and each blinker data is the image data designed to be displayed on LCD 201 (FIG. 1) which represents the blinker (not shown) of the corresponding blinker ID. In the present embodiment, Blinker Data Storage Area 83565b6 stores the following data: the blinker ID 'Blinker#1' and the corresponding blinker data 'Blinker Data#1'; and the blinker ID 'Blinker#2' and the corresponding blinker data 'Blinker Data#2'. Two blinkers which are represented by the blinker IDs, 'Blinker#1' and 'Blinker#2', are remotely controllable by implementing the present invention. Here, the blinker (not shown) represented by 'Blinker#1' is the right blinker and the blinker (not shown) represented by 'Blinker#2' is the left blinker.

Paragraph [0259]—This Paragraph [0259] illustrates the storage areas included in Automobile Controlling Software Storage Area 83565c (Paragraph [0251]). In the present embodiment, Automobile Controlling Software Storage Area 83565c includes Automobile Controller Storage Area 83565c1 and Remote Controlling Software Storage Area 83565c2. Automobile Controller Storage Area 83565c1 stores the controllers described in Paragraph [0260]. Remote Controlling Software Storage Area 83565c2 stores the software programs described in Paragraph [0261].

Paragraph [0260]—This Paragraph [0260] illustrates the controllers stored in Automobile Controller Storage Area 83565c1 (Paragraph [0259]). In the present embodiment, Automobile Controller Storage Area 83565c1 stores Engine Controller 83565c1a, Direction Controller 83565c1b, Speed Controller 83565c1c, Window Controller 83565c1d, Door Controller 83565c1e, Radio Controller 83565c1f, TV Controller 83565c1g, Radio Channel Selector 83565c1h, TV Channel Selector 83565c1i, Blinker Controller 83565c1j, Emergency Lamp Controller 83565c1k, Cruise Control Controller 83565c1l, and Speaker Volume Controller 83565c1m. Engine Controller 83565c1a is the controller which controls the engine (not shown) of Automobile 835 (Paragraph [0249]). Direction Controller 83565c1b is the controller which controls the steering wheel (not shown) of Automobile 835. Speed Controller 83565c1c is the controller which controls the accelerator (not shown) of Automobile 835. Window Controller 83565c1d is the controller which controls the windows (not shown) of Automobile 835. Door Controller 83565c1e is the controller which controls the doors (not shown) of Automobile 835. Radio Controller 83565c1f is the controller which controls the radio (not shown) of Automobile 835. TV Controller 83565c1g is the controller which controls the TV (not shown) of Automobile 835. Radio Channel Selector 83565c1h is the controller which controls the radio channels (not shown) of the radio (not shown) installed in Automobile 835. TV Channel Selector 83565c1i is the controller which controls the radio channels (not shown) of the radio (not shown) installed in Automobile 835. Blinker Controller 83565c1j is the controller which controls the blinkers (not shown) of Automobile 835. Emergency Lamp Controller 83565c1k is the controller which controls the emergency lamp (not shown) of Automobile 835. Cruise Control Controller 83565c1l is the controller which controls the cruise control (not shown) of Automobile 835. Speaker Volume Controller 83565c1m is the controller which controls the speaker (not shown) of Automobile 835. As another embodiment, the foregoing controllers may be in the form of hardware instead of software.

Paragraph [0261]—This Paragraph [0261] illustrates the software programs stored in Remote Controlling Software Storage Area 83565c2 (Paragraph [0259]). In the present embodiment, Remote Controlling Software Storage Area 83565c2 stores Engine Controlling Software 83565c2a, Direction Controlling Software 83565c2b, Speed Controlling Software 83565c2c, Window Controlling Software 83565c2d, Door Controlling Software 83565c2e, Radio Controlling Software 83565c2f, TV Controlling Software 83565c2g, Radio Channel Selecting Software 83565c2h, TV Channel Selecting Software 83565c2i, Blinker Controlling Software 83565c2j, Emergency Lamp Controlling Software 83565c2k, Cruise Control Controlling Software 83565c2l, Speaker Volume Controlling Software 83565c2m, Controller Reinstalling Software 83565c2n, Data Reinstalling Software 83565c2o, and User Access Authenticating Software 83565c2p. Engine Controlling Software 83565c2a is the software program described in Paragraph [0276]. Direction Controlling Software 83565c2b is the software program described in Paragraph [0277]. Speed Controlling Software 83565c2c is the software program described in Paragraph [0278]. Window Controlling Software 83565c2d is the software program described in Paragraph [0279]. Door Controlling Software 83565c2e is the software program described in Paragraph [0280]. Radio Controlling Software 83565c2f is the software program described in Paragraph [0281]. TV Controlling Software 83565c2g is the software program described in Paragraph [0282]. Radio Channel Selecting Software 83565c2h is the software program described in Paragraph [0283]. TV Channel Selecting Software 83565c2i is the software program described in Paragraph [0284].

Blinker Controlling Software 83565c2j is the software program described in Paragraph [0285]. Emergency Lamp Controlling Software 83565c2k is the software program described in Paragraph [0286]. Cruise Control Controlling Software 83565c2l is the software program described in Paragraph [0287]. Speaker Volume Controlling Software 83565c2m is the software program described in Paragraph [0288]. Controller Reinstalling Software 83565c2n is the software program described in Paragraph [0289]. Data Reinstalling Software 83565c2o is the software program described in Paragraph [0290]. User Access Authenticating Software 83565c2p is the software program described in Paragraph [0275]. The controllers stored in Automobile Controller Storage Area 83565c1 primarily functions as directly controlling Automobile 835 in the manner described in Paragraph [0260], and the software programs stored in Remote Controlling Software Storage Area 83565c2 controls the controllers stored in Automobile Controller Storage Area 83565c1, by cooperating with the software programs stored in Remote Controlling Software Storage Area 20665c2 (Paragraph [0274]) of Communication Device 200, in a wireless fashion via Antenna 218 (FIG. 1).

Paragraph [0262]—This Paragraph [0262] illustrates the storage area included in RAM 206 (FIG. 1) of Communication Device 200. In the present embodiment, RAM 206 includes Automobile Controlling Information Storage Area 20665a of which the data and the software programs stored therein are described in Paragraph [0264].

Paragraph [0263]—The data and/or the software programs stored in Automobile Controlling Information Storage Area 20665a (Paragraph [0262]) may be downloaded from Host H (Paragraph [0025]).

Paragraph [0264]—This Paragraph [0264] illustrates the storage areas included in Automobile Controlling Information Storage Area 20665a (Paragraph [0262]). In the present embodiment, Automobile Controlling Information Storage Area 20665a includes Automobile Controlling Data Storage Area 20665b and Automobile Controlling Software Storage Area 20665c. Automobile Controlling Data Storage Area 20665b stores the data necessary to implement the present function on the side of Communication Device 200, such as the ones described in Paragraph [0265] through Paragraph [0271]. Automobile Controlling Software Storage Area 20665c stores the software programs necessary to implement the present function on the side of Communication Device 200, such as the ones described in Paragraph [0272].

Paragraph [0265]—This Paragraph [0265] illustrates the storage areas included in Automobile Controlling Data Storage Area 20665b (Paragraph [0264]). In the present embodiment, Automobile Controlling Data Storage Area 20665b includes User Access Data Storage Area 20665b1, Window Data Storage Area 20665b2, Door Data Storage Area 20665b3, Radio Channel Data Storage Area 20665b4, TV Channel Data Storage Area 20665b5, Blinker Data Storage Area 20665b6, and Work Area 20665b7. User Access Data Storage Area 20665b1 stores the data described in Paragraph [0266]. Window Data Storage Area 20665b2 stores the data described in Paragraph [0267]. Door Data Storage Area 20665b3 stores the data described in Paragraph [0268]. Radio Channel Data Storage Area 20665b4 stores the data described in Paragraph [0269]. TV Channel Data Storage Area 20665b5 stores the data described in Paragraph [0270]. Blinker Data Storage Area 20665b6 stores the data described in Paragraph [0271]. Work Area 20665b7 is utilized as a work area to perform calculation and temporarily store data.

Paragraph [0266]—This Paragraph [0266] illustrates the data stored in User Access Data Storage Area 20665b1 (Paragraph [0265]). In the present embodiment, User Access Data Storage Area 20665b1 comprises two columns, i.e., 'User ID' and 'Password Data'. Column 'User ID' stores the user ID which is an identification of the user of Communication Device 200. Column 'Password Data' stores the password data which represents the password set by the user of Communication Device 200. The password data is composed of alphanumeric data. In the present embodiment, User Access Data Storage Area 20665b1 stores the following data: the user ID 'User#1' and the corresponding password data 'Password Data#1'.

Paragraph [0267]—This Paragraph [0267] illustrates the data stored in Window Data Storage Area 20665b2 (Paragraph [0265]). In the present embodiment, Window Data Storage Area 20665b2 comprises two columns, i.e., 'Window ID' and 'Window Data'. Column 'Window ID' stores the window IDs, and each window ID is an identification of the window (not shown) of Automobile 835 (Paragraph [0249]). Column 'Window Data' stores the window data, and each window data is the image data designed to be displayed on LCD 201 (FIG. 1) which represents the position of the window (not shown) of the corresponding window ID. In the present embodiment, Window Data Storage Area 20665b2 stores the following data: the window ID 'Window#1' and the corresponding window data 'Window Data#1'; the window ID 'Window#2' and the corresponding window data 'Window Data#2'; the window ID 'Window#3' and the corresponding window data 'Window Data#3'; and the window ID 'Window#4' and the corresponding window data 'Window Data#4'. Four windows of Automobile 835 which are represented by the window IDs, 'Window#1' through 'Window#4', are remotely controllable by implementing the present function.

Paragraph [0268]—This Paragraph [0268] illustrates the data stored in Door Data Storage Area 20665b3 (Paragraph [0265]). In the present embodiment, Door Data Storage Area 20665b3 comprises two columns, i.e., 'Door ID' and 'Door Data'. Column 'Door Data' stores the door data, and each door data is the image data designed to be displayed on LCD 201 (FIG. 1) which represents the position of the door (not shown) of the corresponding door ID. In the present embodiment, Door Data Storage Area 20665b3 stores the following data: the door ID 'Door#1' and the corresponding door data 'Door Data#1'; the door ID 'Door#2' and the corresponding door data 'Door Data#2'; the door ID 'Door#3' and the corresponding door data 'Door Data#3'; and the door ID 'Door#4' and the corresponding door data 'Door Data#4'. Four doors of Automobile 835 (Paragraph [0249]) which are represented by the door IDs, 'Door#1' through 'Door#4', are remotely controllable by implementing the present function.

Paragraph [0269]—This Paragraph [0269] illustrates the data stored in Radio Channel Data Storage Area 20665b4 (Paragraph [0265]). In the present embodiment, Radio Channel Data Storage Area 20665b4 comprises two columns, i.e., 'Radio Channel ID' and 'Radio Channel Data'. Column 'Radio Channel ID' stores the radio channel IDs, and each radio channel ID is an identification of the radio channel (not shown) playable by the radio (not shown) installed in Automobile 835 (Paragraph [0249]). Column 'Radio Channel Data' stores the radio channel data, and each radio channel data is the image data designed to be displayed on LCD 201 (FIG. 1) which represents the radio channel (not shown) of the corresponding radio channel ID. In the present embodiment, Radio Channel Data Storage Area 20665b4 stores the following data: the radio channel ID 'Radio Channel#1' and the corresponding radio channel data 'Radio Channel Data#1'; the radio channel ID 'Radio Channel#2' and the corresponding radio channel data 'Radio Channel Data#2'; the radio channel ID 'Radio Channel#3' and the corresponding radio channel data 'Radio Channel Data#3'; and the radio channel ID 'Radio Channel#4' and the corresponding radio channel data 'Radio Channel Data#4'. Four radio channels which are represented by the radio channel IDs, 'Radio Channel#1' through 'Radio Channel#4', are remotely controllable by implementing the present invention.

Paragraph [0270]—This Paragraph [0270] illustrates the data stored in TV Channel Data Storage Area 20665b5 (Paragraph [0265]). In the present embodiment, TV Channel Data Storage Area 20665b5 comprises two columns, i.e., 'TV Channel ID' and 'TV Channel Data'. Column 'TV Channel ID' stores the TV channel IDs, and each TV channel ID is an identification of the TV channel (not shown) playable by the TV (not shown) installed in Automobile 835 (Paragraph [0249]). Column 'TV Channel Data' stores the TV channel data, and each TV channel data is the image data designed to be displayed on LCD 201 (FIG. 1) which represents the TV channel (not shown) of the corresponding TV channel ID. In the present embodiment, TV Channel Data Storage Area 20665b5 stores the following data: the TV channel ID 'TV Channel#1' and the corresponding TV channel data 'TV Channel Data#1'; the TV channel ID 'TV Channel#2' and the corresponding TV channel data 'TV Channel Data#2'; the TV channel ID 'TV Channel#3' and the corresponding TV channel data 'TV Channel Data#3'; and the TV channel ID 'TV Channel#4' and the corresponding TV channel data 'TV Channel Data#4'. Four TV channels which are represented by the TV channel IDs, 'TV Channel#1' through 'TV Channel#4', are remotely controllable by implementing the present invention.

Paragraph [0271]—This Paragraph [0271] illustrates the data stored in Blinker Data Storage Area 20665b6 (Paragraph [0265]). In the present embodiment, Blinker Data Storage Area 20665b6 comprises two columns, i.e., 'Blinker ID' and 'Blinker Data'. Column 'Blinker ID' stores the blinker IDs, and each blinker ID is an identification of the blinker (not shown) of Automobile 835 (Paragraph [0249]). Column 'Blinker Data' stores the blinker data, and each blinker data is the image data designed to be displayed on LCD 201 (FIG. 1) which represents the blinker (not shown) of the corresponding blinker ID. In the present embodiment, Blinker Data Storage Area 20665b6 stores the following data: the blinker ID 'Blinker#1' and the corresponding blinker data 'Blinker Data#1'; and the blinker ID 'Blinker#2' and the corresponding blinker data 'Blinker Data#2'. Two blinkers which are represented by the blinker IDs, 'Blinker#1' and 'Blinker#2', are remotely controllable by implementing the present invention. Here, the blinker (not shown) represented by 'Blinker#1' is the right blinker and the blinker (not shown) represented by 'Blinker#2' is the left blinker.

Paragraph [0272]—This Paragraph [0272] illustrates the storage areas included in Automobile Controlling Software Storage Area 20665c (Paragraph [0264]). In the present embodiment, Automobile Controlling Software Storage Area 20665c includes Automobile Controller Storage Area 20665c1 and Remote Controlling Software Storage Area 20665c2. Automobile Controller Storage Area 20665c1 stores the controllers described in Paragraph [0273]. Remote Controlling Software Storage Area 20665c2 stores the software programs described in Paragraph [0274].

Paragraph [0273]—This Paragraph [0273] illustrates the controllers stored in Automobile Controller Storage Area 20665c1 (Paragraph [0272]). In the present embodiment, Automobile Controller Storage Area 20665c1 stores Engine Controller 20665c1a, Direction Controller 20665c1b, Speed Controller 20665c1c, Window Controller 20665c1d, Door Controller 20665c1e, Radio Controller 20665c1f, TV Controller 20665c1g, Radio Channel Selector 20665c1h, TV Channel Selector 20665c1i, Blinker Controller 20665c1j, Emergency Lamp Controller 20665c1k, Cruise Control Controller 20665c1l, and Speaker Volume Controller 20665c1m. Engine Controller 20665c1a is the controller which controls the engine (not shown) of Automobile 206. Direction Controller 20665c1b is the controller which controls the steering wheel (not shown) of Automobile 206. Speed Controller 20665c1c is the controller which controls the accelerator (not shown) of Automobile 206. Window Controller 20665c1d is the controller which controls the windows (not shown) of Automobile 206. Door Controller 20665c1e is the controller which controls the doors (not shown) of Automobile 206. Radio Controller 20665c1f is the controller which controls the radio (not shown) of Automobile 206. TV Controller 20665c1g is the controller which controls the TV (not shown) of Automobile 206. Radio Channel Selector 20665c1h is the controller which controls the radio channels (not shown) of the radio (not shown) installed in Automobile 206. TV Channel Selector 20665c1i is the controller which controls the radio channels (not shown) of the radio (not shown) installed in Automobile 206. Blinker Controller 20665c1j is the controller which controls the blinkers (not shown) of Automobile 206. Emergency Lamp Controller 20665c1k is the controller which controls the emergency lamp (not shown) of Automobile 206. Cruise Control Controller 20665c1l is the controller which controls the cruise control (not shown) of Automobile 206. Speaker Volume Controller 20665c1m is the controller which controls the speaker (not shown) of Automobile 206. As another embodiment, the foregoing controllers may be in the form of hardware instead of software. The data stored in Automobile Controller Storage Area 20665c1 are primarily utilized for reinstallation, i.e., to reinstall the data to Automobile 835 (Paragraph [0249]) as described hereinafter in case the data stored in Automobile 835 are corrupted or lost.

Paragraph [0274]—This Paragraph [0274] illustrates the software programs stored in Remote Controlling Software Storage Area 20665c2 (Paragraph [0264]). In the present embodiment, Remote Controlling Software Storage Area 20665c2 stores Engine Controlling Software 20665c2a, Direction Controlling Software 20665c2b, Speed Controlling Software 20665c2c, Window Controlling Software 20665c2d, Door Controlling Software 20665c2e, Radio Controlling Software 20665c2f, TV Controlling Software 20665c2g, Radio Channel Selecting Software 20665c2h, TV Channel Selecting Software 20665c2i, Blinker Controlling Software 20665c2j, Emergency Lamp Controlling Software 20665c2k, Cruise Control Controlling Software 20665c2l, Speaker Volume Controlling Software 20665c2m, Controller Reinstalling Software 20665c2n, Data Reinstalling Software 20665c2o, and User Access Authenticating Software 20665c2p. Engine Controlling Software 20665c2a is the software program described in Paragraph [0276]. Direction Controlling Software 20665c2b is the software program described in Paragraph [0277]. Speed Controlling Software 20665c2c is the software program described in Paragraph [0278]. Window Controlling Software 20665c2d is the software program described in Paragraph [0279]. Door Controlling Software 20665c2e is the software program described in Paragraph [0280]. Radio Controlling Software 20665c2f is the software program described in Paragraph [0281]. TV Controlling Software 20665c2g is the software program described in Paragraph [0282]. Radio Channel Selecting Software 20665c2h is the software program described in Paragraph [0283]. TV Channel Selecting Software 20665c2i is the software program described in Paragraph [0284]. Blinker Controlling Software 20665c2j is the software program described in Paragraph [0285]. Emergency Lamp Controlling Software 20665c2k is the software program described in Paragraph [0286]. Cruise Control Controlling Software 20665c2l is the software program described in Paragraph [0287]. Speaker Volume Controlling Software 20665c2m is the software program described in Paragraph [0288]. Controller Reinstalling Software 20665c2n is the software program described in Paragraph [0289]. Data Reinstalling Software 20665c2o is the software program described in Paragraph [0290]. User Access Authenticating Software 20665c2p is the software program described in Paragraph [0275]. The controllers stored in Automobile Controller Storage Area 83565c1 primarily functions as directly controlling Automobile 835 in the manner described in Paragraph [0260], and the software programs stored in Remote Controlling Software Storage Area 83565c2 (Paragraph [0274]) controls the controllers stored in Automobile Controller Storage Area 83565c1 (Paragraph [0260]), by cooperating with the software programs stored in Remote Controlling Software Storage Area 83565c2 (Paragraph [0261]) of Automobile 835, in a wireless fashion via Antenna 218 (FIG. 1).

Paragraph [0275]—This Paragraph [0275] illustrates User Access Authenticating Software 83565c2p (Paragraph [0261]) of Automobile 835 (Paragraph [0249]) and User Access Authenticating Software 20665c2p (Paragraph [0274]) of Communication Device 200, which determine whether Communication Device 200 in question is authorized to remotely control Automobile 835 by implementing the present function. In the present embodiment, the user of Communication Device 200 inputs the user ID and the password data by utilizing Input Device 210 (FIG. 1) or via voice recognition system. The user ID and the password data are temporarily stored in User Access Data Storage Area 20665b1 (Paragraph [0266]) from which the two data are sent to Automobile 835 (S1). Assume that the user input 'User#1' as the user ID and 'Password Data#1' as the password data. Upon receiving the user ID and the password data (in the present example, User#1 and Password Data#1) from Communication Device 200, Automobile 835 stores the two data in Work Area 83565b7 (Paragraph [0252]) (S2). Automobile 835 then initiates the authentication process to determine whether Communication Device 200 in question is authorized to remotely control Automobile 835 by referring to the data stored in User Access Data Storage Area 83565b1 (Paragraph [0253]) (S3). Assume that the authenticity of Communication Device 200 in question is cleared. Automobile 835 permits Communication Device 200 in question to remotely control Automobile 835 in the manner described hereinafter (S4).

Paragraph [0276]—This Paragraph [0276] illustrates Engine Controlling Software 83565c2a (Paragraph [0261]) of Automobile 835 (Paragraph [0249]) and Engine Controlling Software 20665c2a (Paragraph [0274]) of Communication Device 200, which ignite or turn off the engine (not shown) of Automobile 835. In the present embodiment, the user of Communication Device 200 inputs an engine controlling signal by utilizing Input Device 210 (FIG. 1) or via voice recognition system. The signal is sent to Automobile 835 (S1). Here, the engine controlling signal indicates either to ignite the engine or turn off the engine. Upon receiving the engine controlling signal from Communication Device 200, Automobile 835 stores the signal in Work Area 83565b7 (Paragraph [0252]) (S2). Automobile 835 controls the engine (not shown) via Engine Controller 83565c1a (Paragraph [0260]) in accordance with the engine controlling signal (S3).

Paragraph [0277]—This Paragraph [0277] illustrates Direction Controlling Software 83565c2b (Paragraph [0261]) of Automobile 835 (Paragraph [0249]) and Direction Controlling Software 20665c2b (Paragraph [0274]) of Communication Device 200, which control the direction of Automobile 835. In the present embodiment, the user of Communication Device 200 inputs a direction controlling signal by utilizing Input Device 210 (FIG. 1) or via voice recognition system. The signal is sent to Automobile 835 (S1). Here, the direction controlling signal indicates either to move forward, back, left, or right Automobile 835. Upon receiving the direction controlling signal from Communication Device 200, Automobile 835 stores the signal in Work Area 83565b7 (Paragraph [0252]) (S2). Automobile 835 controls the direction via Direction Controller 83565c1b (Paragraph [0260]) in accordance with the direction controlling signal (S3).

Paragraph [0278]—This Paragraph [0278] illustrates Speed Controlling Software 83565c2c (Paragraph [0261]) of Automobile 835 (Paragraph [0249]) and Speed Controlling Software 20665c2c (Paragraph [0274]) of Communication Device 200, which control the speed of Automobile 835. In the present embodiment, the user of Communication Device 200 inputs a speed controlling signal by utilizing Input Device 210 (FIG. 1) or via voice recognition system. The signal is sent to Automobile 835 (S1). Here, the speed controlling signal indicates either to increase speed or decrease speed of Automobile 835. Upon receiving the speed controlling signal from Communication Device 200, Automobile 835 stores the signal in Work Area 83565b7 (Paragraph [0252]) (S2). Automobile 835 controls the speed via Speed Controller 83565c1c (Paragraph [0260]) In accordance the with speed controlling signal (S3).

Paragraph [0279]—This Paragraph [0279] illustrates Window Controlling Software 83565c2d (Paragraph [0261]) of Automobile 835 (Paragraph [0249]) and Window Controlling Software 20665c2d (Paragraph [0274]) of Communication Device 200, which control the window (not shown) of Automobile 835. In the present embodiment, CPU 211 (FIG. 1) of Communication Device 200 retrieves all window data from Window Data Storage Area 20665b2 (Paragraph [0267]) and displays the data on LCD 201 (FIG. 1) (S1). The user of Communication Device 200 selects one of the window data (for example, Window Data#1), and CPU 211 identifies the corresponding window ID (for example, Window#1) by referring to Window Data Storage Area 20665b2 (Paragraph [0267]) (S2). The user further inputs a window controlling signal by utilizing Input Device 210 (FIG. 1) or via voice recognition system (S3). Here, the window controlling signal indicates either to open the window or to close the window. CPU 211 sends the window ID and the window controlling signal to Automobile 835 (S4). Upon receiving the window ID and the window controlling signal from Communication Device 200, Automobile 835 stores both data in Work Area 83565b7 (Paragraph [0252]) (S5). Automobile 835 controls the window identified by the window ID via Window Controller 83565c1d (Paragraph [0260]) in accordance with the window controlling signal (S6).

Paragraph [0280]—This Paragraph [0280] illustrates Door Controlling Software 83565c2e (Paragraph [0261]) of Automobile 835 (Paragraph [0249]) and Door Controlling Software 20665c2e (Paragraph [0274]) of Communication Device 200, which control the door (not shown) of Automobile 835. In the present embodiment, CPU 211 (FIG. 1) of Communication Device 200 retrieves all door data from Door Data Storage Area 20665b3 (Paragraph [0268]) and displays the data on LCD 201 (FIG. 1) (S1). The user of Communication Device 200 selects one of the door data (for example, Door Data#1), and CPU 211 identifies the corresponding door ID (for example, Door#1) by referring to Door Data Storage Area 20665$b3$ (Paragraph [0268]) (S2). The user further inputs a door controlling signal by utilizing Input Device 210 (FIG. 1) or via voice recognition system. Here, the door controlling signal indicates either to open the door or to close the door (S3). CPU 211 sends the door ID and the door controlling signal to Automobile 835 (S4). Upon receiving the door ID and the door controlling signal from Communication Device 200, Automobile 835 stores both data in Work Area 83565$b7$ (Paragraph [0252]) (S5). Automobile 835 controls the door identified by the door ID via Door Controller 83565$c1e$ (Paragraph [0260]) in accordance with the door controlling signal (S6).

Paragraph [0281]—This Paragraph [0281] illustrates Radio Controlling Software 83565$c2f$ (Paragraph [0261]) of Automobile 835 (Paragraph [0249]) and Radio Controlling Software 20665$c2f$ (Paragraph [0274]) of Communication Device 200, which turn on or turn off the radio (not shown) installed in Automobile 835. In the present embodiment, the user of Communication Device 200 inputs a radio controlling signal, and CPU 211 sends the signal to Automobile 835 (S1). Here, the radio controlling signal indicates either to turn on the radio or to turn off the radio. Upon receiving the radio controlling signal from Communication Device 200, Automobile 835 stores the signal in Work Area 83565$b7$ (Paragraph [0252]) (S2). Automobile 835 controls the radio via Radio Controller 83565$c1f$ (Paragraph [0260]) in accordance with the radio controlling signal (S3).

Paragraph [0282]—This Paragraph [0282] illustrates TV Controlling Software 83565$c2g$ (Paragraph [0261]) of Automobile 835 (Paragraph [0249]) and TV Controlling Software 20665$c2g$ (Paragraph [0274]) of Communication Device 200, which turn on or turn off the TV (not shown) installed in Automobile 835. In the present embodiment, the user of Communication Device 200 inputs a TV controlling signal, and CPU 211 (FIG. 1) sends the signal to Automobile 835 (S1). Here, the TV controlling signal indicates either to turn on the TV or to turn off the TV. Upon receiving the TV controlling signal from Communication Device 200, Automobile 835 stores the signal in Work Area 83565$b7$ (Paragraph [0252]) (S2). Automobile 835 controls the TV via TV Controller 83565$c1g$ (Paragraph [0260]) in accordance with the TV controlling signal (S3).

Paragraph [0283]—This Paragraph [0283] illustrates Radio Channel Selecting Software 83565$c2h$ (Paragraph [0261]) of Automobile 835 (Paragraph [0249]) and Radio Channel Selecting Software 20665$c2h$ (Paragraph [0274]) of Communication Device 200, which select the channel of the radio (not shown) installed in Automobile 835. In the present embodiment, CPU 211 (FIG. 1) of Communication Device 200 retrieves all radio channel data from Radio Channel Data Storage Area 20665$b4$ (Paragraph [0269]) and Displays the data on LCD 201 (FIG. 1) (S1). The user of Communication Device 200 selects one of the radio channel data (for example, Radio Channel Data#1), and CPU 211 identifies the corresponding radio channel ID (for example, Radio Channel#1) by referring to Radio Channel Data Storage Area 20665$b4$ (Paragraph [0269]) (S2). CPU 211 sends the radio channel ID and the radio channel controlling signal to Automobile 835 (S3). Here, the radio channel controlling signal indicates to change the radio channel to the one identified by the radio channel ID. Upon receiving the radio channel ID and the radio channel controlling signal from Communication Device 200, Automobile 835 stores both data in Work Area 83565$b7$ (Paragraph [0252]) (S4). Automobile 835 controls the radio channel of the radio via Radio Channel Selector 83565$c1h$ (Paragraph [0260]) in accordance with the Radio Channel Controlling Signal (S5).

Paragraph [0284]—This Paragraph [0284] illustrates TV Channel Selecting Software 83565$c2i$ (Paragraph [0261]) of Automobile 835 (Paragraph [0249]) and TV Channel Selecting Software 20665$c2i$ (Paragraph [0274]) of Communication Device 200, which select the channel of the TV (not shown) installed in Automobile 835. In the present embodiment, CPU 211 (FIG. 1) of Communication Device 200 retrieves all TV channel data from TV Channel Data Storage Area 20665$b5$ (Paragraph [0270]) and displays the data on LCD 201 (FIG. 1) (S1). The user of Communication Device 200 selects one of the TV channel data, and CPU 211 identifies the corresponding TV channel ID (for example, TV Channel#1) by referring to TV Channel Data Storage Area 20665$b5$ (Paragraph [0270]) (S2). CPU 211 sends the TV channel ID and the TV channel controlling signal to Automobile 835 (S3). Here, the TV channel controlling signal indicates to change the TV channel to the one identified by the TV channel ID. Upon receiving the TV channel ID and the TV channel controlling signal from Communication Device 200, Automobile 835 stores both data in Work Area 83565$b7$ (Paragraph [0252]) (S4). Automobile 835 controls the TV Channel via TV Channel Selector 83565$c1i$ (Paragraph [0260]) in accordance with the TV channel controlling signal (S5).

Paragraph [0285]—This Paragraph [0285] illustrates Blinker Controlling Software 83565$c2j$ (Paragraph [0261]) of Automobile 835 (Paragraph [0249]) and Blinker Controlling Software 20665$c2j$ (Paragraph [0274]) of Communication Device 200, which turn on or turn off the blinker (not shown) of Automobile 835. In the present embodiment, CPU 211 (FIG. 1) of Communication Device 200 retrieves all blinker data from Blinker Data Storage Area 20665$b6$ (Paragraph [0271]) and displays the data on LCD 201 (FIG. 1) (S1). The user of Communication Device 200 selects one of the blinker data, and CPU 211 identifies the corresponding blinker ID (for example Blinker#1) by referring to Blinker Data Storage Area 20665$b6$ (Paragraph [0271]) (S2). CPU 211 sends the blinker ID and the blinker controlling signal to Automobile 835 (S3). Here, the blinker controlling signal indicates either to turn on or turn off the blinker identified by the blinker ID. Upon receiving the blinker ID and the blinker controlling signal from Communication Device 200, Automobile 835 stores both data in Work Area 83565$b7$ (Paragraph [0252]) (S4). Automobile 835 controls the blinker via Blinker Controller 20665$c1j$ in accordance with the blinker controlling signal (S5).

Paragraph [0286]—This Paragraph [0286] illustrates Emergency Lamp Controlling Software 83565$c2k$ (Paragraph [0261]) of Automobile 835 (Paragraph [0249]) and Emergency Lamp Controlling Software 20665$c2k$ (Paragraph [0274]) of Communication Device 200, which turn on or turn off the emergency lamp (not shown) installed in Automobile 835. In the present embodiment, the user of Communication Device 200 inputs an emergency lamp controlling signal, and CPU 211 (FIG. 1) sends the signal to Automobile 835 (S1). Here, the emergency lamp controlling signal indicates either to turn on the emergency lamp or to turn off the emergency lamp. Upon receiving the emergency lamp controlling signal from Communication Device 200, Automobile 835 stores the signal in Work Area 83565$b7$ (Paragraph [0252]) (S2). Automobile 835 controls the emergency lamp via Emergency Lamp Controller 83565c1k (Paragraph [0260]) in accordance with the emergency lamp controlling signal (S3).

Paragraph [0287]—This Paragraph [0287] illustrates Cruise Control Controlling Software 83565c2l (Paragraph [0261]) of Automobile 835 (Paragraph [0249]) and Cruise Control Controlling Software 20665c2l (Paragraph [0274]) of Communication Device 200, which turn on or turn off the cruise control (not shown) of Automobile 835. In the present embodiment, the user of Communication Device 200 inputs a cruise control controlling signal, and CPU 211 (FIG. 1) sends the signal to Automobile 835 (S1). Here, the cruise control controlling signal indicates either to turn on the cruise control or turn off the cruise control. Upon receiving the cruise control controlling signal from Communication Device 200, Automobile 835 stores the signal in Work Area 83565b7 (Paragraph [0252]) (S2). Automobile 835 controls the cruise control via Cruise Control Controller 83565c1l (Paragraph [0260]) in accordance with the cruise control controlling signal (S3).

Paragraph [0288]—This Paragraph [0288] illustrates Speaker Volume Controlling Software 83565c2m (Paragraph [0261]) of Automobile 835 (Paragraph [0249]) and Speaker Volume Controlling Software 20665c2m (Paragraph [0274]) of Communication Device 200, which raise or lower the volume of the speaker (not shown) of Automobile 835. In the present embodiment, the user of Communication Device 200 inputs a speaker volume controlling signal, and CPU 211 (FIG. 1) sends the signal to Automobile 835 (S1). Here, the speaker volume controlling signal indicates either to raise the volume or lower the volume of the speaker. Upon receiving the speaker volume controlling signal from Communication Device 200, Automobile 835 stores the signal in Work Area 83565b7 (Paragraph [0252]) (S2). Automobile 835 controls the speaker volume of the speaker via Speaker Volume Controller 83565c1m (Paragraph [0260]) in accordance with the speaker volume controlling signal (S3).

Paragraph [0289]—This Paragraph [0289] illustrates Controller Reinstalling Software 83565c2n (Paragraph [0261]) of Automobile 835 (Paragraph [0249]) and Controller Reinstalling Software 20665c2n (Paragraph [0274]) of Communication Device 200, which reinstalls the controllers to Automobile Controller Storage Area 83565c1. In the present embodiment, CPU 211 (FIG. 1) of Communication Device 200 retrieves all controllers from Automobile Controller Storage Area 20665c1, and sends the controllers to Automobile 835 (S1). Upon receiving the controllers from Communication Device 200, Automobile 835 stores the controllers in Work Area 83565b7 (Paragraph [0252]) (S2). Automobile 835 then reinstalls the controllers in Automobile Controller Storage Area 83565c1 (S3).

Paragraph [0290]—This Paragraph [0290] illustrates Data Reinstalling Software 83565c2o (Paragraph [0261]) of Automobile 835 (Paragraph [0249]) and Data Reinstalling Software 20665c2o (Paragraph [0274]) of Communication Device 200, which reinstall the data to Automobile Controlling Data Storage Area 20665b. In the present embodiment, Automobile 835 retrieves all data from Automobile Controlling Data Storage Area 83565b, and sends the data to Communication Device 200 (S1). Upon receiving the data from Automobile 835, CPU 211 (FIG. 1) of Communication Device 200 stores the data in Work Area 20665b7 (S2). CPU 211 then reinstalls the data in Automobile Controlling Data Storage Area 20665b (S3).

Paragraph [0291]—For the avoidance of doubt, Automobile 835 (Paragraph [0249]) is not limited to an automobile or a car; the present function may be implemented with any type of carrier or vehicle, such as airplane, space ship, artificial satellite, space station, train, and motor cycle.

Paragraph [0292]—<<DVD Remote Controlling Function>>

Paragraph [0293]—Paragraph [0294] through Paragraph [0315] illustrate DVD remote controlling function which enables Communication Device 200 to remotely control a DVD player (not shown).

Paragraph [0294]—This Paragraph [0294] illustrates the screen displayed on DVD Monitor DVDM69, a monitor which displays the DVD signal received from the DVD player, after both DVD Monitor DVDM69 and the DVD player are powered on. In the present embodiment, DVD Monitor DVDM69 displays Main Menu MM69 of the movie inserted in the DVD player. In the present embodiment, Main Menu MM69 is composed of the following menu icons: Chapter Menu Icon MM69a, Language Menu Icon MM69b, Sub-title Menu Icon MM69c, and Start Movie Icon MM69d. Chapter Menu Icon MM69a is the icon which displays the screen described in Paragraph [0295] upon which said icon is selected by the user of Communication Device 200. Language Menu Icon MM69b is the icon which displays the screen described in Paragraph [0296] upon which said icon is selected by the user of Communication Device 200. Sub-title Menu Icon MM69c is the icon which displays the screen described in Paragraph [0297] upon which said icon is selected by the user of Communication Device 200. Start Movie Icon MM69d is the icon which starts the movie inserted in the DVD player (not shown) upon which said icon is selected by the user of Communication Device 200.

Paragraph [0295]—This Paragraph [0295] illustrates the screen displayed on DVD Monitor DVDM69 when Chapter Menu Icon MM69a is selected from Main Menu MM69 (Paragraph [0294]). In the present embodiment, DVD Monitor DVDM69 displays Chapter List CL69 of the movie inserted in the DVD player. In the present example, Chapter List CL69 is composed of the following chapter icons: Chapter 1 Icon CL69a, Chapter 2 Icon CL69b, Chapter 3 Icon CL69c, Chapter 4 Icon CL69d, Start Movie Icon CL69e, and Main Menu Icon CL69f Chapter 1 Icon CL69a represents the first chapter of the movie inserted in the DVD player. Chapter 2 Icon CL69b represents the second chapter of the movie inserted in the DVD player. Chapter 3 Icon CL69c represents the third chapter of the movie inserted in the DVD player. Chapter 4 Icon CL69d represents the fourth chapter of the movie inserted in the DVD player. Start Movie Icon CL69e is the icon which starts, upon which said icon is selected by the user, the movie inserted in the DVD player (not shown) from the chapter represented by the icon selected by the user of Communication Device 200. Assume that the user selects Chapter 3 Icon CL69c from Chapter List CL69. The movie starts from the chapter represented by Chapter 3 Icon CL69c thereafter. Main Menu Icon CL69f is the icon which displays the screen described in Paragraph [0294] upon which said icon is selected by the user of Communication Device 200.

Paragraph [0296]—This Paragraph [0296] illustrates the screen displayed on DVD Monitor DVDM69 when Language Menu Icon MM69b is selected from Main Menu MM69 (Paragraph [0294]). In the present embodiment, DVD Monitor DVDM69 displays Language List LL69 of the movie inserted in the DVD player. In the present embodiment, Language List LL69 is composed of the following language icons: English Icon LL69a, Japanese Icon LL69b, French Icon LL69c, and Main Menu Icon LL69d. English Icon LL69a is the icon which plays the movie inserted in the DVD player (not shown) in English upon which said icon is selected by the user of Communication Device 200. Japanese Icon LL69*b* is the icon which plays the movie inserted in the DVD player (not shown) in Japanese upon which said icon is selected by the user of Communication Device 200. French Icon LL69*c* is the icon which plays the movie inserted in the DVD player (not shown) in French upon which said icon is selected by the user of Communication Device 200. Main Menu Icon LL69*d* is the icon which displays the screen described in Paragraph [0294] upon which said icon is selected by the user of Communication Device 200.

Paragraph [0297]—This Paragraph [0297] illustrates the screen displayed on DVD Monitor DVDM69 when Sub-title Menu Icon MM69*c* is selected from Main Menu MM69 (Paragraph [0294]). In the present embodiment, DVD Monitor DVDM69 displays Sub-title List StL69 of the movie inserted in the DVD player. In the present embodiment, Sub-title List StL69 is composed of the following sub-title icons: English Icon StL69*a*, Japanese Icon StL69*b*, French Icon StL69*c*, Sub-title OFF Icon StL69*d*, and Main Menu Icon StL69*e*. English Icon StL69*a* is the icon which displays the sub-titles in English while played of the movie inserted in the DVD player (not shown) upon which said icon is selected by the user of Communication Device 200. Japanese Icon StL69*b* is the icon which displays the sub-titles in Japanese while played of the movie inserted in the DVD player (not shown) upon which said icon is selected by the user of Communication Device 200. French Icon StL69*c* is the icon which displays the sub-titles in French while played of the movie inserted in the DVD player (not shown) upon which said icon is selected by the user of Communication Device 200. Sub-title OFF Icon StL69*d* is the icon which displays no sub-title while played of the movie upon which said icon is selected by the user of Communication Device 200. Main Menu Icon StL69*e* is the icon which displays the screen described in Paragraph [0294] upon which said icon is selected by the user of Communication Device 200.

Paragraph [0298]—This Paragraph [0298] illustrates the storage area included in RAM 206 (FIG. 1) of Communication Device 200. In the present embodiment, RAM 206 includes DVD Remote Controlling Information Storage Area 20669*a* of which the data and the software programs stored therein are described in Paragraph [0300].

Paragraph [0299]—The data and/or the software programs stored in DVD Remote Controlling Information Storage Area 20669*a* (Paragraph [0298]) may be downloaded from Host H (Paragraph [0025]).

Paragraph [0300]—This Paragraph [0300] illustrates the storage areas included in DVD Remote Controlling Information Storage Area 20669*a* (Paragraph [0298]). In the present embodiment, DVD Remote Controlling Information Storage Area 20669*a* includes DVD Remote Controlling Data Storage Area 20669*b* and DVD Remote Controlling Software Storage Area 20669*c*. DVD Remote Controlling Data Storage Area 20669*b* stores the data necessary to implement the present function, such as the ones described in Paragraph [0301] through Paragraph [0303]. DVD Remote Controlling Software Storage Area 20669*c* stores the software programs necessary to implement the present function, such as the ones described in Paragraph [0304].

Paragraph [0301]—This Paragraph [0301] illustrates the storage areas included in DVD Remote Controlling Data Storage Area 20669*b* (Paragraph [0300]). In the present embodiment, DVD Remote Controlling Data Storage Area 20669*b* includes DVD Player Type Data Storage Area 20669*b*1 and Work Area 20669*b*2. DVD Player Type Data Storage Area 20669*b*1 stores the data described in Paragraph [0302]. Work Area 20669*b*2 is utilized as a work area to perform calculation and temporarily store data.

Paragraph [0302]—This Paragraph [0302] illustrates the data stored in DVD Player Type Data Storage Area 20669*b*1 (Paragraph [0301]). In the present embodiment, DVD Player Type Data Storage Area 20669*b*1 comprises two columns, i.e., 'DVD Player Type ID' and 'DVD Player Type Data'. Column 'DVD Player Type ID' stores the DVD player type IDs, and each DVD player ID is an identification of the DVD player type data stored in column 'DVD Player Type Data'. Each DVD player ID is the name of the DVD player manufacturer. Column 'DVD Player Type Data' stores the DVD player type data, and each DVD player type data is a package of signals designed to be sent to the DVD player (not shown) in a wireless fashion via Antenna 218 (FIG. 1) or LED 219 (not shown). In the present embodiment, DVD Player Type Data Storage Area 20669*b*1 stores the following data: DVD player type ID 'DVD Player Type#1' and the corresponding DVD player type Data 'DVD Player Type Data#1'; DVD player type ID 'DVD Player Type#2' and the corresponding DVD player type Data 'DVD Player Type Data#2'; DVD player type ID 'DVD Player Type#3' and the corresponding DVD player type Data 'DVD Player Type Data#3'; and DVD player type ID 'DVD Player Type#4' and the corresponding DVD player type Data 'DVD Player Type Data#4'. Here, DVD Player Type#1 represents Sony; DVD Player Type#2 represents Samsung; DVD Player Type#3 represents NEC; and DVD Player Type#4 represents Mitsubishi. DVD Player Type Data#1 is a package of signals designed to be sent to the DVD player manufactured by Sony in a wireless fashion via Antenna 218 (FIG. 1) or LED 219 (not shown). DVD Player Type Data#2 is a package of signals designed to be sent to the DVD player manufactured by Samsung in a wireless fashion via Antenna 218 (FIG. 1) or LED 219 (not shown). DVD Player Type Data#3 is a package of signals designed to be sent to the DVD player manufactured by NEC in a wireless fashion via Antenna 218 (FIG. 1) or LED 219 (not shown). DVD Player Type Data#4 is a package of signals designed to be sent to the DVD player manufactured by Mitsubishi in a wireless fashion via Antenna 218 (FIG. 1) or LED 219 (not shown). Each DVD player type data includes the following data: power on signal, power off signal, main menu displaying signal, main menu selecting signal, chapter menu selecting signal, chapter selecting signal, movie starting signal, sound menu selecting signal, sound selecting signal, sub-title menu selecting signal, and sub-title selecting signal. The details of each signal is described in the next paragraph.

Paragraph [0303]—This Paragraph [0303] illustrates the signals included in DVD Player Type Data#1 stored in DVD Player Type Data Storage Area 20669*b*1 (Paragraph [0302]), for example. As described in the present paragraph, DVD Player Type Data#1 includes Power ON Signal#1, Power OFF Signal#1, Main Menu Displaying Signal#1, Chapter Menu Selecting Signal#1, Chapter Selecting Signal#1, Movie Starting Signal#1, Language Menu Selecting Signal#1, Language Selecting Signal#1, Sub-title Menu Selecting Signal#1, and Sub-title Selecting Signal#1. Power ON Signal#1 is the wireless signal which instructs the DVD player of the corresponding manufacturer (i.e., Sony) to turn on its power. Power OFF Signal#1 is the wireless signal which instructs the DVD player of the corresponding manufacturer (i.e., Sony) to turn off its power. Main Menu Displaying Signal#1 is the wireless signal which instructs the DVD player of the corresponding manufacturer (i.e., Sony) to display Main Menu MM69 (Paragraph [0294]). Chapter Menu Selecting Signal#1 is the wireless signal which instructs the DVD player of the corresponding manufacturer (i.e., Sony) to select Chapter Menu Icon MM69*a* (Paragraph [0294]) and display Chapter List CL69 (Paragraph [0295]). Chapter Selecting Signal#1 is the wireless signal which instructs the DVD player of the corresponding manufacturer (i.e., Sony) to select one of the chapter icons from Chapter List CL69 (Paragraph [0295]). Movie Starting Signal#1 is the wireless signal which instructs the DVD player of the corresponding manufacturer (i.e., Sony) to start the movie from the chapter represented by the chapter icon identified by Chapter Selecting Signal#1. Language Menu Selecting Signal#1 is the wireless signal which instructs the DVD player of the corresponding manufacturer (i.e., Sony) to select Language Menu Icon MM69b (Paragraph [0294]) and display Language List LL69 (Paragraph [0296]). Language Selecting Signal#1 is the wireless signal which instructs the DVD player of the corresponding manufacturer (i.e., Sony) to select one of the sound icons from Language List LL69 (Paragraph [0296]). Sub-title Menu Selecting Signal#1 is the wireless signal which instructs the DVD player of the corresponding manufacturer (i.e., Sony) to select Sub-title Menu Icon MM69c (Paragraph [0294]) and display Sub-title List StL69 (Paragraph [0297]). Sub-title Selecting Signal#1 is the wireless signal which instructs the DVD player of the corresponding manufacturer (i.e., Sony) to select one of the sub-title icons from Sub-title List StL69 (Paragraph [0297]).

Paragraph [0304]—This Paragraph [0304] illustrates the software programs stored in DVD Remote Controlling Software Storage Area 20669c (Paragraph [0300]). In the present embodiment, DVD Remote Controlling Software Storage Area 20669c stores DVD Player Type Selecting Software 20669c1, DVD Power ON Software 20669c2, DVD Power OFF Software 20669c3, Main Menu Displaying Software 20669c4, Chapter Menu Selecting Software 20669c5, Chapter Selecting Software 20669c6, Movie Starting Software 20669c7, Language Menu Selecting Software 20669c8, Language Selecting Software 20669c9, Sub-title Menu Selecting Software 20669c10. DVD Player Type Selecting Software 20669c1 is the software program described in Paragraph [0305]. DVD Power ON Software 20669c2 is the software program described in Paragraph [0306]. DVD Power OFF Software 20669c3 is the software program described in Paragraph [0307]. Main Menu Displaying Software 20669c4 is the software program described in Paragraph [0308]. Chapter Menu Selecting Software 20669c5 is the software program described in Paragraph [0309]. Chapter Selecting Software 20669c6 is the software program described in Paragraph [0310]. Movie Starting Software 20669c7 is the software program described in Paragraph [0311]. Language Menu Selecting Software 20669c8 is the software program described in Paragraph [0312]. Language Selecting Software 20669c9 is the software program described in Paragraph [0313]. Sub-title Menu Selecting Software 20669c10 is the software program described in Paragraph [0314]. Sub-title Selecting Software 20669c11 is the software program described in Paragraph [0315].

Paragraph [0305]—This Paragraph [0305] illustrates DVD Player Type Selecting Software 20669c1 (Paragraph [0304]) of Communication Device 200, which selects the DVD player type of the DVD player. In the present embodiment, CPU 211 (FIG. 1) of Communication Device 200 retrieves all DVD Player Type IDs from DVD Player Type Data Storage Area 20669b1 (Paragraph [0302]) (S1), and displays a list of DVD player type IDs on LCD 201 (FIG. 1) (S2). The user of Communication Device 200 selects a DVD player type ID by utilizing Input Device 210 (FIG. 1) or via voice recognition system (S3). CPU 211 retrieves the corresponding DVD player type data, and stores the data in Work Area 20669b2 (Paragraph [0301]) (S4). Assume that the DVD player ID selected in S3 is DVD Player Type#1 (i.e., Sony) and DVD Player Type Data#1 is stored in Work Area 20669b2 in S4 for purposes of explaining the software programs hereinafter.

Paragraph [0306]—This Paragraph [0306] illustrates DVD Power ON Software 20669c2 (Paragraph [0304]) of Communication Device 200, which sends Power ON Signal#1, i.e., the wireless signal which instructs the DVD player of the corresponding manufacturer (i.e., Sony) to turn on its power. In the present embodiment, the user of Communication Device 200 inputs a power ON command by utilizing Input Device 210 (FIG. 1) or via voice recognition system (S1). CPU 211 (FIG. 1) retrieves Power ON Signal#1 from Work Area 20669b2 (Paragraph [0301]) (S2), and sends Power ON Signal#1 to the DVD player (S3).

Paragraph [0307]—This Paragraph [0307] illustrates DVD Power OFF Software 20669c3 (Paragraph [0304]) of Communication Device 200, which sends Power OFF Signal#1, i.e., the wireless signal which instructs the DVD player of the corresponding manufacturer (i.e., Sony) to turn off its power. In the present embodiment, the user of Communication Device 200 inputs a power OFF command by utilizing Input Device 210 (FIG. 1) or via voice recognition system (S1). CPU 211 (FIG. 1) retrieves Power OFF Signal#1 from Work Area 20669b2 (Paragraph [0301]) (S2), and sends Power OFF Signal#1 to the DVD player (S3).

Paragraph [0308]—This Paragraph [0308] illustrates Main Menu Displaying Software 20669c4 (Paragraph [0304]) of Communication Device 200, which sends Main Menu Displaying Signal#1, i.e., the wireless signal which instructs the DVD player of the corresponding manufacturer (i.e., Sony) to display Main Menu MM69 (Paragraph [0294]). In the present embodiment, the user of Communication Device 200 inputs a main menu displaying command by utilizing Input Device 210 (FIG. 1) or via voice recognition system (S1). CPU 211 (FIG. 1) retrieves Main Menu Displaying Signal#1 from Work Area 20669b2 (Paragraph [0301]) (S2), and sends Main Menu Displaying Signal#1 to the DVD player (S3).

Paragraph [0309]—This Paragraph [0309] illustrates Chapter Menu Selecting Software 20669c5 (Paragraph [0304]) of Communication Device 200, which sends Chapter Menu Selecting Signal#1, i.e., the wireless signal which instructs the DVD player of the corresponding manufacturer (i.e., Sony) to select Chapter Menu Icon MM69a (Paragraph [0294]) and display Chapter List CL69 (Paragraph [0295]). In the present embodiment, the user of Communication Device 200 inputs a chapter menu selecting command by utilizing Input Device 210 (FIG. 1) or via voice recognition system (S1). CPU 211 (FIG. 1) retrieves Chapter Menu Selecting Signal#1 from Work Area 20669b2 (Paragraph [0301]) (S2), and sends Chapter Menu Selecting Signal#1 to the DVD player (S3).

Paragraph [0310]—This Paragraph [0310] illustrates Chapter Selecting Software 20669c6 (Paragraph [0304]) of Communication Device 200, which sends Chapter Selecting Signal#1, i.e., the wireless signal which instructs the DVD player of the corresponding manufacturer (i.e., Sony) to select one of the chapter icons from Chapter List LL69 (Paragraph [0295]). In the present embodiment, the user of Communication Device 200 inputs a chapter selecting command by utilizing Input Device 210 (FIG. 1) or via voice recognition system (S1). CPU 211 (FIG. 1) retrieves Chapter Selecting Signal#1 from Work Area 20669b2 (Paragraph [0301]) (S2), and sends Chapter Selecting Signal#1 to the DVD player (S3).

Paragraph [0311]—This Paragraph [0311] illustrates Movie Starting Software 20669c7 (Paragraph [0304]) of Communication Device 200, which sends Movie Starting Signal#1, i.e., the wireless signal which instructs the DVD player of the corresponding manufacturer (i.e., Sony) to start the movie from the chapter represented by the chapter icon identified by Chapter Selecting Signal#1. In the present embodiment, the user of Communication Device 200 inputs a movie starting command by utilizing Input Device 210 (FIG. 1) or via voice recognition system (S1). CPU 211 (FIG. 1) retrieves Movie Starting Signal#1 from Work Area 20669*b*2 (Paragraph [0301]) (S2), and sends Movie Starting Signal#1 to the DVD player (S3).

Paragraph [0312]—This Paragraph [0312] illustrates Language Menu Selecting Software 20669*c*8 (Paragraph [0304]) of Communication Device 200, which sends Language Menu Selecting Signal#1, i.e., the wireless signal which instructs the DVD player of the corresponding manufacturer (i.e., Sony) to select Language Menu Icon MM69*b* (Paragraph [0294]) and display Language List LL69 (Paragraph [0296]). In the present embodiment, the user of Communication Device 200 inputs a language menu selecting command by utilizing Input Device 210 (FIG. 1) or via voice recognition system (S1). CPU 211 (FIG. 1) retrieves Language Menu Selecting Signal#1 from Work Area 20669*b*2 (Paragraph [0301]) (S2), and sends Language Menu Selecting Signal#1 to the DVD player (S3).

Paragraph [0313]—This Paragraph [0313] illustrates Language Selecting Software 20669*c*9 (Paragraph [0304]) of Communication Device 200, which sends Language Selecting Signal#1, i.e., the wireless signal which instructs the DVD player of the corresponding manufacturer (i.e., Sony) to select one of the sound icons from Language List LL69 (Paragraph [0296]). In the present embodiment, the user of Communication Device 200 inputs a language selecting command by utilizing Input Device 210 (FIG. 1) or via voice recognition system (S1). CPU 211 (FIG. 1) retrieves Language Selecting Signal#1 from Work Area 20669*b*2 (Paragraph [0301]) (S2), and sends Language Selecting Signal#1 to the DVD player (S3).

Paragraph [0314]—This Paragraph [0314] illustrates Sub-title Menu Selecting Software 20669*c*10 (Paragraph [0304]) of Communication Device 200, which sends Sub-title Menu Selecting Signal#1, i.e., the wireless signal which instructs the DVD player of the corresponding manufacturer (i.e., Sony) to select Sub-title Menu Icon MM69*c* (Paragraph [0294]) and display Sub-title List StL69 (Paragraph [0297]). In the present embodiment, the user of Communication Device 200 inputs a sub-title menu selecting command by utilizing Input Device 210 (FIG. 1) or via voice recognition system (S1). CPU 211 (FIG. 1) retrieves Sub-title Menu Selecting Signal#1 from Work Area 20669*b*2 (Paragraph [0301]) (S2), and sends Sub-title Menu Selecting Signal#1 to the DVD player (S3).

Paragraph [0315]—This Paragraph [0315] illustrates Sub-title Selecting Software 20669*c*11 (Paragraph [0304]) of Communication Device 200, which sends Sub-title Selecting Signal#1, i.e., the wireless signal which instructs the DVD player of the corresponding manufacturer (i.e., Sony) to select one of the sub-title icons from Sub-title List StL69 (Paragraph [0297]). In the present embodiment, the user of Communication Device 200 inputs a sub-title selecting command by utilizing Input Device 210 (FIG. 1) or via voice recognition system (S1). CPU 211 (FIG. 1) retrieves Sub-title Selecting Signal#1 from Work Area 20669*b*2 (Paragraph [0301]) (S2), and sends Sub-title Selecting Signal#1 to the DVD player (S3).

Paragraph [0316]—<<Multiple Mode Implementing Function>>

Paragraph [0317]—Paragraph [0318] through Paragraph [0323] illustrate the multiple mode implementing function of Communication Device 200 which enables to activate and implement a plurality of modes, functions, and/or systems described in this specification simultaneously.

Paragraph [0318]—This Paragraph [0318] illustrates the software programs stored in RAM 206 (FIG. 1) to implement the multiple mode implementing function (FIG. 1). As described in Paragraph [0318], RAM 206 includes Multiple Mode Implementer Storage Area 20690*a*. Multiple Mode Implementer Storage Area 20690*a* stores Multiple Mode Implementer 20690*b*, Mode List Displaying Software 20690*c*, Mode Selecting Software 20690*d*, Mode Activating Software 20690*e*, and Mode Implementation Repeater 20690*f*, all of which are software programs. Multiple Mode Implementer 20690*b* administers the overall implementation of the present function. One of the major tasks of Multiple Mode Implementer 20690*b* is to administer and control the timing and sequence of Mode List Displaying Software 20690*c*, Mode Selecting Software 20690*d*, Mode Activating Software 20690*e*, and Mode Implementation Repeater 20690*f*. For example, Multiple Mode Implementer 20690*b* executes them in the following order: Mode List Displaying Software 20690*c*, Mode Selecting Software 20690*d*, Mode Activating Software 20690*e*, and Mode Implementation Repeater 20690*f*. Mode List Displaying Software 20690*c* displays on LCD 201 (FIG. 1) a list of a certain amount or all modes, functions, and/or systems explained in this specification of which the sequence is explained in Paragraph [0319]. Mode Selecting Software 20690*d* selects a certain amount or all modes, functions, and/or systems explained in this specification of which the sequence is explained in Paragraph [0320]. Mode Activating Software 20690*e* activates a certain amount or all modes, functions, and/or systems selected by the Mode Selecting Software 20690*d* of which the sequence is explained in Paragraph [0321]. Mode Implementation Repeater 20690*f* executes Multiple Mode Implementer 20690*b* which reactivates Mode List Displaying Software 20690*c*, Mode Selecting Software 20690*d*, Mode Activating Software 20690*e* of which the sequence is explained in Paragraph [0322].

Paragraph [0319]—This Paragraph [0319] illustrates the sequence of Mode List Displaying Software 20690*c* (Paragraph [0318]). Referring to Paragraph [0319], CPU 211 (FIG. 1), under the command of Mode List Displaying Software 20690*c*, displays a list of a certain amount or all modes, functions, and/or systems described in this specification on LCD 201 (FIG. 1).

Paragraph [0320]—This Paragraph [0320] illustrates the sequence of Mode Selecting Software 20690*d* (Paragraph [0318]). Referring to Paragraph [0320], the user of Communication Device 200 inputs an input signal by utilizing Input Device 210 (FIG. 1) or via voice recognition system identifying one of the modes, functions, and/or systems displayed on LCD 201 (FIG. 1) (S1), and CPU 211 (FIG. 1), under the command of Mode Selecting Software 20690*d*, interprets the input signal and selects the corresponding mode, function, or system (S2).

Paragraph [0321]—This Paragraph [0321] illustrates the sequence of Mode Activating Software 20690*e* (Paragraph [0318]). Referring to Paragraph [0321], CPU 211 (FIG. 1), under the command of Mode Activating Software 20690*e*, activates the mode, function, or, system selected in S2 of Paragraph [0320]. CPU 211 thereafter implements the activated mode, function, or system as described in the relevant paragraphs in this specification.

Paragraph [0322]—This Paragraph [0322] illustrates the sequence of Mode Implementation Repeater 20690*f* (Paragraph [0318]). Referring to Paragraph [0322], the user of Communication Device 200 inputs an input signal by utilizing Input Device 210 (FIG. 1) or via voice recognition system (S1). Once the activation of the selected mode, function, or system described in Paragraph [0321] hereinbefore is completed, and if the input signal indicates to repeat the process to activate another mode, function, or system (S2), CPU 211 (FIG. 1), under the command of Mode Implementation Repeater 20690*f*, executes Multiple Mode Implementer 20690*b* (Paragraph [0318]), which reactivates Mode List Displaying Software 20690*c* (Paragraph [0318]), Mode Selecting Software 20690*d* (Paragraph [0318]), and Mode Activating Software 20690*e* (Paragraph [0318]) to activate the second mode, function, or system while the first mode, function, or system is implemented by utilizing the method of so-called 'time sharing' (S3). Mode List Displaying Software 20690*c*, Mode Selecting Software 20690*d*, and Mode Activating Software 20690*e* can be repeatedly executed until all modes, function, and systems displayed on LCD 201 (FIG. 1) are selected and activated. The activation of modes, functions, and/or systems is not repeated if the input signal explained in S2 so indicates.

Paragraph [0323]—As another embodiment, Multiple Mode Implementer 20690*b*, Mode List Displaying Software 20690*c*, Mode Selecting Software 20690*d*, Mode Activating Software 20690*e*, and Mode Implementation Repeater 20690*f* described in Paragraph [0318] may be integrated into one software program, Multiple Mode Implementer 20690*b*, as described in Paragraph [0323]. Referring to Paragraph [0323], CPU 211 (FIG. 1), first of all, displays a list of a certain amount or all modes, functions, and/or systems described in this specification on LCD 201 (FIG. 1) (S1). Next, the user of Communication Device 200 inputs an input signal by utilizing Input Device 210 (FIG. 1) or via voice recognition system identifying one of the modes, functions, and/or systems displayed on LCD 201 (S2), and CPU 211 interprets the input signal and selects the corresponding mode, function, or system (S3). CPU 211 activates the mode, function, or system selected in S3, and thereafter implements the activated mode, function, or system as described in the relevant paragraphs in this specification (S4). Once the activation of the selected mode, function, or system described in S4 is completed, the user of Communication Device 200 inputs an input signal by utilizing Input Device 210 or via voice recognition system (S5). If the input signal indicates to repeat the process to activate another mode, function, or system (S6), CPU 211 repeats the steps S1 through S4 to activate the second mode, function, or system while the first mode, function, or system is implemented by utilizing the method so-called 'time sharing'. The steps of S1 though S4 can be repeatedly executed until all modes, function, and systems displayed on LCD 201 are selected and activated. The activation of modes, functions, and/or systems is not repeated if the input signal explained in S5 so indicates. As another embodiment, before or at the time one software program is activated, CPU 211 may, either automatically or manually (i.e., by a signal input by the user of Communication Device), terminate the other software programs already activated or prohibit other software programs to be activated while one software program is implemented in order to save the limited space of RAM 206, thereby allowing only one software program implemented at a time. For the avoidance of doubt, the meaning of each term 'mode(s)', 'function(s)', and 'system(s)' is equivalent to the others in this specification. Namely, the meaning of 'mode(s)' includes and is equivalent to that of 'function(s)' and 'system(s)', the meaning of 'function(s)' includes and is equivalent to that of 'mode(s)' and 'system(s)', and the meaning of 'system(s)' includes and is equivalent to that of 'mode(s)' and 'function(s)'. Therefore, even only mode(s) is expressly utilized in this specification, it impliedly includes function(s) and/or system(s) by its definition.

Paragraph [0324]—<<Incorporation By Reference>>

Paragraph [0325]—All paragraphs and drawings described in U.S. Ser. No. 10/711,265, filed 2004-09-07, are incorporated to this application by reference, particularly the following: the preamble described in paragraph [2149] (no drawings); Communication Device 200 (Voice Communication Mode) described in paragraphs [2150] through [2155] (FIGS. 1 through 2c); Voice Recognition System described in paragraphs [2156] through [2188] (FIGS. 3 through 19); Positioning System described in paragraphs [2189] through [2220] (FIGS. 20a through 32e); Auto Backup System described in paragraphs [2221] through [2230] (FIGS. 33 through 37); Signal Amplifier described in paragraphs [2231] through [2236] (FIG. 38); Audio/Video Data Capturing System described in paragraphs [2237] through [2249] (FIGS. 39 through 44b); Digital Mirror Function (1) described in paragraphs [2250] through [2258] (FIGS. 44c through 44e); Caller ID System described in paragraphs through [2266] (FIGS. 45 through 47); Stock Purchasing Function described in paragraphs [2267] through [2276] (FIGS. 48 through 52); Timer Email Function described in paragraphs [2277] through (FIGS. 53a and 53b); Call Blocking Function described in paragraphs [2284] through [2297] (FIGS. 54 through 59); Online Payment Function described in paragraphs [2298] through [2307] (FIGS. 60 through 64); Navigation System described in paragraphs [2308] through [2330] (FIGS. 65 through 74a); Remote Controlling System described in paragraphs [2331] through [2349] (FIGS. 75 through 85); Auto Emergency Calling System described in paragraphs [2350] through [2358] (FIGS. 86 and 87); Cellular TV Function described in paragraphs [2359] through [2443] (FIGS. 88 through 135); 3D Video Game Function described in paragraphs [2444] through [2456] (FIGS. 136 through 144); Digital Mirror Function (2) described in paragraphs [2457] through [2466] (FIGS. 145 through 155); Voice Recognition Sys—E-mail (2) described in paragraphs [2467] through [2475] (FIGS. 156 through 160); Positioning System—GPS Search Engine described in paragraphs [2476] through [2518] (FIGS. 161 through 182); Mobile Ignition Key Function described in paragraphs [2519] through [2541] (FIGS. 183 through 201); Voice Print Authentication System described in paragraphs [2542] through [2552] (FIGS. 202 through 211); Fingerprint Authentication System described in paragraphs [2553] through [2565] (FIGS. 212 through 221); Auto Time Adjust Function described in paragraphs [2566] through [2570] (FIGS. 222 through 224); Video/Photo Mode described in paragraphs [2571] through [2599] (FIGS. 225 through 242); Call Taxi Function described in paragraphs [2600] through [2640] (FIGS. 243 through 269); Shooting Video Game Function described in paragraphs [2641] through [2657] (FIGS. 270 through 283); Driving Video Game Function described in paragraphs [2658] through [2671] (FIGS. 284 through 294); Address Book Updating Function described in paragraphs [2672] through [2692] (FIGS. 295 through 312); Batch Address Book Updating Function—With Host described in paragraphs [2693] through (FIGS. 313 through 329); Batch Address Book Updating Function—Peer-To-Peer Connection described in paragraphs [2715] through [2719] (FIGS. 329a through 329c); Batch Scheduler Updating Function—With Host described in paragraphs [2720] through [2743] (FIGS. 330 through 350); Batch Scheduler Updating Function—Peer-To-Peer Connection described in paragraphs [2744] through (FIGS. 351 and 352); Calculator Function described in paragraphs [2749] through [2754] (FIGS. 353 through 356); Spreadsheet Function described in paragraphs [2755] through [2762] (FIGS. 357 through 360); Word Processing Function described in paragraphs [2763] through [2778] (FIGS. 361 through 373); TV Remote Controller Function described in paragraphs [2779] through [2801] (FIGS. 374 through 394); CD/PC Inter-communicating Function described in paragraphs [2802] through [2826] (FIGS. 413 through 427); PDWR Sound Selecting Function described in paragraphs [2827] through (FIGS. 428 through 456); Start Up Software Function described in paragraphs [2864] through (FIGS. 457 through 466); Another Embodiment Of Communication Device 200 described in paragraphs [2881] through [2885] (FIGS. 467a through 467d); Stereo Audio Data Output Function described in paragraphs [2886] through [2905] (FIGS. 468 through 479); Stereo Visual Data Output Function described in paragraphs [2906] through [2925] (FIGS. 480 through 491); Multiple Signal Processing Function described in paragraphs [2926] through [2998] (FIGS. 492 through 529); Positioning System—Pin-pointing Function described in paragraphs [2999] through [3032] (FIGS. 530 through 553); Artificial Satellite Host described in paragraphs [3033] through [3051] (FIGS. 554 through 567); CCD Bar Code Reader Function described in paragraphs [3052] through [3073] (FIGS. 568 through 579); Online Renting Function described in paragraphs [3074] through [3151] (FIGS. 580 through 633); SOS Calling Function described in paragraphs [3152] through [3172] (FIGS. 634 through 645); Input Device described in paragraphs [3173] through [3178] (FIGS. 646 through 650); PC Remote Controlling Function described in paragraphs [3179] through [3214] (FIGS. 651 through 670); PC Remote Downloading Function described in paragraphs [3215] through [3264] (FIGS. 671 through 701); Audiovisual Playback Function described in paragraphs [3265] through [3290] (FIGS. 702 through 716); Audio Playback Function described in paragraphs [3291] through [3315] (FIGS. 717 through 731); Ticket Purchasing Function described in paragraphs [3316] through [3345] (FIGS. 732 through 753); Remote Data Erasing Function described in paragraphs [3346] through [3375] (FIGS. 754 through 774); Business Card Function described in paragraphs [3376] through [3392] (FIGS. 775 through 783); Game Vibrating Function described in paragraphs [3393] through [3403] (FIGS. 784 through 786); Part-time Job Finding Function described in paragraphs [3404] through [3424] (FIGS. 787 through 801); Parking Lot Finding Function described in paragraphs [3425] through [3464] (FIGS. 802 through 832); Parts Upgradable Communication Device described in paragraphs [3465] through [3490] (FIGS. 833a through 833x); On Demand TV Function described in paragraphs [3491] through [3521] (FIGS. 834 through 855); Inter-communicating TV Function described in paragraphs [3522] through [3556] (FIGS. 856 through 882); Display Controlling Function described in paragraphs [3557] through [3574] (FIGS. 883 through 894); Multiple Party Communicating Function described in paragraphs [3575] through [3608] (FIGS. 894a through 917); Display Brightness Controlling Function described in paragraphs [3609] through [3618] (FIGS. 918 through 923); Multiple Party Pin-pointing Function described in paragraphs through [3666] (FIGS. 924 through 950f); Digital Camera Function described in paragraphs through [3694] (FIGS. 951 through 968); Phone Number Linking Function described in paragraphs [3695] through [3718] (FIGS. 968a through 983); Multiple Window Displaying Function described in paragraphs [3719] through [3737] (FIGS. 984 through 995); Mouse Pointer Displaying Function described in paragraphs [3738] through [3775] (FIGS. 996 through 1021); House Item Pin-pointing Function described in paragraphs [3776] through [3935] (FIGS. 1022 through 1152); Membership Administrating Function described in paragraphs [3936] through [3978] (FIGS. 1153 through 1188); Keyword Search Timer Recording Function described in paragraphs [3979] through (FIGS. 1189 through 1254); Weather Forecast Displaying Function described in paragraphs through [4112] (FIGS. 1255 through 1288); Multiple Language Displaying Function described in paragraphs [4113] through [4170] (FIGS. 1289 through 1331); Caller's Information Displaying Function described in paragraphs [4171] through [4224] (FIGS. 1332 through 1375); Communication Device Remote Controlling Function (By Phone) described in paragraphs [4225] through [4265] (FIGS. 1394 through 1415); Communication Device Remote Controlling Function (By Web) described in paragraphs through [4306] (FIGS. 1416 through 1437); Shortcut Icon Displaying Function described in paragraphs [4307] through [4334] (FIGS. 1438 through 1455); Task Tray Icon Displaying Function described in paragraphs [4335] through [4357] (FIGS. 1456 through 1470); Multiple Channel Processing Function described in paragraphs [4358] through [4405] (FIGS. 1471 through 1498); Solar Battery Charging Function described in paragraphs [4406] through [4419] (FIGS. 1499 through 1509); OS Updating Function described in paragraphs [4420] through [4487] (FIGS. 1510 through 1575); Device Managing Function described in paragraphs [4488] through [4505] (FIGS. 1576 through 1587); Automobile Controlling Function described in paragraphs [4506] through [4554] (FIGS. 1588 through 1627); OCR Function described in paragraphs [4555] through [4590] (FIGS. 1628 through 1652); Real-time GPS Function described in paragraphs [4591] through [4660] (FIGS. 1653 through 1712); CCD Video Stabilizing Function described in paragraphs [4661] through [4692] (FIGS. 1713 through 1736); DVD Remote Controlling Function described in paragraphs [4693] through [4731] (FIGS. 1737 through 1757); Dual Frame Buffer Implementing Function described in paragraphs [4732] through (FIGS. 1758 through 1767); Mouse Pointer Image Auto Changing Function described in paragraphs [4749] through [4762] (FIGS. 1768 through 1774); Dual CCD Camera Function described in paragraphs [4763] through [4783] (FIGS. 1775a through 1786); Radio Tuner Function described in paragraphs [4784] through [4814] (FIGS. 1787 through 1812); Registered Voice Recognizing Function described in paragraphs [4815] through [4854] (FIGS. 1813 through 1842); Host's TV Resolution Converting Function described in paragraphs [4855] through [4884] (FIGS. 1843 through 1864); Voice Shortcut Recognizing Function described in paragraphs [4885] through [4919] (FIGS. 1865 through 1889); and Vital Sign Monitoring Function described in paragraphs [4920] through [5009] (FIGS. 1890a through 1954).

The invention claimed is:
1. A mobile phone comprising:
an input device;
a display;
an antenna;
a voice communication implementer, wherein voice communication is implemented by sending and receiving audio data via said antenna;
a caller's information displaying implementer, wherein upon receiving a phone call, a caller's information which indicates the phone number and/or name of the caller is displayed; and a mobile phone updating implementer, wherein a mobile phone updating data is received via said antenna and one or more of the following is/are updated by said mobile phone updating data:
(1) a mobile phone battery controller which controls the mobile phone battery included in said mobile phone,
(2) a mobile phone CCD unit controller which controls the mobile phone CCD unit included in said mobile phone,
(3) a mobile phone microphone controller which controls the mobile phone microphone included in said mobile phone,
(4) a mobile phone speaker controller which controls the mobile phone speaker included in said mobile phone, and
(5) a mobile phone vibrator controller which controls the mobile phone vibrator included in said mobile phone.

2. A system comprising:
a mobile phone comprising an input device, a display, and an antenna;
a voice communication implementer, wherein voice communication is implemented by sending and receiving audio data via said antenna;
a caller's information displaying implementer, wherein upon receiving a phone call, a caller's information which indicates the phone number and/or name of the caller is displayed; and
a mobile phone updating implementer, wherein a mobile phone updating data is received via said antenna and one or more of the following is/are updated by said mobile phone updating data:
(1) a mobile phone battery controller which controls the mobile phone battery included in said mobile phone,
(2) a mobile phone CCD unit controller which controls the mobile phone CCD unit included in said mobile phone,
(3) a mobile phone microphone controller which controls the mobile phone microphone included in said mobile phone,
(4) a mobile phone speaker controller which controls the mobile phone speaker included in said mobile phone, and
(5) a mobile phone vibrator controller which controls the mobile phone vibrator included in said mobile phone.

3. A method for a mobile phone comprising an input device, a display, and an antenna, said method comprising:
a voice communication implementing step, wherein voice communication is implemented by sending and receiving audio data via said antenna;
a caller's information displaying implementing step, wherein upon receiving a phone call, a caller's information which indicates the phone number and/or name of the caller is displayed; and
a mobile phone updating implementing step, wherein a mobile phone updating data is received via said antenna and one or more of the following is/are updated by said mobile phone updating data:
(1) a mobile phone battery controller which controls the mobile phone battery included in said mobile phone,
(2) a mobile phone CCD unit controller which controls the mobile phone CCD unit included in said mobile phone,
(3) a mobile phone microphone controller which controls the mobile phone microphone included in said mobile phone,
(4) a mobile phone speaker controller which controls the mobile phone speaker included in said mobile phone, and
(5) a mobile phone vibrator controller which controls the mobile phone vibrator included in said mobile phone.

4. The communication device of claim 1, wherein said mobile phone is a handheld voice communication device which is operable to implement data communication.

5. The communication device of claim 1, wherein said mobile phone is a handheld voice communication device which is operable to implement multiple functions simultaneously together with voice communication.

6. The communication device of claim 1, wherein said mobile phone battery controller, said mobile phone CCD unit controller, said mobile phone microphone controller, said mobile phone speaker controller, and/or said mobile phone vibrator controller is/are updated to the latest version by said mobile phone updating data.

7. The communication device of claim 1, wherein two or more of said mobile phone battery controller, said mobile phone CCD unit controller, said mobile phone microphone controller, said mobile phone speaker controller, and said mobile phone vibrator controller are updated simultaneously.

8. The communication device of claim 1, wherein said mobile phone updating data is received from a host computer.

9. The system of claim 2, wherein said mobile phone is a handheld voice communication device which is operable to implement data communication.

10. The system of claim 2, wherein said mobile phone is a handheld voice communication device which is operable to implement multiple functions simultaneously together with voice communication.

11. The system of claim 2, wherein said mobile phone battery controller, said mobile phone CCD unit controller, said mobile phone microphone controller, said mobile phone speaker controller, and/or said mobile phone vibrator controller is/are updated to the latest version by said mobile phone updating data.

12. The system of claim 2, wherein two or more of said mobile phone battery controller, said mobile phone CCD unit controller, said mobile phone microphone controller, said mobile phone speaker controller, and said mobile phone vibrator controller are updated simultaneously.

13. The system of claim 2, wherein said mobile phone updating data is received from a host computer.

14. The method of claim 3, wherein said mobile phone is a handheld voice communication device which is operable to implement data communication.

15. The method of claim 3, wherein said mobile phone is a handheld voice communication device which is operable to implement multiple functions simultaneously together with voice communication.

16. The method of claim 3, wherein said mobile phone battery controller, said mobile phone CCD unit controller, said mobile phone microphone controller, said mobile phone speaker controller, and/or said mobile phone vibrator controller is/are updated to the latest version by said mobile phone updating data.

17. The method of claim 3, wherein two or more of said mobile phone battery controller, said mobile phone CCD unit controller, said mobile phone microphone controller, said mobile phone speaker controller, and said mobile phone vibrator controller are updated simultaneously.

18. The method of claim 3, wherein said mobile phone updating data is received from a host computer.

* * * * *